United States Patent
Lin et al.

(10) Patent No.: US 12,440,978 B2
(45) Date of Patent: Oct. 14, 2025

(54) ROBOTIC INSTRUMENT DRIVE CONTROL

(71) Applicant: Auris Health, Inc., Santa Clara, CA (US)

(72) Inventors: Jiayi Lin, San Mateo, CA (US); Chauncey F. Graetzel, Palo Alto, CA (US); Vivian Aralis, Palo Alto, CA (US); Aadel Al Jadda, San Carlos, CA (US); Mingyen Ho, Santa Clara, CA (US)

(73) Assignee: Auris Health, Inc., Santa Clara, CA (US)

( * ) Notice: Subject to any disclaimer, the term of this patent is extended or adjusted under 35 U.S.C. 154(b) by 185 days.

(21) Appl. No.: 17/987,673

(22) Filed: Nov. 15, 2022

(65) Prior Publication Data

US 2023/0202040 A1    Jun. 29, 2023

Related U.S. Application Data

(63) Continuation of application No. PCT/US2021/065220, filed on Dec. 27, 2021.

(51) Int. Cl.
*B25J 9/16* (2006.01)
*A61B 34/00* (2016.01)
*A61B 34/30* (2016.01)

(52) U.S. Cl.
CPC ............. *B25J 9/1664* (2013.01); *A61B 34/30* (2016.02); *A61B 34/70* (2016.02); *A61B 2034/301* (2016.02); *A61B 2034/303* (2016.02)

(58) Field of Classification Search
CPC ........ B25J 9/1664; A61B 34/30; A61B 34/70; A61B 2034/301; A61B 2034/303
See application file for complete search history.

(56) References Cited

U.S. PATENT DOCUMENTS

| | | | |
|---|---|---|---|
| 9,931,170 B2 | 4/2018 | Auld | |
| 10,314,661 B2 * | 6/2019 | Bowling | ................. A61B 34/37 |
| 10,543,047 B2 | 1/2020 | Yu | |
| 10,765,303 B2 | 9/2020 | Graetzel et al. | |
| 11,337,766 B2 * | 5/2022 | Elbanna | .............. A61B 17/1757 |
| 11,471,170 B1 * | 10/2022 | Nikou | .................... A61B 34/20 |

(Continued)

FOREIGN PATENT DOCUMENTS

| | | |
|---|---|---|
| JP | 2008036393 A | 2/2008 |
| JP | 2009011809 A | 1/2009 |

(Continued)

OTHER PUBLICATIONS

International Search Report for Appl. No. PCT/US2021/065220, dated Apr. 18, 2022, 5 pages.

(Continued)

*Primary Examiner* — Mohamad O El Sayah
(74) *Attorney, Agent, or Firm* — Paradice & Li LLP

(57) ABSTRACT

A robotic system includes a medical instrument comprising an elongate shaft dimensioned to be disposed at least partially within an access sheath and control circuitry configured to cause the elongate shaft to be retracted at least partially within the access sheath, determine a position of a distal end of the elongate shaft relative to the access sheath, and modify a speed of retraction of the elongate shaft based on the determined position of the distal end of the elongate shaft relative to the access sheath.

15 Claims, 29 Drawing Sheets

(56) References Cited

U.S. PATENT DOCUMENTS

| | | | |
|---|---|---|---|
| 2009/0326552 A1* | 12/2009 | Diolaiti | A61B 90/10 606/130 |
| 2010/0096549 A1* | 4/2010 | Nishiyama | H01J 37/20 250/307 |
| 2014/0277333 A1 | 9/2014 | Lewis et al. | |
| 2014/0277334 A1* | 9/2014 | Yu | A61B 34/30 901/30 |
| 2015/0051487 A1* | 2/2015 | Uber, III | A61M 5/1422 600/432 |
| 2015/0073342 A1 | 3/2015 | Pacheco et al. | |
| 2017/0340396 A1* | 11/2017 | Romo | B25J 9/1682 |
| 2018/0008359 A1 | 1/2018 | Randle | |
| 2018/0028781 A1 | 2/2018 | Murphy et al. | |
| 2019/0246882 A1* | 8/2019 | Graetzel | A61B 1/0016 |
| 2020/0261172 A1 | 8/2020 | Romo et al. | |
| 2020/0281665 A1* | 9/2020 | Kopp | A61B 17/07207 |

FOREIGN PATENT DOCUMENTS

| | | |
|---|---|---|
| JP | 2019505245 A | 2/2019 |
| WO | 2018125917 A1 | 7/2018 |
| WO | 2019133438 A1 | 7/2019 |
| WO | 2021028889 A1 | 2/2021 |
| WO | 2021245553 A1 | 12/2021 |

OTHER PUBLICATIONS

Written Opinion for Appl. No. PCT/US2021/065220, dated Apr. 18, 2022, 5 pages.

Supplementary European Search Report, issued on Oct. 18, 2024, in European Patent Application No. 21916305.2, 13 pages.

Office Action from Japan Patent Application No. 2023-540054, dated Jul. 1, 2025, 9 pages.

Office Action, dated Jun. 17, 2025, from European Patent Application No. 21916305.2, 7 pages.

\* cited by examiner

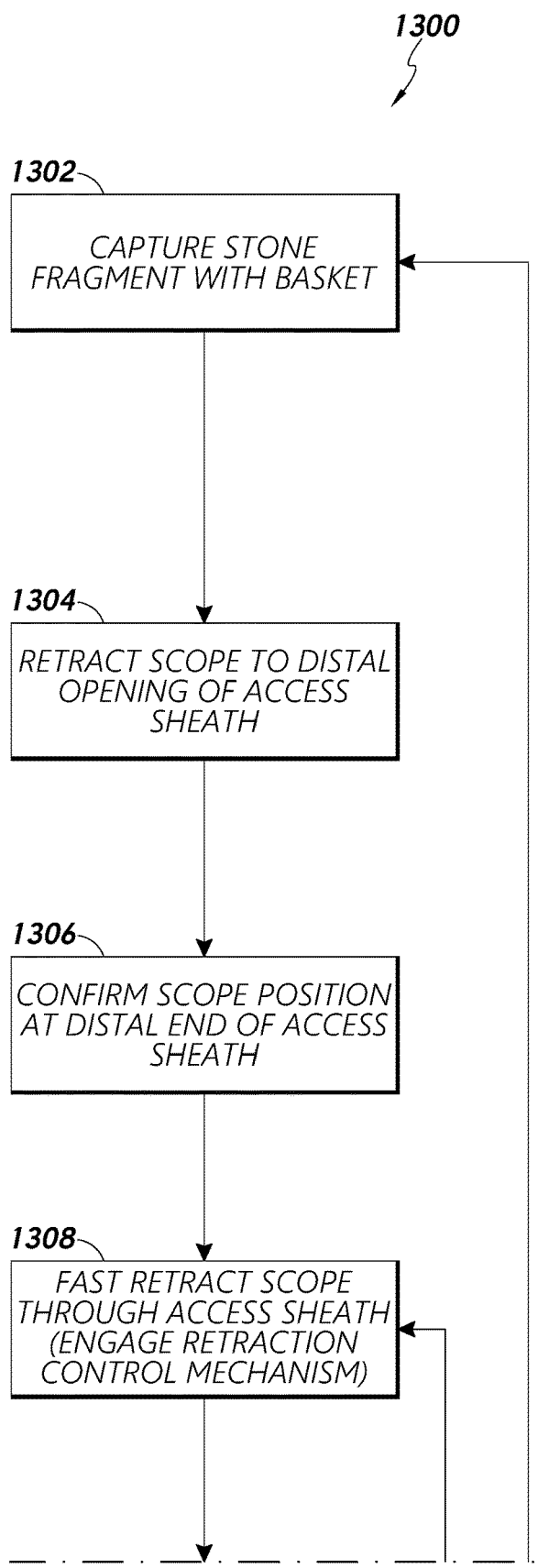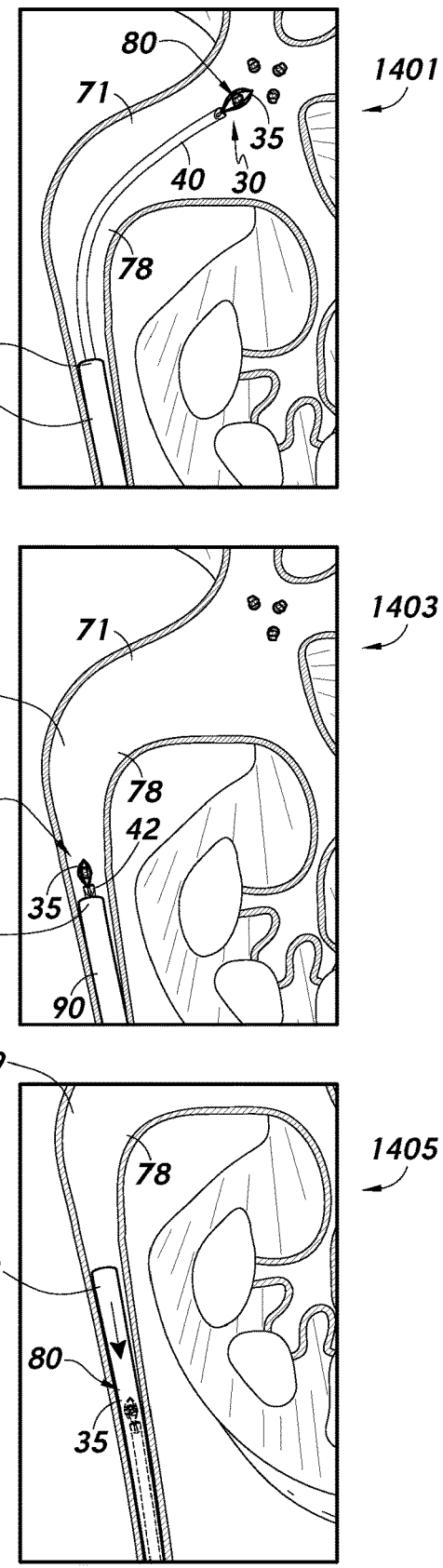
FIG. 13-1
FIG. 14-1

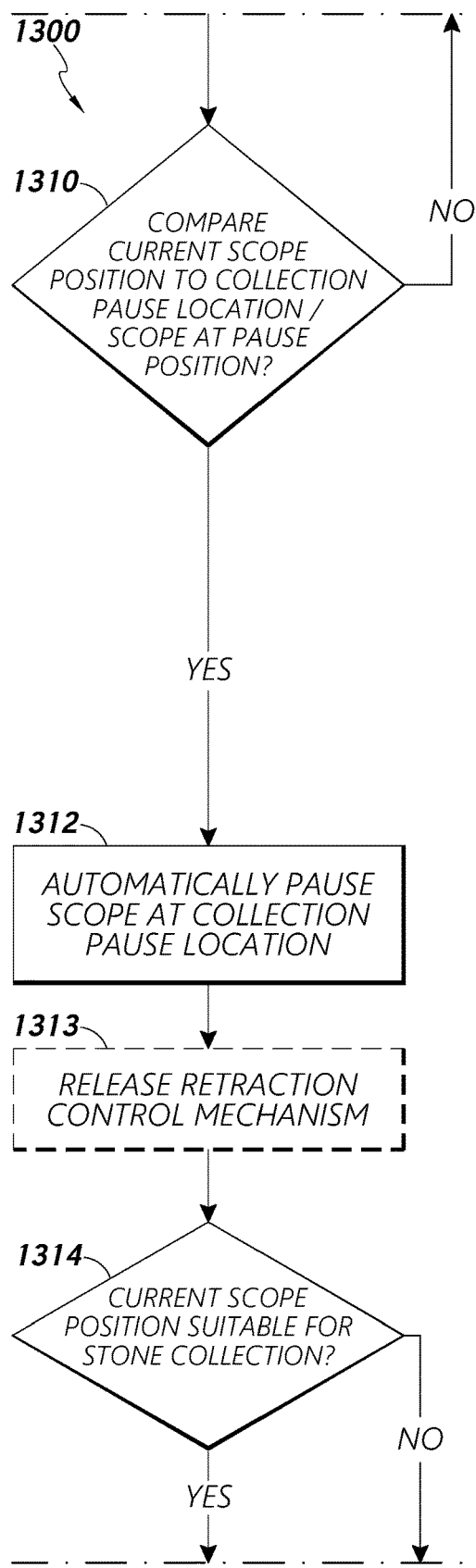
FIG. 13-2
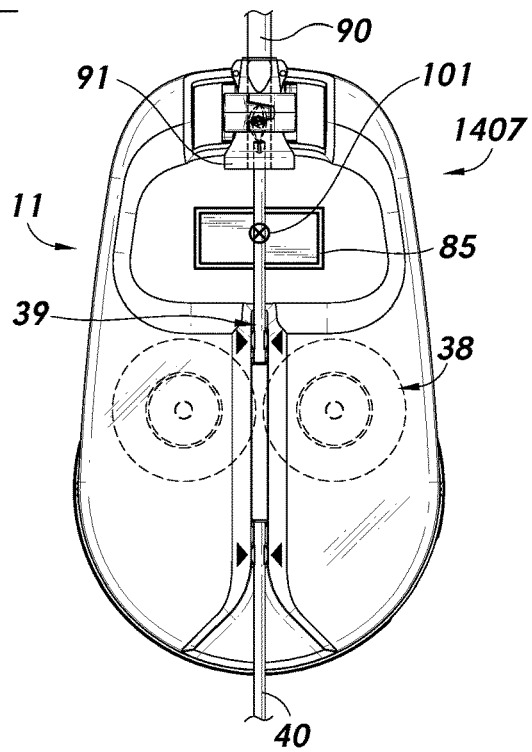
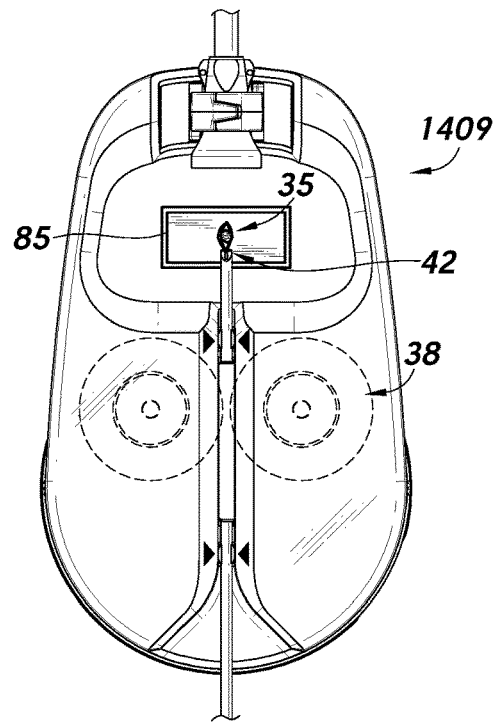
FIG. 14-2

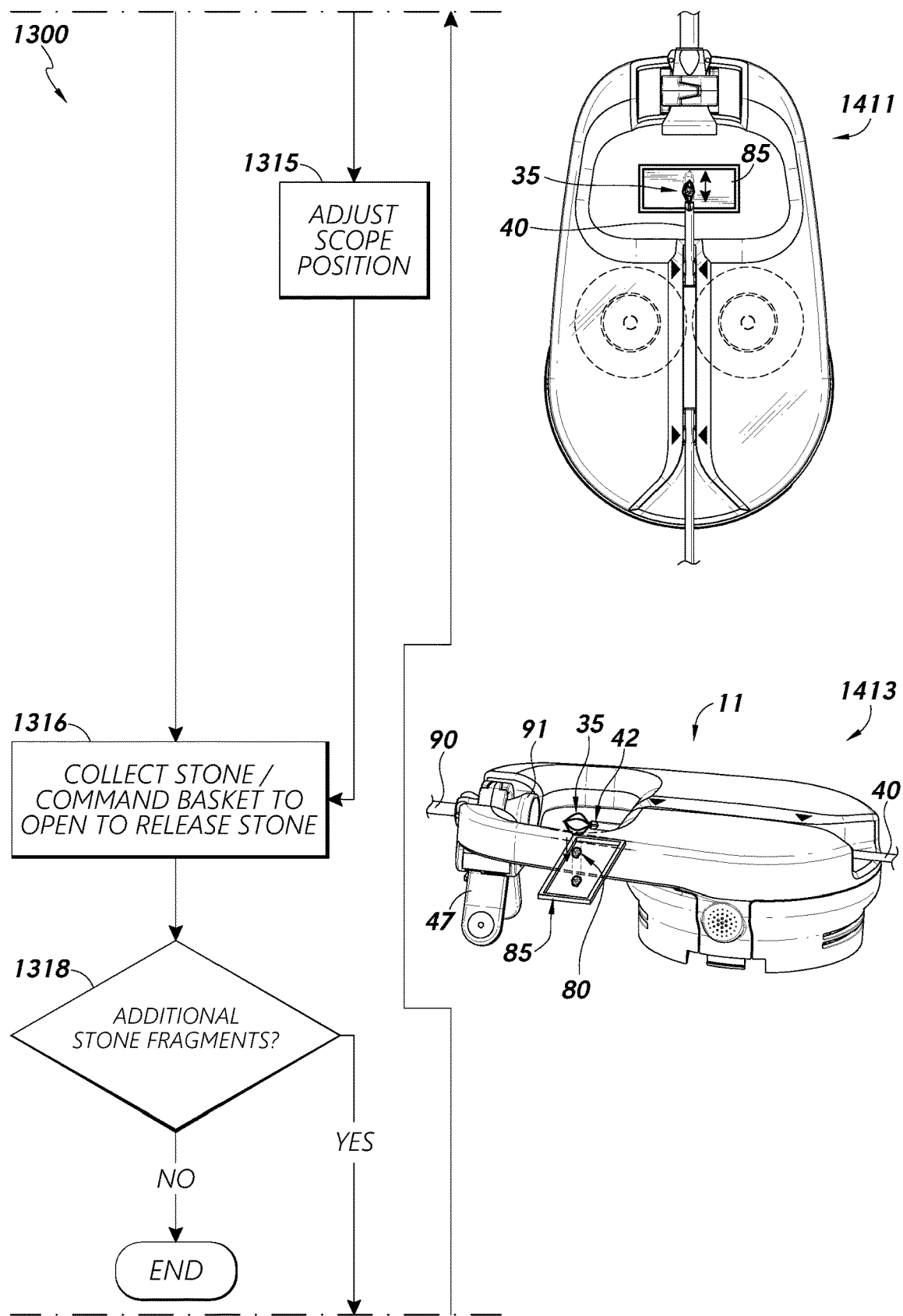

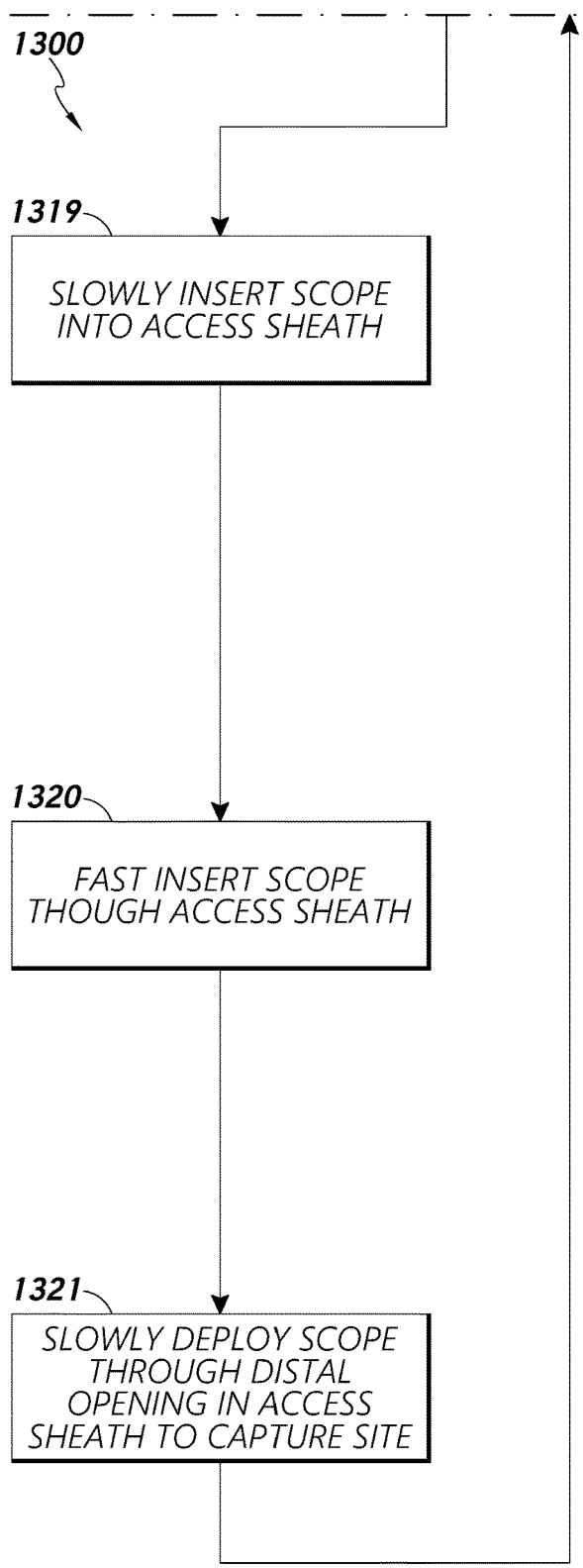
FIG. 13-4
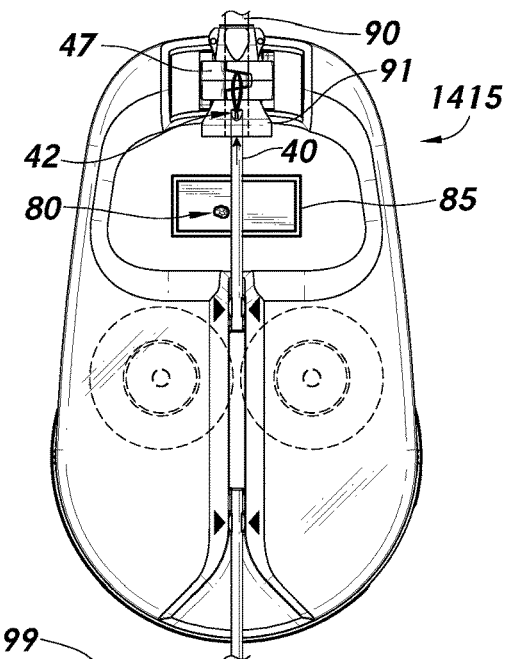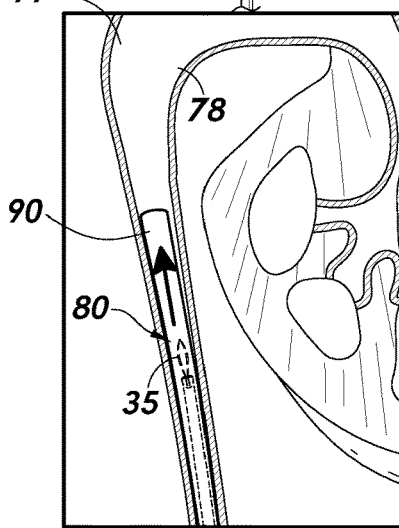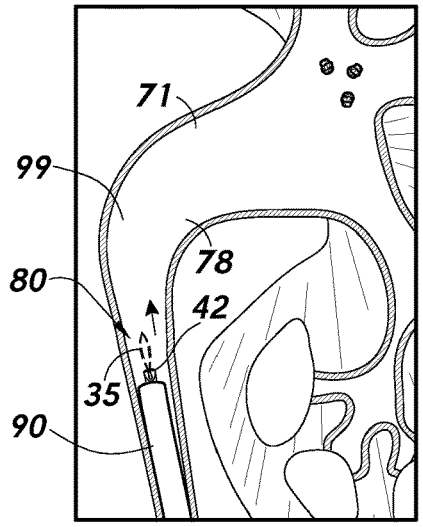
FIG. 14-4

INSERTION SPEED ZONES

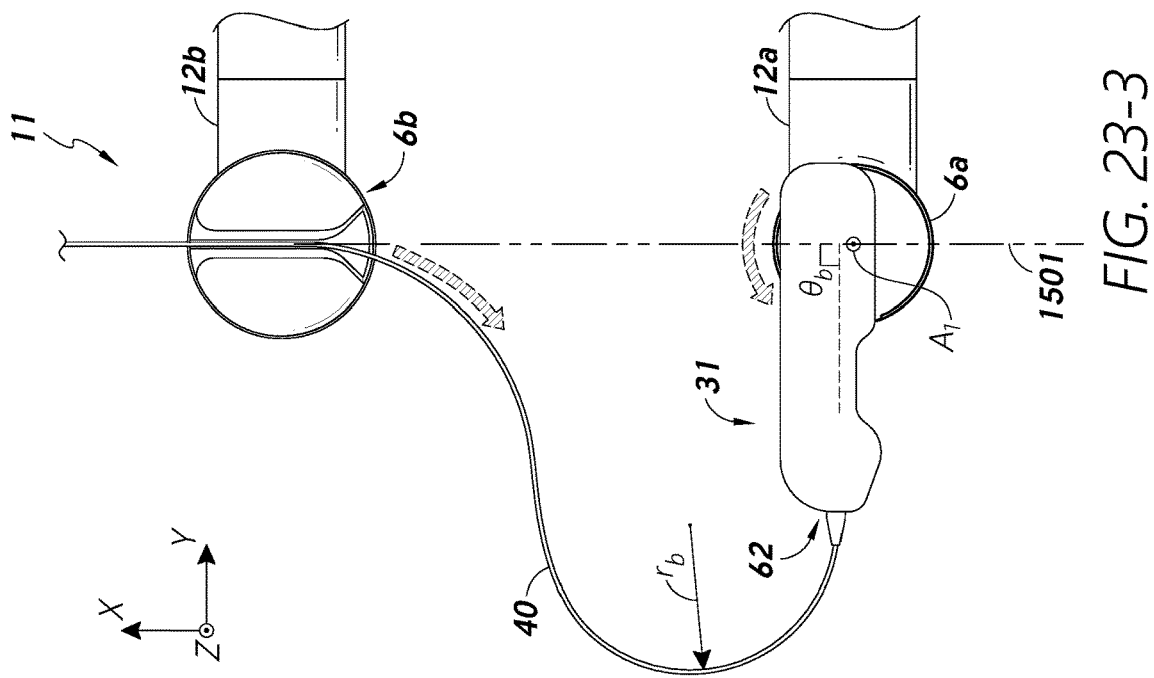
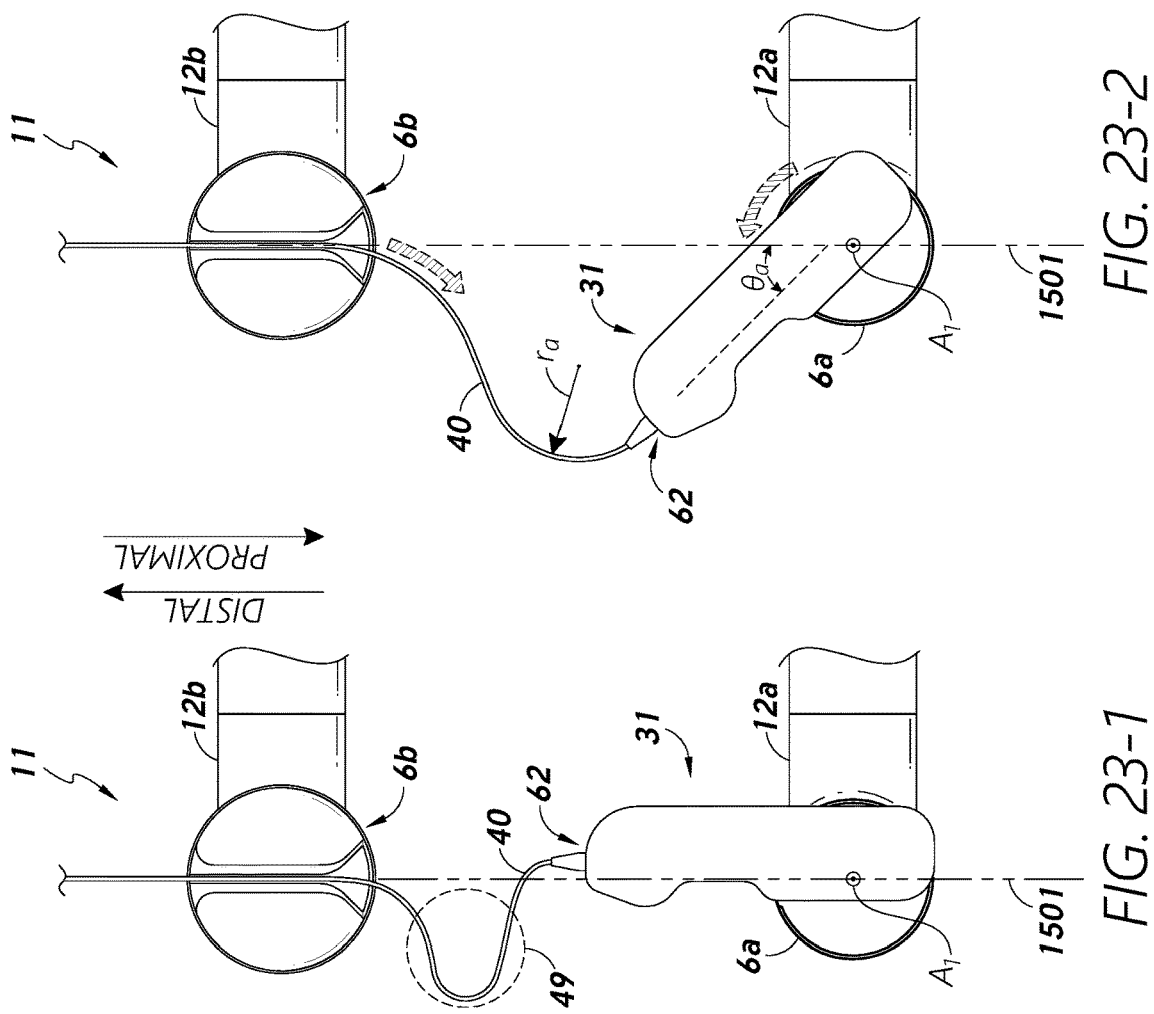
FIG. 23-1
FIG. 23-2
FIG. 23-3

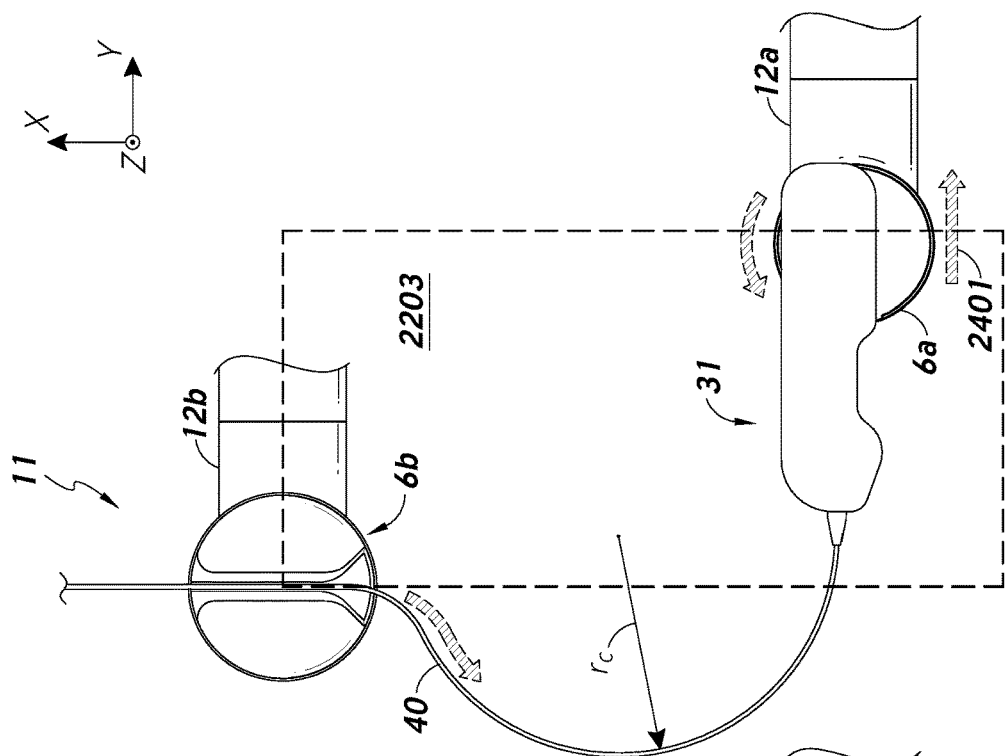
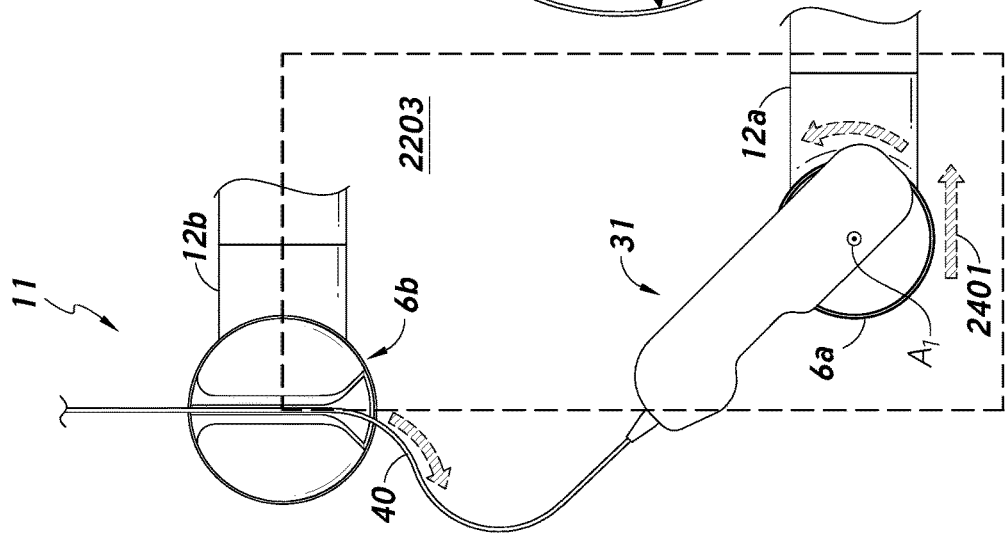
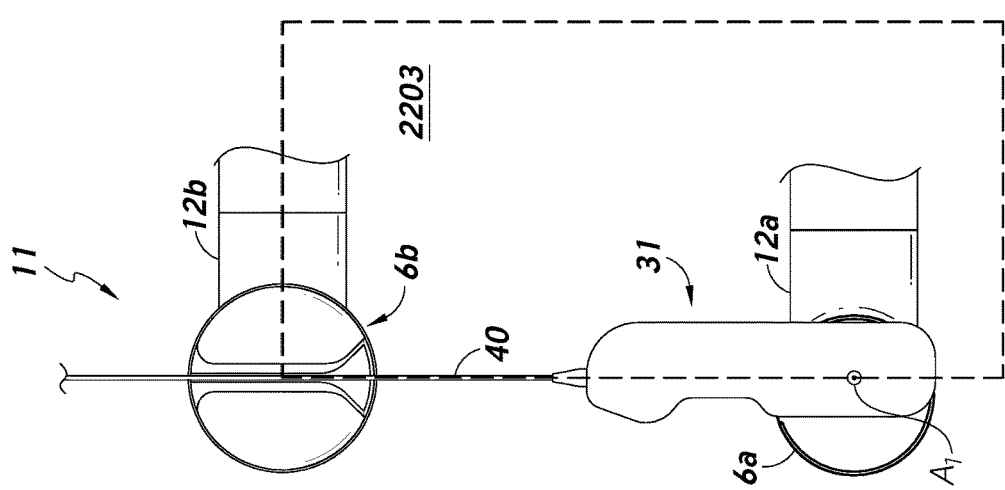
FIG. 24-1    FIG. 24-2    FIG. 24-3

ROBOTIC INSTRUMENT DRIVE CONTROL

RELATED APPLICATION(S)

This application is a continuation of International Patent Application No. PCT/US2021/065220, filed Dec. 27, 2021, entitled ROBOTIC INSTRUMENT DRIVE CONTROL, which claims priority to U.S. Provisional Application Nos. 63/132,771, filed Dec. 31, 2020, entitled POSITION-BASED INSTRUMENT FEEDER CONTROL, and 63/150,277, filed Feb. 17, 2021, entitled POSITION-BASED INSTRUMENT FEEDER CONTROL, the disclosures of each of which are hereby incorporated by reference in their entirety.

BACKGROUND

The present disclosure relates to robotic medical systems. Certain robotic medical procedure can involve the use of shaft-type instruments, such as endoscopes, which may be inserted into a patient through an orifice (e.g., a natural orifice) and advanced to a target anatomical site. The medical instrument can be controllable and articulable to facilitate navigation within and without the patient anatomy. Instrument feeder devices and systems can control the axial movement of shaft-type medical instruments during a medical procedure.

BRIEF DESCRIPTION OF THE DRAWINGS

Various embodiments are depicted in the accompanying drawings for illustrative purposes and should in no way be interpreted as limiting the scope of the inventions. In addition, various features of different disclosed embodiments can be combined to form additional embodiments, which are part of this disclosure. Throughout the drawings, reference numbers may be reused to indicate correspondence between reference elements.

FIGS. 13-1, 13-2, 13-3, and 13-4 show a flow diagram illustrating a process for automatically modifying axial driving speed of a medical instrument in accordance with one or more embodiments.

FIGS. 14-1, 14-2, 14-3, and 14-4 show certain images corresponding to various blocks, states, and/or operations associated with the process of FIGS. 13-1, 13-2, 13-3, and 13-4, respectively, in accordance with one or more embodiments.

FIGS. 23-1, 23-2, and 23-3 show overhead views of a scope base/handle in various states of rotation in connection with scope retraction in accordance with one or more embodiments.

FIGS. 24-1, 24-2, and 24-3 show overhead views of a scope base/handle in various states of rotation and transverse translation in connection with scope retraction in accordance with one or more embodiments.

FIGS. 25-1 and 25-2 show overhead views of an instrument base in various states of ration and translation in connection with instrument retraction and/or insertion in accordance with one or more embodiments.

DETAILED DESCRIPTION

Figure 1:
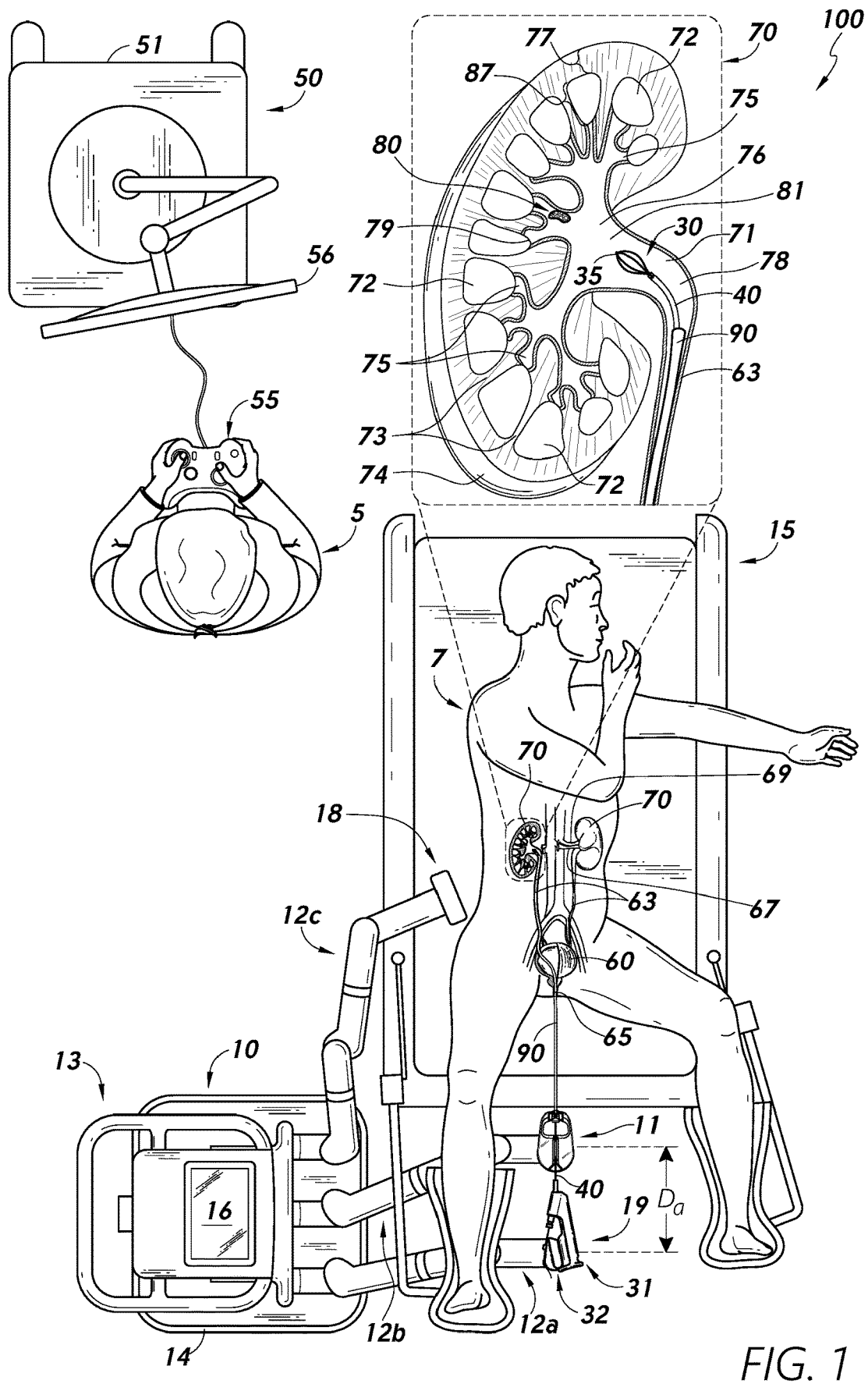
FIG. 1 illustrates an embodiment of a robotic medical system including an instrument feeder device controllable via a robotic arm interface in accordance with one or more embodiments.

The headings provided herein are for convenience only and do not necessarily affect the scope or meaning of the claimed invention. Although certain preferred embodiments and examples are disclosed below, inventive subject matter extends beyond the specifically disclosed embodiments to other alternative embodiments and/or uses and to modifications and equivalents thereof. Thus, the scope of the claims that may arise herefrom is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Although certain spatially relative terms, such as "outer," "inner," "upper," "lower," "below," "above," "vertical," "horizontal," "top," "bottom," and similar terms, are used herein to describe a spatial relationship of one device/element or anatomical structure to another device/element or anatomical structure, it is understood that these terms are used herein for ease of description to describe the positional relationship between element(s)/structures(s), such as with respect to the illustrated orientations of the drawings. It should be understood that spatially relative terms are intended to encompass different orientations of the element(s)/structures(s), in use or operation, in addition to the orientations depicted in the drawings. For example, an element/structure described as "above" another element/structure may represent a position that is below or beside such other element/structure with respect to alternate orientations of the subject patient or element/structure, and vice-versa. It should be understood that spatially relative terms, including those listed above, may be understood relative to a respective illustrated orientation of a referenced figure.

Certain reference numbers are re-used across different figures of the figure set of the present disclosure as a matter of convenience for devices, components, systems, features, and/or modules having features that may be similar in one or more respects. However, with respect to any of the embodiments disclosed herein, re-use of common reference numbers in the drawings does not necessarily indicate that such features, devices, components, or modules are identical or similar. Rather, one having ordinary skill in the art may be informed by context with respect to the degree to which usage of common reference numbers can imply similarity between referenced subject matter. Use of a particular reference number in the context of the description of a particular figure can be understood to relate to the identified device, component, aspect, feature, module, or system in that particular figure, and not necessarily to any devices, components, aspects, features, modules, or systems identified by the same reference number in another figure. Furthermore, aspects of separate figures identified with common reference numbers can be interpreted to share characteristics or to be entirely independent of one another.

The present disclosure provides systems, devices, and methods for implementing automatic pause, slowdown, and/or other speed control/modification with respect to axial movement of a shaft-type instrument using an instrument feeder, wherein such speed control/modification is based at least in part on a determination of the position of the instrument and/or component or portion thereof that is engaged or driven by the instrument feeder. For example, some implementations relate to the implementation of automatic pause, slowdown, or speedup of an instrument feeder actuator mechanism upon exit of the relevant instrument from a body cavity or introducer/access sheath providing access to the relevant treatment site. With respect to instrument feeder devices and other medical devices relevant to the present disclosure, the term "device" is used according to its broad and ordinary meaning and may refer to any type of tool, instrument, assembly, system, subsystem, apparatus, component, or the like. In some contexts herein, the term "instrument" may be used substantially interchangeably with the term "device."

Although certain aspects of the present disclosure are described in detail herein in the context of renal, urological, and/or nephrological procedures, such as kidney stone removal/treatment procedures, it should be understood that such context is provided for convenience and clarity, and axial drive control, instrument position determination/detection, and specimen collection concepts disclosed herein are applicable to any suitable medical procedures, such as robotic bronchoscopy. However, as mentioned, description of the renal/urinary anatomy and associated medical issues and procedures is presented below to aid in the description of the inventive concepts disclosed herein.

In certain medical procedures, such as ureteroscopy procedures, elongate medical instruments that access the treatment site through an access sheath may be utilized to remove debris, such as kidney stones and stone fragments or other refuse or contaminant(s), from the treatment site. Kidney stone disease, also known as urolithiasis, is a medical condition that involves the formation in the urinary tract of a solid piece of material, referred to as "kidney stones," "urinary stones," "renal calculi," "renal lithiasis," or "nephrolithiasis." Urinary stones may be formed and/or found in the kidneys, the ureters, and the bladder (referred to as "bladder stones"). Such urinary stones can form as a result of mineral concentration in urinary fluid and can cause significant abdominal pain once such stones reach a size sufficient to impede urine flow through the ureter or urethra. Urinary stones may be formed from calcium, magnesium, ammonia, uric acid, cystine, and/or other compounds or combinations thereof.

Several methods can be used for treating patients with kidney stones, including observation, medical treatments (such as expulsion therapy), non-invasive treatments (such as extracorporeal shock wave lithotripsy (ESWL)), minimally-invasive or surgical treatments (such as ureteroscopy and percutaneous nephrolithotomy ("PCNL")), and so on. In some approaches (e.g., ureteroscopy and PCNL), the physician gains access to the stone, the stone is broken into smaller pieces or fragments, and the relatively small stone fragments/particulates are extracted from the kidney using a basketing device and/or aspiration.

In some procedures, surgeons may insert an endoscope (e.g., ureteroscope) into the urinary tract through the urethra to remove urinary stones from the bladder and ureter. Typically, a ureteroscope includes a camera at its distal end configured to enable visualization of the urinary tract. The ureteroscope can also include, or allow for placement in a working channel of the ureteroscope, a lithotripsy device configured to capture or break apart urinary stones. During a ureteroscopy procedure, one physician/technician may control the position of the ureteroscope, while another other physician/technician may control the lithotripsy device(s).

In some procedures, such as procedures for removing relatively large stones, physicians may use a percutaneous nephrolithotomy ("PCNL") technique that involves inserting a nephroscope through the skin (i.e., percutaneously) and intervening tissue to provide access to the treatment site for breaking-up and/or removing the stone(s). A percutaneous-access device (e.g., nephroscope, sheath, sheath assembly, and/or catheter) used to provide an access channel to the target anatomical site (and/or a direct-entry endoscope) may include one or more fluid channels for providing irrigation fluid flow to the target site and/or aspirating fluid from the target site (e.g., through passive outflow and/or active suction).

For ureteroscopic procedures, a physician may implement a procedure to break a relatively large kidney stone into a relatively smaller fragments to facilitate extraction thereof. For example, certain instruments may be utilized to break the stone into smaller fragments, such as by lasing, or through other application of cleaving force to the kidney stone. According to some procedures, a basketing device/system may be used to capture the relatively smaller stone fragment(s) and extract them from the treatment site out of the patient. Generally, when a stone is captured, the surgeon may wish to quickly extract the stone through the ureteral access sheath prior to opening the basket to deposit/drop the stone into a specimen collection structure or area, after which the basket may be closed and reinserted (e.g., within a working channel of an endoscope/ureteroscope) through the access sheath for the purpose of extracting remaining stones or stone fragments, should there be any.

Robotic-assisted ureteroscopic procedures can be implemented in connection with various medical procedures, such as kidney stone removal procedures, wherein robotic tools can enable a physician/urologist to perform endoscopic target access as well as percutaneous access/treatment. Advantageously, aspects of the present disclosure relate to systems, devices, and methods for robotically controlling axial insertion and/or retraction of endoscopes/ureteroscopes to improve procedural efficiency and efficacy. With respect to some ureteroscopic procedures, it may be necessary to capture and extract up to 30 stone fragments or more, each requiring advancement, capture, and retraction sequences/trips. The process of retracting the basket and scope through the access sheath, dropping/depositing the captured stone fragment, and reinserting the scope/basket into and through the access sheath would ideally be repeatable in an efficient manner. However, such processes can require the physician to monitor a scope camera image/view during retraction to confirm when the scope clears the proximal opening of the access sheath such that the stone fragment and basket are extracted outside of the access sheath. It may then be necessary or desirable to coordinate with another technician to confirm when to open and close the basket to drop/deposit the captured stone fragment. Subsequently, insertion of the scope/basket into the access sheath can require cautious operation to prevent high-speed advancement of the scope outside of the access sheath, which could result in injury or damage to the patient physiology and/or surgical structures/devices.

In several of the examples described herein, object removal procedures relate to the use of robotic systems and medical instruments/devices for the removal of stones from a kidney. This disclosure, however, is not limited only to kidney stone treatment. For example, the following description is also applicable to other surgical or medical operations or medical procedures for diagnosis or treatment, such as procedures concerned with the removal of objects from a patient, including any object that can be removed from a treatment site or patient cavity (e.g., the esophagus, ureter, intestine, eye, etc.) or other anatomical site via endoscopic and/or percutaneous access, such as, for example, gallbladder stone removal, lung (pulmonary/transthoracic) tumor biopsy, or cataract removal. Certain embodiments of the present disclosure advantageously obviate issues associated with retraction of a scope or other elongate shaft using an instrument feeder with respect to the speed of retraction of the scope and/or the position at which retraction is stopped/paused.

Medical System

FIG. 1 illustrates an example medical system 100 for performing various medical procedures in accordance with aspects of the present disclosure. The medical system 100 may be used for, for example, endoscopic (e.g., ureteroscopic) procedures. As referenced and described above, certain ureteroscopic procedures involve the treatment/removal of kidney stones. In some implementations, kidney stone treatment can benefit from the assistance of certain robotic technologies/devices. Robotic medical solutions can provide relatively higher precision, superior control, and/or superior hand-eye coordination with respect to certain instruments compared to strictly-manual procedures. For example, robotic-assisted ureteroscopic access to the kidney in accordance with some procedures can advantageously enable a urologist to individually perform both endoscope control and basketing control.

Although the system 100 of FIG. 1 is presented in the context of a ureteroscopic procedure, it should be understood that the principles disclosed herein may be implemented in any type of endoscopic procedure. Furthermore, several of the examples described herein relate to object removal procedures involving the removal of kidney stones from a kidney. The present disclosure, however, is not limited only to kidney stone removal. For example, the following description is also applicable to other surgical or medical operations or medical procedures concerned with the removal of objects from a patient, including any object that can be removed from a treatment site or patient cavity (e.g., the esophagus, ureter, intestine, eye, etc.) via percutaneous and/or endoscopic access, such as, for example, gallbladder stone removal, lung (pulmonary/transthoracic) tumor biopsy, or cataract removal.

The medical system 100 includes a robotic system 10 (e.g., mobile robotic cart) configured to engage with and/or control a medical instrument 40 (e.g., ureteroscope) to perform a direct-entry procedure on a patient 7. The term "direct-entry" is used herein according to its broad and ordinary meaning and may refer to any entry of instrumentation through a natural or artificial opening in a patient's body. For example, with reference to FIG. 1, the direct entry of the scope 40 into the urinary tract of the patient 7 may be made via the urethra 65.

It should be understood that the direct-entry instrument 40 may be any type of medical instrument, including an endoscope (such as a ureteroscope), catheter (such as a steerable or non-steerable catheter), nephroscope, laparoscope, or other type of medical instrument. Embodiments of the present disclosure relating to ureteroscopic procedures for removal of kidney stones through a ureteral access sheath (e.g., the ureteral access sheath 90) are also applicable to solutions for removal of objects through percutaneous access, such as through a percutaneous access sheath. For example, instrument(s) may access the kidney percutaneously through, for example, a percutaneous access sheath to capture and remove kidney stones; insertion and retraction speeds of such instruments can be modified/controlled based on instrument position in accordance with aspects of the present disclosure. The term "percutaneous access" is used herein according to its broad and ordinary meaning and may refer to entry, such as by puncture and/or minor incision, of instrumentation through the skin of a patient and any other body layers necessary to reach a target anatomical location associated with a procedure (e.g., the calyx network of the kidney 70).

The medical system 100 includes a control system 50 configured to interface with the robotic system 10, provide information regarding the procedure, and/or perform a variety of other operations. For example, the control system 50 can include one or more display(s) 56 configured to present certain information to assist the physician 5 and/or other technician(s) or individual(s). The medical system 100 can include a table 15 configured to hold the patient 7. The system 100 may further include an electromagnetic (EM) field generator 18, which may be held by one or more of the robotic arms 12 of the robotic system 10 or may be a stand-alone device. Although the various robotic arms are shown in various positions and coupled to various tools/devices, it should be understood that such configurations are shown for convenience and illustration purposes, and such robotic arms may have different configurations over time and/or at different points during a medical procedure. Furthermore, the robotic arms 12 may be coupled to different devices/instruments than shown in FIG. 1, and in some cases or periods of time, one or more of the arms may not be utilized or coupled to a medical instrument (e.g., instrument manipulator/coupling).

In an example use case, if the patient 7 has a kidney stone (or stone fragment) 80 located in the kidney 70, the physician may execute a procedure to remove the stone 80 through the urinary tract (63, 60, 65). In some embodiments, the physician 5 can interact with the control system 50 and/or the robotic system 10 to cause/control the robotic system 10 to advance and navigate the medical instrument 40 (e.g., a scope) from the urethra 65, through the bladder 60, up the ureter 63, and into the renal pelvis 71 and/or calyx network of the kidney 70 where the stone 80 is located. The physician 5 can further interact with the control system 50 and/or the robotic system 10 to cause/control the advancement of a basketing device 30 through a working channel of the instrument 40, wherein the basketing device 30 is configured to facilitate capture and removal of a kidney stone. The control system 50 can provide information via the display(s) 56 that is associated with the medical instrument 40, such as real-time endoscopic images captured therewith, and/or other instruments of the system 100, to assist the physician 5 in navigating/controlling such instrumentation.

The renal anatomy is described herein for reference with respect to certain medical procedures relating to aspects of the present inventive concepts. The kidneys 70, shown roughly in typical anatomical position in FIG. 1, generally comprise two bean-shaped organs located on the left and right sides, respectively, in the retroperitoneal space. In adult humans, the kidneys are generally about 11 cm in height/length. The kidneys receive blood from the paired renal arteries 69; blood exits the kidney via the paired renal veins 67. Each kidney 70 is fluidly coupled with a respective ureter 63, which generally comprises a tube that carries excreted urine from the kidney 70 to the bladder 60.

The kidneys 70 are typically located relatively high in the abdominal cavity and lie in a retroperitoneal position at a slightly oblique angle. The asymmetry within the abdominal cavity, generally caused by the position of the liver, results in the right kidney (shown in detail in FIG. 1) typically being slightly lower and smaller than the left, and being placed slightly more to the middle than the left kidney. On top of each kidney is an adrenal gland (not shown). The upper parts of the kidneys 70 are partially protected by the 11th and 12th ribs (not shown). Each kidney, with its adrenal gland, is generally surrounded by two layers of fat: the perirenal fat present between renal fascia and renal capsule and pararenal fat superior to the renal fascia.

The kidneys 70 participate in the control of the volumes of various body fluid compartments, fluid osmolality, acid-base balance, various electrolyte concentrations, and removal of toxins. The kidneys 70 provide filtration functionality by secreting certain substances and reabsorbing others. Examples of substances secreted into the urine are hydrogen, ammonium, potassium and uric acid. In addition, the kidneys also carry out various other functions, such as hormone synthesis, and others.

A recessed area on the concave border of the kidney 70 is the renal hilum 81, where the renal artery 69 (not shown in the detailed view of the kidney 70) enters the kidney 70 and the renal vein 67 (not shown in detailed view) and ureter 63 leave. The kidney 70 is surrounded by tough fibrous tissue, the renal capsule 74, which is itself surrounded by perirenal fat, renal fascia, and pararenal fat. The anterior (front) surface of these tissues is the peritoneum, while the posterior (rear) surface is the transversalis fascia.

The functional substance, or parenchyma, of the kidney 70 is divided into two major structures: the outer renal cortex 77 and the inner renal medulla 87. These structures take the shape of a plurality of generally cone-shaped renal lobes, each containing renal cortex surrounding a portion of medulla called a renal pyramid 72. Between the renal pyramids 72 are projections of cortex called renal columns 73. Nephrons (not shown in detail in FIG. 1), the urine-producing functional structures of the kidney, span the cortex 77 and medulla 87. The initial filtering portion of a nephron is the renal corpuscle, which is located in the cortex and is followed by a renal tubule that passes from the cortex deep into the medullary pyramids. Part of the renal cortex, a medullary ray, is a collection of renal tubules that drain into a single collecting duct.

The tip/apex, or papilla 79, of each renal pyramid empties urine into a respective minor calyx 75; minor calyces 75 empty into major calyces 76, and major calyces 76 empty into the renal pelvis 71, which transitions to the ureter 63. The manifold-type collection of minor and major calyces may be referred to herein as the "calyx network" of the kidney. At the hilum 81, the ureter 63 and renal vein 67 exit the kidney and the renal artery 69 enters. Hilar fat and lymphatic tissue with lymph nodes surrounds these structures. The hilar fat is contiguous with a fat-filled cavity called the renal sinus. The renal sinus collectively contains the renal pelvis 71 and calyces 75, 76 and separates these structures from the renal medullary tissue. The funnel/tubular-shaped anatomy associated with the calyces can be referred to as the infundibulum/infundibula. That is, an infundibulum generally leads to the termination of a calyx where a papilla is exposed within the calyx.

With further reference to the medical system 100, the medical instrument 40 (e.g., scope, directly-entry instrument, etc.) can be advanced into the kidney 70 through the urinary tract. Specifically, a ureteral access sheath 90 may be disposed within the urinary tract to an area near the kidney 70. The medical instrument 40 may be passed through the ureteral access sheath 90 to gain access to the internal anatomy of the kidney 70, as shown. Once at the site of the kidney stone 80 (e.g., within a target calyx 75 of the kidney 70 through which the stone 80 is accessible), the medical instrument 40 can be used to channel/direct the basketing device 30 to the target location. Once the stone 80 has been captured in the distal basket portion 35 of the basketing device 30, the utilized ureteral access path may be used to extract the kidney stone 80 from the patient 7.

The various scope-type instruments disclosed herein, such as the scope 40 of the system 100, can be configured to navigate within the human anatomy, such as within a natural orifice or lumen of the human anatomy. The terms "scope" and "endoscope" are used herein according to their broad and ordinary meanings, and may refer to any type of elongate medical instrument having image generating, viewing, and/or capturing functionality and being configured to be introduced into any type of organ, cavity, lumen, chamber, or space of a body. A scope can include, for example, a ureteroscope (e.g., for accessing the urinary tract), a laparoscope, a nephroscope (e.g., for accessing the kidneys), a bronchoscope (e.g., for accessing an airway, such as the bronchus), a colonoscope (e.g., for accessing the colon), an arthroscope (e.g., for accessing a joint), a cystoscope (e.g., for accessing the bladder), colonoscope (e.g., for accessing the colon and/or rectum), borescope, and so on. Scopes/endoscopes, in some instances, may comprise an at least partially rigid and/or flexible tube, and may be dimensioned to be passed within an outer sheath, catheter, introducer, or other lumen-type device, or may be used without such devices.

The system 100 may advantageously be configured to implement certain scope retraction speed control/modification based on determined/detected scope position as disclosed in detail herein. Such scope speed control may advantageously provide for efficient stone removal and prevention or reduced risk of damage do tissue and/or instrumentation during scope insertion and retraction.

Figure 2:
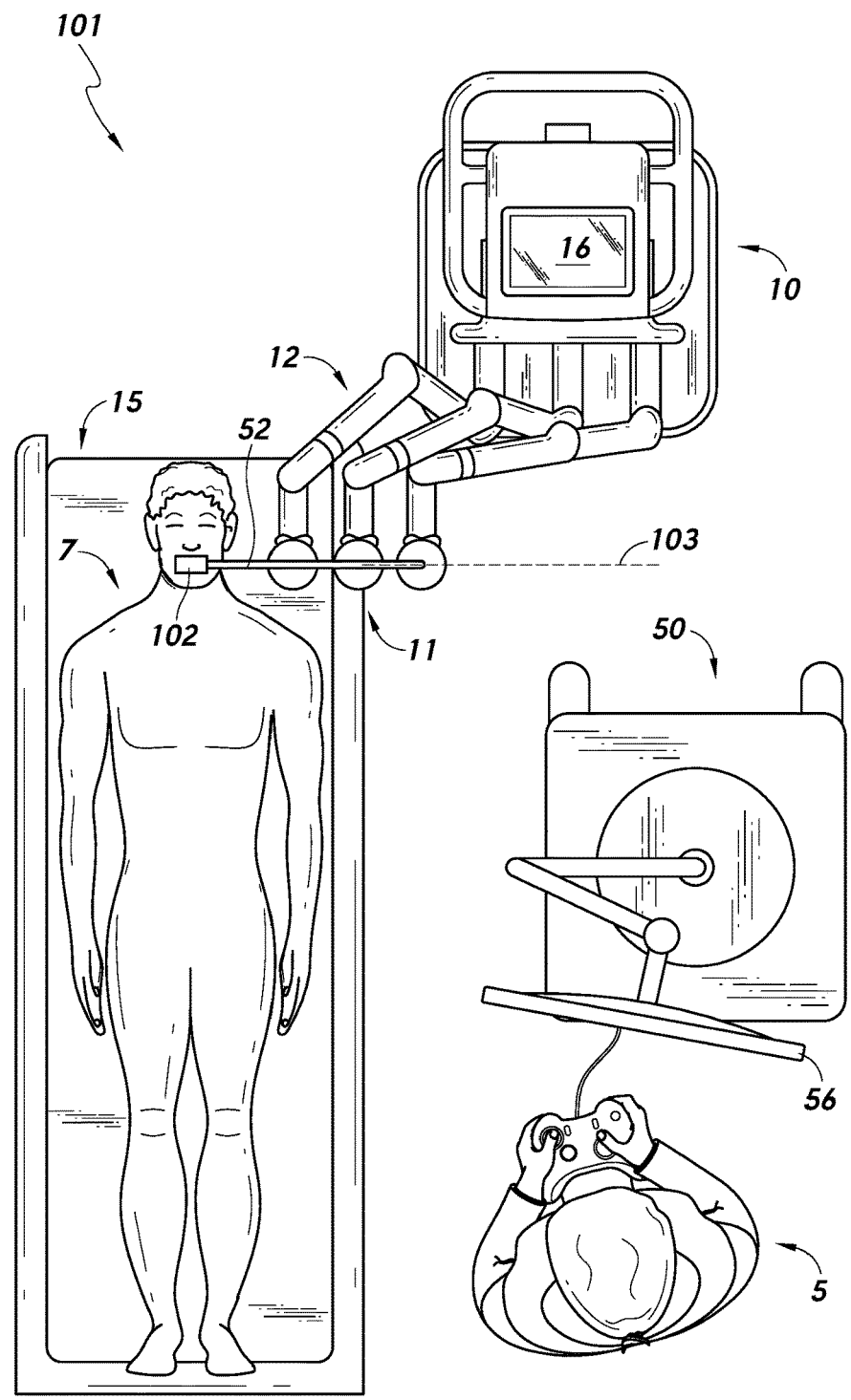
FIG. 2 illustrates a robotic system arranged for diagnostic and/or therapeutic bronchoscopy in accordance with one or more embodiments.

FIG. 2 illustrates a cart-based robotic system 101 arranged for diagnostic and/or therapeutic bronchoscopy in accordance with one or more embodiments. During a bronchoscopy, the arm(s) 12 of the robotic system 10 may be configured to drive a medical instrument, such as a steerable endoscope 52, which may be a procedure-specific bronchoscope for bronchoscopy, through a natural orifice access point (e.g., the mouth of the patient 7 positioned on a table 15 in the present example) to deliver diagnostic and/or therapeutic tools. As shown, the robotic system 10 (e.g., cart) may be positioned proximate to the patient's upper torso in order to provide access to the access point. Similarly, the robotic arms 12 may be actuated to position the bronchoscope 52 relative to the access point. The arrangement in FIG. 2 may also be utilized when performing a gastro-intestinal (GI) procedure with a gastroscope, a specialized endoscope for GI procedures.

Once the robotic system 10 is properly positioned, the robotic arms 12 may insert the steerable endoscope 52 into the patient robotically, manually, or a combination thereof. The steerable endoscope 52 may comprise at least two telescoping parts, such as an inner leader portion and an outer sheath portion, each portion coupled to a separate instrument feeder from the set of instrument feeders 11, each instrument feeder coupled to the distal end of a respective robotic arm 12. This linear arrangement of the instrument feeders 11 creates a "virtual rail" 103 that may be repositioned in space by manipulating the one or more robotic arms 12 into different angles and/or positions. The virtual rails/paths described herein are depicted in the figures using dashed lines that generally do not depict any physical structure of the system. Translation of one or more of the instrument feeders 19 along the virtual rail 103 can advance or retract the endoscope 52 from the patient 7. Additionally or alternatively, implementation of one or more axial drive actuators of one or more of the instrument feeders 11 can cause axial movement of the scope 52.

The endoscope 52 may be directed down the patient's trachea and lungs after insertion using precise commands from the robotic system 10 until reaching the target operative site. The use of separate instrument feeders 19 can allow independent driving of separate portions of the endoscope/assembly 52. For example, the endoscope 52 may be directed to deliver a biopsy needle to a target, such as, for example, a lesion or nodule within the lungs of a patient. The needle may be deployed down a working channel that runs the length of the endoscope to obtain a tissue sample to be analyzed by a pathologist. Depending on the pathology results, additional tools may be deployed down the working channel of the endoscope for additional biopsies. For example, when a nodule is identified as being malignant, the endoscope 52 may endoscopically deliver tools to resect the potentially cancerous tissue. In some instances, diagnostic and therapeutic treatments can be delivered in separate procedures. In those circumstances, the endoscope 52 may also be used to deliver a fiducial to "mark" the location of the target nodule as well. In other instances, diagnostic and therapeutic treatments may be delivered during the same procedure.

In the system 101, a patient introducer 102 is attached to the patient 7 via a port (not shown; e.g., surgical tube). The curvature of the introducer 102 may enable the robotic system 10 to manipulate the instrument 52 from a position that is not in direct axial alignment with the patient-access port, thereby allowing for greater flexibility in the placement of the robotic system 10 within the room. Further, the curvature of the introducer 102 may allow the robotic arms 12 of the robotic system 10 to be substantially horizontally aligned with the patient introducer 102, which may facilitate manual movement of the robotic arm(s) 12 if needed. The control system 50 and/or robotic cart 10 can include control circuitry configured to implement scope speed control/modification based on a present position of the scope 52 or portion thereof in accordance with inventive concepts disclosed herein.

Figure 3:
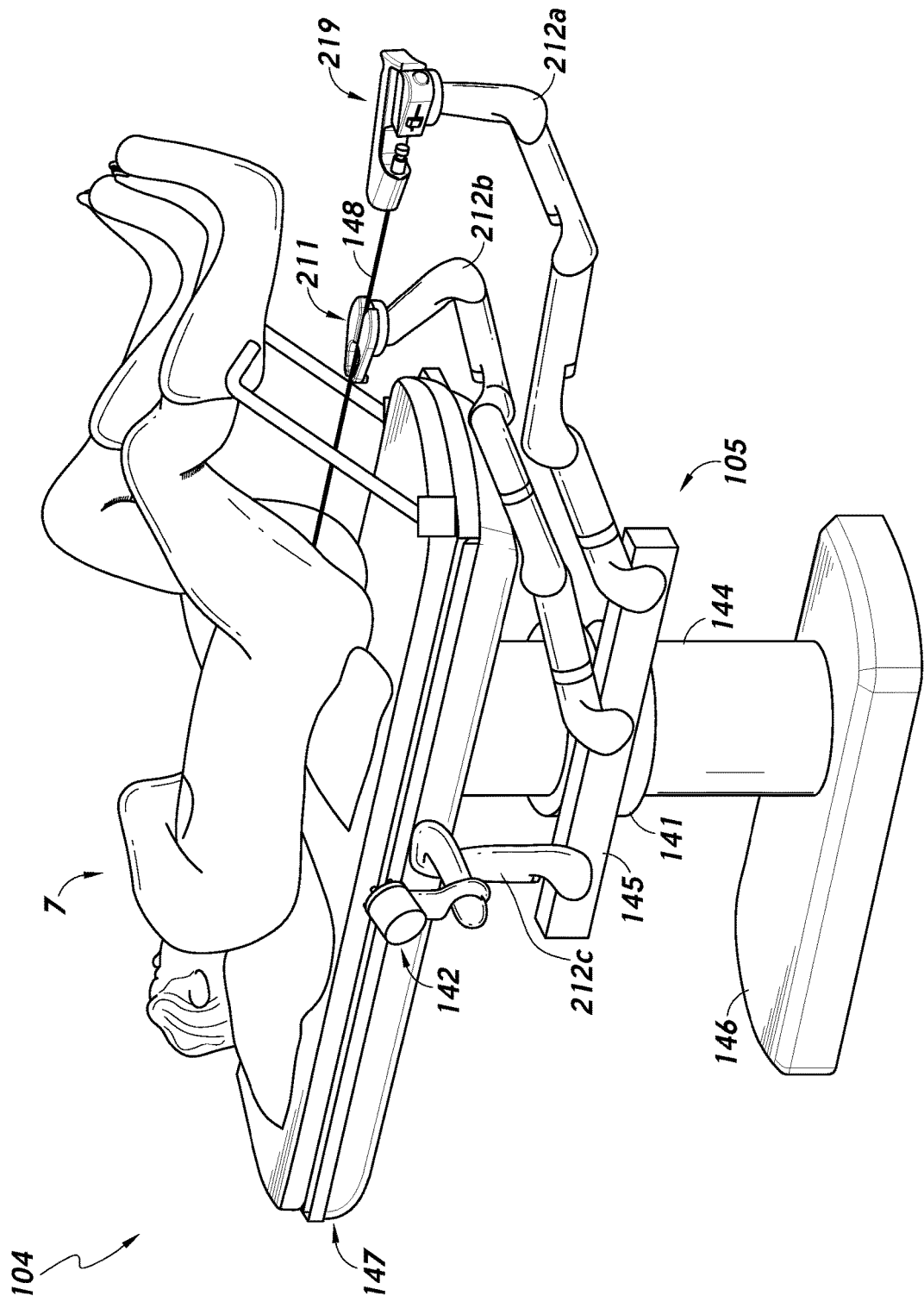
FIG. 3 illustrates a table-based robotic system in accordance with one or more embodiments.

FIG. 3 illustrates a table-based robotic system 104 in accordance with one or more embodiments of the present disclosure. The system 104 incorporates robotic components 105 with a table 147, thereby allowing for a reduced amount of capital equipment within the operating room compared to some cart-based robotic systems, which can allow greater access to the patient 7 in some instances. Much like in the cart-based systems, the instrument device manipulator assemblies associated with the robotic arms 212 of the system 104 may generally comprise instruments and/or instrument feeders that are designed to manipulate an elongated medical instrument, such as a catheter or the like, along a virtual rail or path.

As shown, the robotic-enabled table system 104 can include a column 144 coupled to one or more carriages 141 (e.g., ring-shaped movable structures), from which the one or more robotic arms 212 may emanate. The carriage(s) 141 may translate along a vertical column interface that runs at least a portion of the length of the column 144 to provide different vantage points from which the robotic arms 212 may be positioned to reach the patient 7. The carriage(s) 141 may rotate around the column 144 in some embodiments using a mechanical motor positioned within the column 144 to allow the robotic arms 212 to have access to multiples sides of the table 104. Rotation and/or translation of the carriage(s) 141 can allow the system 104 to align the medical instruments, such as endoscopes and catheters, into different access points on the patient. By providing vertical adjustment, the robotic arms 212 can advantageously be configured to be stowed compactly beneath the platform 147 of the table system 104 and subsequently raised during a procedure.

The robotic arms 212 may be mounted on the carriage(s) 141 through one or more arm mounts 145, which may comprise a series of joints that may individually rotate and/or telescopically extend to provide additional configurability to the robotic arms 212. The column 144 structurally provides support for the table platform 147 and a path for vertical translation of the carriage(s) 141. The column 144 may also convey power and control signals to the carriage(s) 141 and/or the robotic arms 212 mounted thereon. The system 104 can include certain control circuitry configured to control axial driving of the instrument 148 using the instrument feeder 211, which may be coupled to an end effector of one of the arms 212, wherein the instrument feeder 211 is controlled to automatically modify axial driving speed with respect to the elongate instrument (e.g., endoscope) 148 based on a determined position of a distal end of the instrument 148. For example, when the distal end of the instrument 148 is positioned at a predetermined automatic pause location, the instrument feeder 211 can be controlled/driven to automatically pause/stop axial retraction to allow for specimen collection, as described in detail herein.

The term "end effector" is used herein according to its broad and ordinary meaning and may refer to any type of robotic manipulator device, component, and/or assembly. Where an adapter, such as a sterile adapter, is coupled to a robotic end effector or other robotic manipulator, the term "end effector" may refer to the adapter (e.g., sterile adapter), or any other robotic manipulator device, component, or assembly associated with and/or coupled to the end effector. In some contexts, the combination of a robotic end effector and adapter may be referred to as an instrument manipulator assembly, wherein such assembly may or may not also include a medical instrument (or instrument handle/base) physically coupled to the adapter and/or end effector. The terms "robotic manipulator" and "robotic manipulator assembly" are used according to their broad and ordinary meanings, and may refer to a robotic end effector and/or sterile adapter or other adapter component coupled to the end effector, either collectively or individually. For example, "robotic manipulator" or "robotic manipulator assembly" may refer to an instrument device manipulator (IDM) including one or more drive outputs, whether embodied in a robotic end effector, sterile adapter, and/or other component(s). The terms "robotic manipulator" and "robotic manipulator assembly" can further refer to a robotic arm or other robotic translator associated with an end effector. The term "end effector," as used herein, can be understood to refer to any type of robotic manipulator.

With reference to FIGS. 1-3 and FIG. 4, which shows an example embodiment of the control systems of any of FIGS. 1-3, the relevant control system 50 can be configured to provide various functionality to assist in performing a medical procedure. In some embodiments, the control system 50 can be coupled to the robotic system 10 and operate in cooperation therewith to perform a medical procedure on the patient 7. For example, the control system 50 can communicate with the robotic system 10 via a wireless or wired connection (e.g., to control the robotic system 10). Further, in some embodiments, the control system 50 can communicate with the robotic system 10 to receive position data therefrom relating to the position of the distal end of the scope 40, access sheath 90, or basketing device 30. Such positional data relating to the position of the scope 40, access sheath 90, or basketing device 30 may be derived using one or more electromagnetic sensors associated with the respective components, scope image processing functionality, and/or based at least in part on robotic system data (e.g., arm position data, known parameters/dimensions of the various system components, etc.). Moreover, in some embodiments, the control system 50 can communicate with the table 15 to position the table 15 in a particular orientation or otherwise control the table 15. In some embodiments, the control system 50 can communicate with the EM field generator 18 to control generation of an EM field in an area around the patient 7 and/or around the instrument feeder 11.

Figure 4:
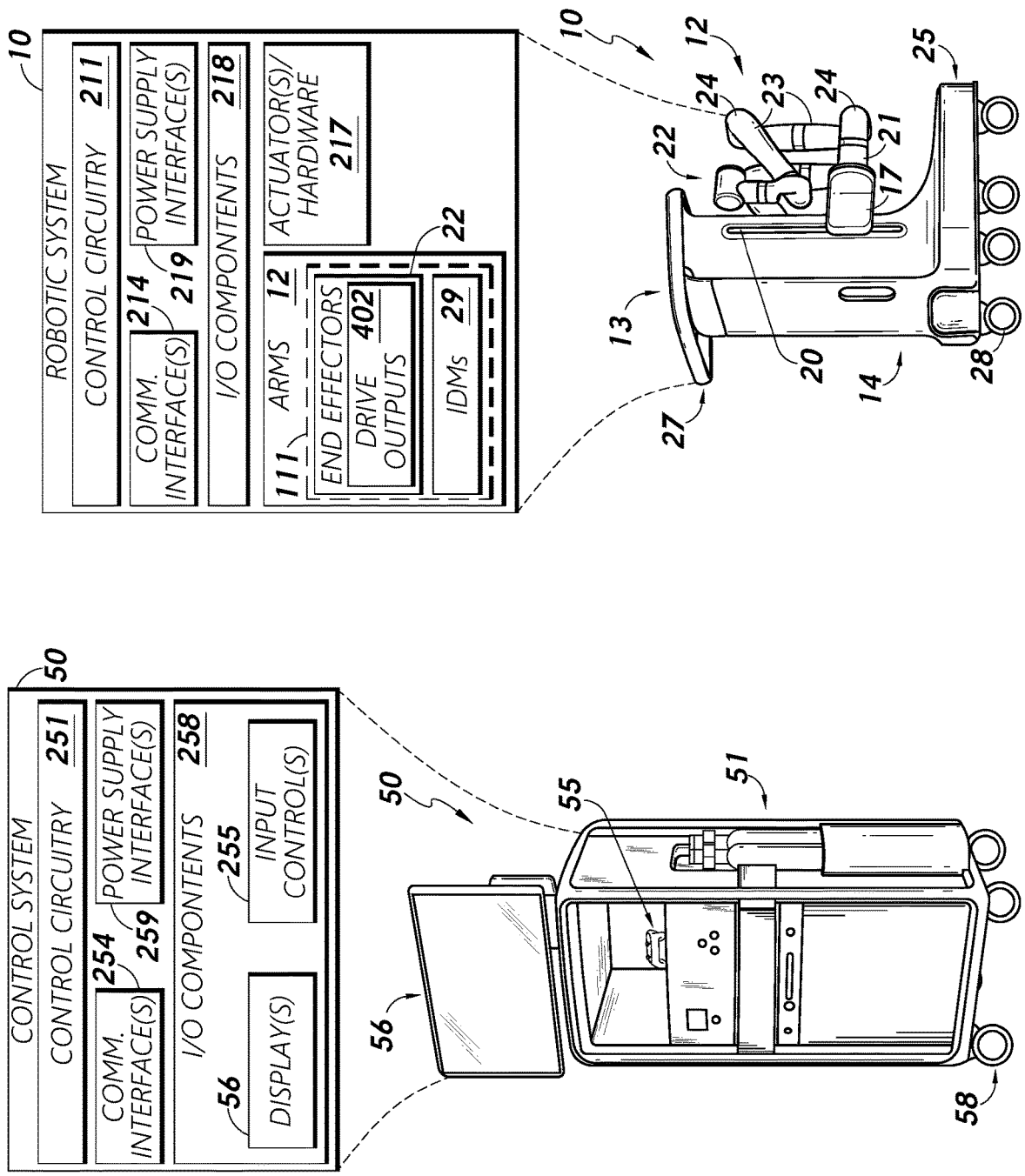
FIG. 4 illustrates medical system components that may be implemented in any of the medical systems of FIGS. 1-3 in accordance with one or more embodiments.

FIG. 4 further shows example embodiments of the robotic systems of any of FIGS. 1-3. The robotic system 10 can be configured to at least partly facilitate execution of a medical procedure. The robotic system 10 can be arranged in a variety of ways depending on the particular procedure. The robotic system 10 can include one or more robotic arms 12 configured to engage with and/or control, for example, the scope 40 and/or the basketing system 30 to perform one or more aspects of a procedure. As shown, each robotic arm 12 can include multiple arm segments 23 coupled to joints 24, which can provide multiple degrees of movement/freedom. In the example of FIG. 1, the robotic system 10 is positioned proximate to the patient's legs and the robotic arms 12 are actuated to engage with and position the scope 40 for access into an access opening, such as the urethra 65 of the patient 7. When the robotic system 10 is properly positioned, the scope 40 can be inserted into the patient 7 robotically using the robotic arms 12, manually by the physician 5, or a combination thereof. A scope-driver instrument coupling 11 (i.e., instrument device manipulator (IDM)) can be attached to the distal end effector 22 of one of the arms 12b to facilitate robotic control/advancement of the scope 40. Another 12a of the arms may have associated therewith an instrument coupling/manipulator 19 that is configured to facilitate advancement and operation of the basketing device 30. The instrument coupling 19 may further provide a handle 31 for the scope 40, wherein the scope 40 is physically coupled to the handle 31 at a proximal end of the scope 40. The scope 40 may include one or more working channels through which additional tools, such as lithotripters, basketing devices, forceps, etc., can be introduced into the treatment site.

The robotic system 10 can be coupled to any component of the medical system 100, such as to the control system 50, the table 15, the EM field generator 18, the scope 40, the basketing system 30, and/or any type of percutaneous-access instrument (e.g., needle, catheter, nephroscope, etc.). In some embodiments, the robotic system 10 is communicatively coupled to the control system 50. For example, the robotic system 10 may be configured to receive control signals from the control system 50 to perform certain operations, such as to position one or more of the robotic arms 12 in a particular manner, manipulate the scope 40, manipulate the basketing system 30, and so on. In response, the robotic system 10 can control, using certain control circuitry 211, actuators 217, and/or other components of the robotic system 10, a component of the robotic system 10 to perform the operations. For example, the control circuitry 211 may control axial motion of the scope 40 by actuating drive output(s) 402 of the end effector 22 coupled to the instrument feeder 11. In some embodiments, the robotic system 10 and/or control system 50 is/are configured to receive images and/or image data from the scope 40 representing internal anatomy of the patient 7 and/or portions of the access sheath or other device components.

The robotic system 10 generally includes an elongated support structure 14 (also referred to as a "column"), a robotic system base 25, and a console 13 at the top of the column 14. The column 14 may include one or more arm supports 17 (also referred to as a "carriage") for supporting the deployment of the one or more robotic arms 12 (three shown in FIG. 1). The arm support 17 may include individually-configurable arm mounts that rotate along a perpendicular axis to adjust the base of the robotic arms 12 for desired positioning relative to the patient.

The arm support 17 may be configured to vertically translate along the column 14. In some embodiments, the arm support 17 can be connected to the column 14 through slots 20 that are positioned on opposite sides of the column 14 to guide the vertical translation of the arm support 17. The slot 20 contains a vertical translation interface to position and hold the arm support 17 at various vertical heights relative to the robotic system base 25. Vertical translation of the arm support 17 allows the robotic system 10 to adjust the reach of the robotic arms 12 to meet a variety of table heights, patient sizes, and physician preferences. Similarly, the individually-configurable arm mounts on the arm support 17 can allow the robotic arm base 21 of robotic arms 12 to be angled in a variety of configurations.

The robotic arms 12 may generally comprise robotic arm bases 21 and end effectors 22, separated by a series of linking arm segments 23 that are connected by a series of joints 24, each joint comprising one or more independent actuators 217. Each actuator may comprise an independently-controllable motor. Each independently-controllable joint 24 can provide or represent an independent degree of freedom available to the robotic arm. In some embodiments, each of the arms 12 has seven joints, and thus provides seven degrees of freedom, including "redundant" degrees of freedom. Redundant degrees of freedom allow the robotic arms 12 to position their respective end effectors 22 at a specific position, orientation, and trajectory in space using different linkage positions and joint angles. This allows for the system to position and direct a medical instrument from a desired point in space while allowing the physician to move the arm joints into a clinically advantageous position away from the patient to create greater access, while avoiding arm collisions.

The robotic system base 25 balances the weight of the column 14, arm support 17, and arms 12 over the floor. Accordingly, the robotic system base 25 may house certain relatively heavier components, such as electronics, motors, power supply, as well as components that selectively enable movement or immobilize the robotic system. For example, the robotic system base 25 can include wheel-shaped casters 28 that allow for the robotic system to easily move around the operating room prior to a procedure. After reaching the appropriate position, the casters 28 may be immobilized using wheel locks to hold the robotic system 10 in place during the procedure.

Positioned at the upper end of column 14, the console 13 can provide both a user interface for receiving user input and a display screen 16 (or a dual-purpose device such as, for example, a touchscreen) to provide the physician/user with both pre-operative and intra-operative data. Potential pre-operative data on the console/display 16 or display 56 may include pre-operative plans, navigation and mapping data derived from pre-operative computerized tomography (CT) scans, and/or notes from pre-operative patient interviews. Intra-operative data on display may include optical information provided from the tool, sensor and coordinate information from sensors, as well as vital patient statistics, such as respiration, heart rate, and/or pulse. The console 13 may be positioned and tilted to allow a physician to access the console from the side of the column 14 opposite arm support 17. From this position, the physician may view the console 13, robotic arms 12, and patient while operating the console 13 from behind the robotic system 10. As shown, the console 13 can also include a handle 27 to assist with maneuvering and stabilizing the robotic system 10.

The end effector 22 of each of the robotic arms 12 may comprise, or be configured to have coupled thereto, an instrument device manipulator (IDM) 29, which may be attached using a sterile adapter component in some instances. The combination of the end effector 22 and associated IDM, as well as any intervening mechanics or couplings (e.g., sterile adapter), can be referred to as a manipulator assembly 111. In some embodiments, the IDM 29 can be removed and replaced with a different type of IDM, for example, a first type 11 of IDM may be configured to manipulate an endoscope, while a second type 19 of IDM may manipulate a basketing device and/or support a proximal end of the endoscope. Another type of IDM may be configured to hold an electromagnetic field generator 18. An IDM can provide power and control interfaces. For example, the interfaces can include connectors to transfer pneumatic pressure, electrical power, electrical signals, and/or optical signals from the robotic arm 12 to the IDM. The IDMs 29 may be configured to manipulate medical instruments (e.g., surgical tools/instruments), such as the scope 40, using techniques including, for example, direct drives, harmonic drives, geared drives, belts and pulleys, magnetic drives, and the like. In some embodiments, the device manipulators 29 can be attached to respective ones of the robotic arms 12, wherein the robotic arms 12 are configured to insert or retract the respective coupled medical instruments into or out of the treatment site.

As referenced above, the system 100 can include certain control circuitry configured to perform certain of the functionality described herein, including the control circuitry 211 of the robotic system 10 and the control circuitry 251 of the control system 50. That is, the control circuitry of the systems 100, 101, 104 may be part of the robotic system 10, the control system 50, or some combination thereof. Therefore, any reference herein to control circuitry may refer to circuitry embodied in a robotic system, a control system, or any other component of a medical system, such as the medical systems 100, 101, and 104 shown in FIGS. 1-3, respectively. The term "control circuitry" is used herein according to its broad and ordinary meaning, and may refer to any collection of processors, processing circuitry, processing modules/units, chips, dies (e.g., semiconductor dies including one or more active and/or passive devices and/or connectivity circuitry), microprocessors, micro-controllers, digital signal processors, microcomputers, central processing units, field-programmable gate arrays, programmable logic devices, state machines (e.g., hardware state machines), logic circuitry, analog circuitry, digital circuitry, and/or any device that manipulates signals (analog and/or digital) based on hard coding of the circuitry and/or operational instructions. Control circuitry referenced herein may further include one or more circuit substrates (e.g., printed circuit boards), conductive traces and vias, and/or mounting pads, connectors, and/or components. Control circuitry referenced herein may further comprise one or more storage devices, which may be embodied in a single memory device, a plurality of memory devices, and/or embedded circuitry of a device. Such data storage may comprise read-only memory, random access memory, volatile memory, nonvolatile memory, static memory, dynamic memory, flash memory, cache memory, data storage registers, and/or any device that stores digital information. It should be noted that in embodiments in which control circuitry comprises a hardware and/or software state machine, analog circuitry, digital circuitry, and/or logic circuitry, data storage device(s)/register(s) storing any associated operational instructions may be embedded within, or external to, the circuitry comprising the state machine, analog circuitry, digital circuitry, and/or logic circuitry.

The control circuitry 211, 251 may comprise computer-readable media storing, and/or configured to store, hard-coded and/or operational instructions corresponding to at least some of the steps and/or functions illustrated in one or more of the present figures and/or described herein. Such computer-readable media can be included in an article of manufacture in some instances. The control circuitry 211/251 may be entirely locally maintained/disposed or may be remotely located at least in part (e.g., communicatively coupled indirectly via a local area network and/or a wide area network). Any of the control circuitry 211, 251 may be configured to perform any aspect(s) of the various processes disclosed herein, including the processes shown in FIGS. 12 and 13, as described below.

With respect to the robotic system 10, at least a portion of the control circuitry 211 may be integrated with the base 25, column 14, and/or console 13 of the robotic system 10, and/or another system communicatively coupled to the robotic system 10. With respect to the control system 50, at least a portion of the control circuitry 251 may be integrated with the console base 51 and/or display unit 56 of the control system 50. It should be understood that any description herein of functional control circuitry or associated functionality may be understood to be embodied in the robotic system 10, the control system 50, or any combination thereof, and/or at least in part in one or more other local or remote systems/devices.

With further reference to FIG. 4, the control system 50 can include various I/O components 258 configured to assist the physician 5 or others in performing a medical procedure. For example, the input/output (I/O) components 258 can be configured to allow for user input to control/navigate the scope 40 and/or basketing system within the patient 7. In some embodiments, for example, the physician 5 can provide input to the control system 50 and/or robotic system 10, wherein in response to such input, control signals can be sent to the robotic system 10 to manipulate the scope 40 and/or catheter basketing system 30. The control system 50 can include one or more display devices 56 to provide various information regarding a procedure. For example, the display(s) 56 can provide information regarding the scope 40 and/or basketing system 30. For example, the control system 50 can receive real-time images that are captured by the scope 40 and display the real-time images via the display(s) 56. Additionally or alternatively, the control system 50 can receive signals (e.g., analog, digital, electrical, acoustic/sonic, pneumatic, tactile, hydraulic, etc.) from a medical monitor and/or a sensor associated with the patient 7, and the display(s) 56 can present information regarding the health or environment of the patient 7. Such information can include information that is displayed via a medical monitor including, for example, information relating to heart rate (e.g., ECG, HRV, etc.), blood pressure/rate, muscle bio-signals (e.g., EMG), body temperature, blood oxygen saturation (e.g., $SpO_2$), $CO_2$, brainwaves (e.g., EEG), environmental and/or local or core body temperature, and so on.

To facilitate the functionality of the control system 50, the control system can include various components (sometimes referred to as "subsystems"). For example, the control system 50 can include the control electronics/circuitry 251, as well as one or more power supplies/supply interfaces 259, pneumatic devices, optical sources, actuators, data storage devices, and/or communication interfaces 254. In some embodiments, the control system 50 is movable, while in other embodiments, the control system 50 is a substantially stationary system. Although various functionality and components are discussed as being implemented by the control system 50, any of such functionality and/or components can be integrated into and/or performed by other systems and/or devices, such as the robotic system 10, the basketing system 30, the table 15, and/or others, for example.

With further reference to FIG. 1, the medical system 100 can provide a variety of benefits, such as providing guidance to assist a physician in performing a procedure (e.g., instrument tracking, instrument alignment information, etc.), enabling a physician to perform a procedure from an ergonomic position without the need for awkward arm motions and/or positions, enabling a single physician to perform a procedure with one or more medical instruments, avoiding radiation exposure (e.g., associated with fluoroscopy techniques), enabling a procedure to be performed in a single operative setting, providing continuous suction to remove an object more efficiently (e.g., to remove a kidney stone), and so on. For example, the medical system 100 can provide guidance information to assist a physician in using various medical instruments to access a target anatomical feature while minimizing bleeding and/or damage to anatomy (e.g., critical organs, blood vessels, etc.). Further, the medical system 100 can provide non-radiation-based navigational and/or localization techniques to reduce physician and patient exposure to radiation and/or reduce the amount of equipment in the operating room. Moreover, the medical system 100 can provide functionality that is distributed between the control system 50 and the robotic system 10, which may be independently movable. Such distribution of functionality and/or mobility can enable the control system 50 and/or the robotic system 10 to be placed at locations that are optimal for a particular medical procedure, which can maximize working area around the patient 7 and/or provide an optimized location for the physician 5 to perform a procedure.

The various components of the system 100 can be communicatively coupled to each other over a network, which can include a wireless and/or wired network. Example networks include one or more personal area networks (PANs), local area networks (LANs), wide area networks (WANs), Internet area networks (IANs), cellular networks, the Internet, personal area networks (PANs), body area network (BANs), etc. For example, the various communication interfaces of the systems of FIG. 4 can be configured to communicate with one or more device/sensors/systems, such as over a wireless and/or wired network connection. In some embodiments, the various communication interfaces can implement a wireless technology such as Bluetooth, Wi-Fi, near-field communication (NFC), or the like. Furthermore, in some embodiments, the various components of the system 100 can be connected for data communication, fluid exchange, power exchange, and so on via one or more support cables, tubes, or the like.

The control system 50, basketing system 30 (see FIG. 5), and/or robotic system 10 can include certain user controls (e.g., controls 55), which may comprise any type of user input (and/or output) devices or device interfaces, such as one or more buttons, keys, joysticks, handheld controllers (e.g., video-game-type controllers), computer mice, trackpads, trackballs, control pads, and/or sensors (e.g., motion sensors or cameras) that capture hand gestures and finger gestures, touchscreens, and/or interfaces/connectors therefore. Such user controls are communicatively and/or physically coupled to respective control circuitry.

In some embodiments, a user can manually manipulate a robotic arm 12 of the robotic system 10 without using electronic user controls. For example, during setup in a surgical operating room, a user may move the robotic arms 12 and/or any other medical instruments to provide desired access to a patient. The robotic system 10 may rely on force feedback and inertia control from the user to determine appropriate configuration of the robotic arms 12 and associated instrumentation.

Figure 5:
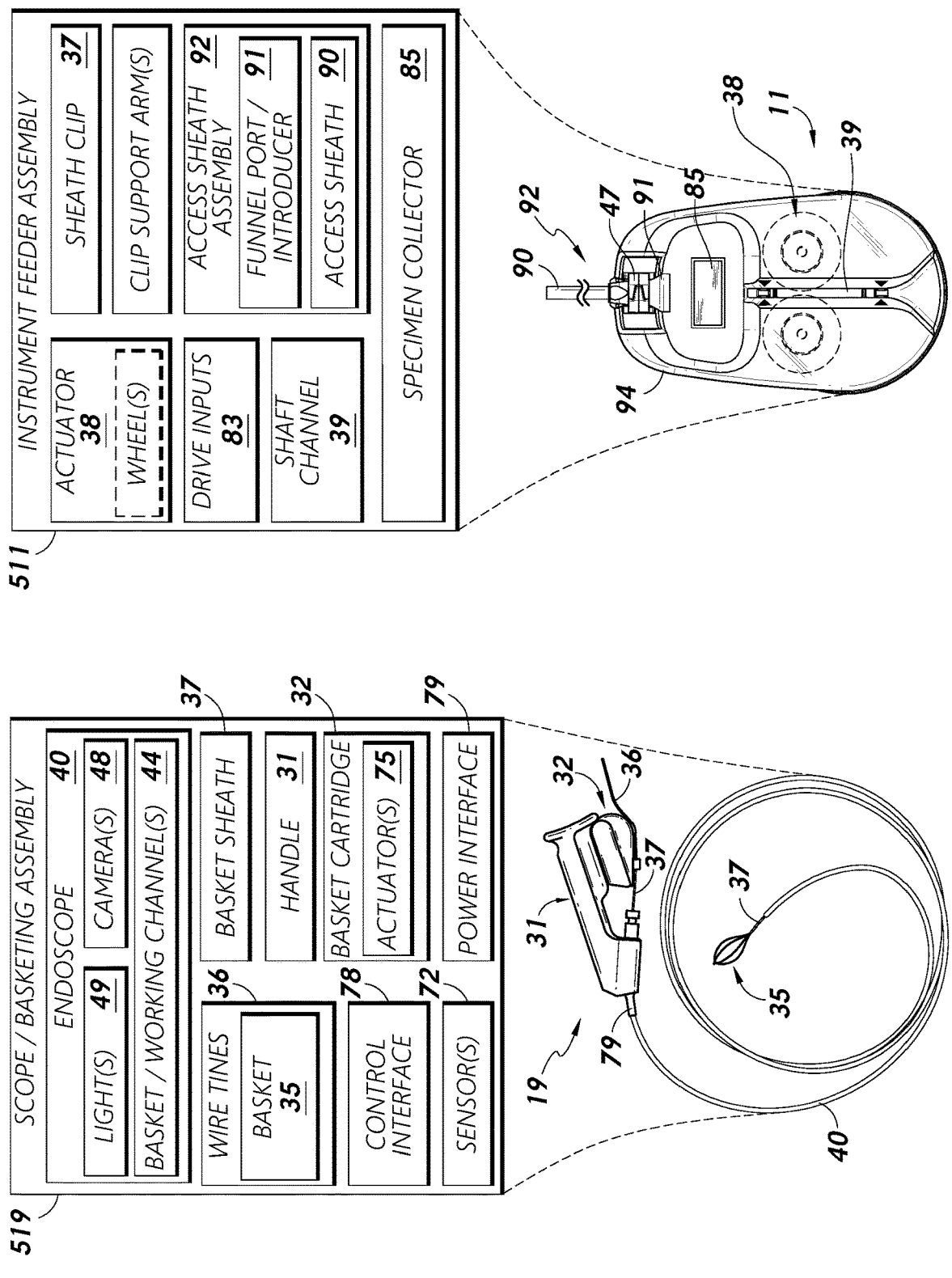
FIG. 5 illustrates medical system components that may be implemented in any of the medical systems of FIGS. 1-3 in accordance with one or more embodiments.

FIG. 5 illustrates medical system components, including a scope and/or basketing assembly 519 and an instrument feeder assembly 511, that may be implemented in any of the medical systems of FIGS. 1-3 in accordance with one or more embodiments. The scope/basket system 519 comprises various hardware and control components. In some embodiments, the scope/basket system 519 includes handle 31 coupled to an endoscope 40. For example, the endoscope (i.e., scope) can include an elongate shaft including one or more lights 49 and one or more cameras or other imaging devices 48. The scope 40 can further include one or more working channels 44, which may run a length of the scope 40. In some embodiments, such channel(s) may be utilized to provide access for elongate basketing wires/tines through the scope 40.

The scope/basket system 519 can comprise a basket 35 formed of one or more wire tines 36. For example, the basketing system 30 may comprise four wire tines disposed within a basketing sheath 37 over a length thereof, wherein the tines project from a distal end of the sheath 37 to form the basket form 35. The tines 36 further extend from the proximal end of the sheath 37. The tines 36 may be configured to be slidable within the basketing sheath 37, subject to some amount of frictional resistance. The tines 36 and the sheath 37 can be coupled to respective actuators 75 of a basket cartridge component 32. The basket cartridge 32 may be physically and/or communicatively coupled to the handle portion/component 31 of the scope/basket system 519. The handle component 31 can be configured to be used to assist in basketing and/or scope control either manually or through robotic control.

The scope/basket system 519 can be powered through a power interface 79 and/or controlled through a control interface 78, each or both of which may interface with a robotic arm/component of the robotic system 10. The scope/basket system 519 may further comprise one or more sensors 72, such as pressure and/or other force-reading sensors, which may be configured to generate signals indicating forces experienced at/by one or more of the actuators 75 and/or other couplings of the scope/basket system 519. Such sensor readings may be used to determine stuck basket conditions, as described in detail herein.

FIG. 5 further illustrates an instrument feeder/driver assembly 511 including an instrument feeder/driver 11 and an access sheath assembly 92, which may be physically coupled to the instrument feeder 11. The terms "feeder" and "driver" are used in some contexts herein substantially interchangeably. Therefore, references herein to a scope or instrument feeder can be understood to refer to any type of scope or instrument driver, and vice versa, wherein such devices/systems are configured to actuate, or cause actuation of, a shaft-type instrument in an axial dimension. The instrument feeder assembly 511 can include a channel 39 dimensioned and/or configured for placement therein of at least a portion of a shaft-type instrument, such as an endoscope or the like. For example, when placing a scope or the like to allow for the instrument feeder 11 to axially drive such instrument, the instrument may be nested at least partially within the channel 39. Although illustrated with a channel 39, in some embodiments, instrument feeder devices and assemblies in accordance with aspects of the present disclosure may not include such a channel.

The actuator 38 may comprise a feed-roller in some embodiments. As used herein, the term "feed-roller" may include any number of roller(s)/wheel(s) configured to effect axial movement of a shaft engaged therewith. "Feed-roller" may further include the shaft channel 39, as well as any input or output drives associated with the instrument feeder 11 that cause, directly or indirectly, movement of the roller(s)/wheel(s).

In some embodiments, the access sheath 92 is not docked to the instrument feeder 11, but rather coupled to a robot arm, a stand, or other structure. Although certain embodiments described herein refer to access sheath assemblies including port/introducer structure and sheath components, it should be understood that embodiments of the present disclosure may implement access sheaths that have integrated port and sheath components. Therefore, references herein to an "access sheath," or simply "sheath," may refer to a sheath portion, port portion, or both, of an access sheath/assembly. That is, references herein to any component or portion of an access sheath assembly can be understood to refer to a sheath portion/component, a port/introducer portion/component, or both. Furthermore, access sheath assemblies described herein may be a unitary device, form, or structure, rather than an assembly of separate components.

The instrument feeder assembly 511 further includes an axial actuator means or mechanism 38, which may comprise one or more shaft-engagement wheels, conveyor belts, gears, tracks, or other actuator(s). The actuator 38 is configured to cause a shaft-type instrument placed in engagement therewith to be moved with respect to an axis of the instrument. The actuator(s) 38 can be controlled through engagement with one or more drive inputs 83, which may allow for physical engagement with mechanical components of the instrument feeder 11 that actuate the actuator means/mechanism 38 and/or may directly actuate the actuator means/mechanism 38.

The instrument feeder assembly 511 further includes a sheath clip 47, which may be associated with the instrument feeder 11 and configured to secure or hold in place at least a portion of the access sheath assembly 92. For example, the clip 47 may be configured to clamp on or over at least a portion of a funnel port structure 91 of the access sheath assembly 92, as shown. The access sheath assembly 92 includes an access sheath tube or conduit 90, which may be physically coupled at a proximal end thereof to the funnel port structure 91, which may provide an at least partially conical introducer opening into the access sheath 90, wherein a proximal opening of the port 91 has an area or diameter greater than the cross-sectional area or diameter of the access sheath 90. The clip 47 may be supported by one or more clip support arms 94.

In some embodiments, the instrument feeder assembly 511 includes a specimen collector structure 85, which may be secured at least in part to one or more components of the instrument feeder assembly 511 and/or instrument feeder 11. The specimen collector 85 may comprise a cup-like or other structure configured to allow for placement or dropping therein of a kidney stone or other specimen or debris retracted through the access sheath assembly 92. In some embodiments, the specimen collector 85 is disposed between the distal opening of the channel 39 and the funnel port structure 91, wherein the instrument may be retracted to a position over the specimen collector such that the stone/specimen may be dropped or placed in the specimen collector 85.

Scope/Feeder Control

Figure 6:
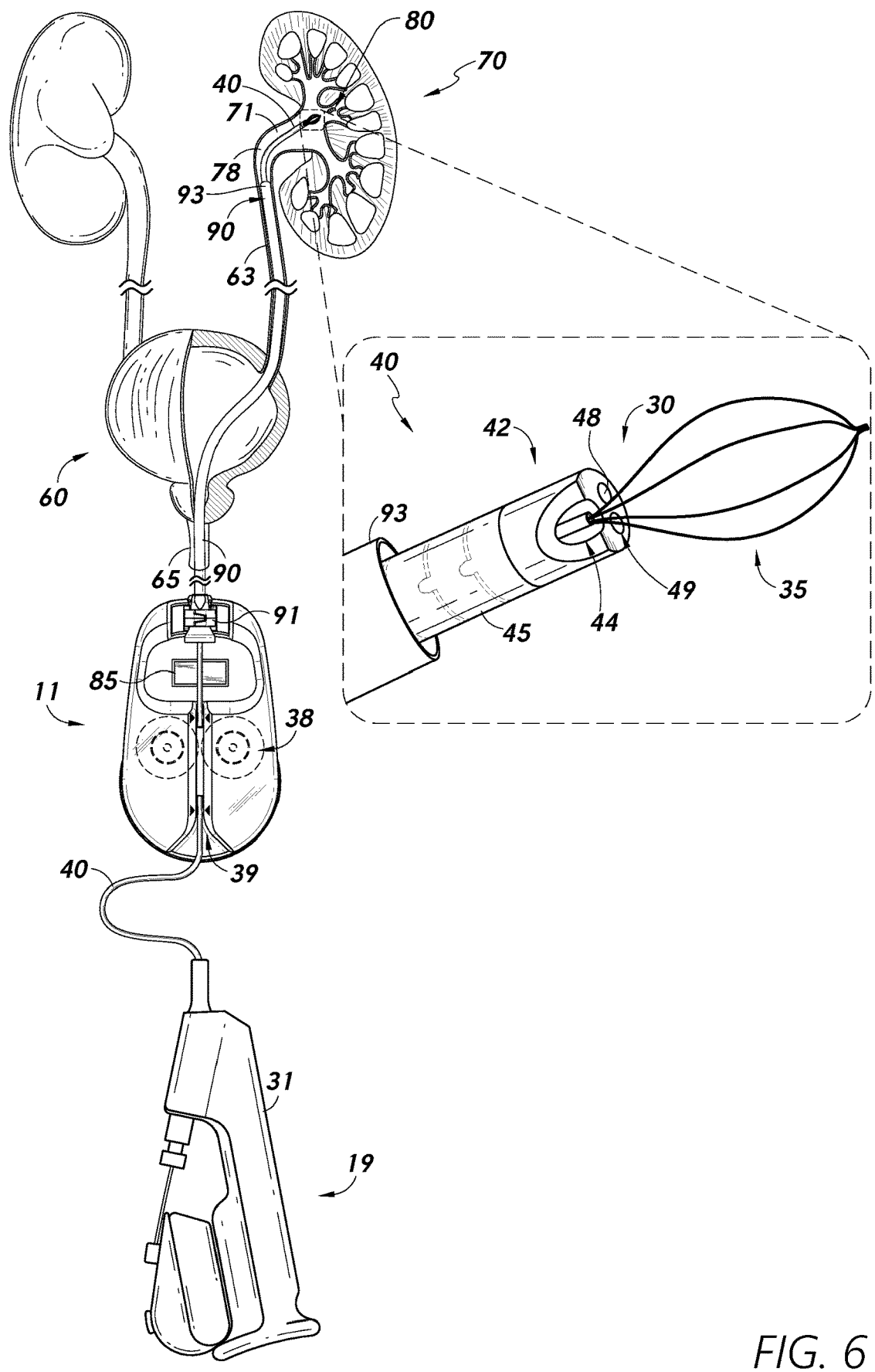
FIG. 6 illustrates a ureteroscope including a basketing device in a working channel thereof disposed in portions of the urinary system of a patient and in a driving engagement with an instrument feeder in accordance with one or more embodiments.

FIG. 6 illustrates a ureteroscope 40 including a basketing device 30 in a working channel thereof disposed in portions of the urinary system of a patient in accordance with one or more embodiments. As referenced above, ureteroscopic procedures can be implemented for investigating abnormalities in human ureters and/or treating the same. For example, ureteroscope procedures can be implemented to treat and/or remove kidney stones. Such procedures may be implemented manually at least in part and/or may be performed using robotic technologies at least in part. For example, use of robotic devices and/or systems for certain endoscopic procedures can provide relatively greater precision, control, and/or coordination compared to strictly manual procedures. In some embodiments, the scope 40 includes a working channel 44 for deploying a basketing device 30 (e.g., basket component 35) to an operative region at a distal end of the scope.

The access sheath 90 through which the scope 40 is passed to access the target anatomy can advantageously have a diameter sufficient to have the scope 40 drawn therethrough, in addition to an object captured in the basket 35 when the object/stone is not too large in size. The access sheath 90 may be advanced through the ureter 63 to a position near the renal pelvis 71 and/or ureteropelvic junction 71. The distal end of the access sheath 90 may be parked at a position in the ureter 63 and/or renal pelvis 71, wherein such parking position may be at least partially anatomy-dependent. That is, the access sheath 90 may be placed as far into the renal anatomy as possible, as permitted by the urinary tract path, which may be somewhat tortuous in certain portions thereof. Generally, the access sheath 90 may not be articulable to the degree that the scope 40 can be articulated, and therefore it may not be practical to navigate/drive the access sheath 90 into the kidney.

The scope 40 can be articulable, such as with respect to at least a distal portion of the scope, so that the scope can be steered within the human anatomy. In some embodiments, the scope 40 is configured to be articulated with, for example, five degrees of freedom, including XYZ coordinate movement, as well as pitch and yaw. In some embodiments, the scope 40 is articulatable with six degrees of freedom, including XYZ coordinate movement, as well as pitch, yaw, and roll. Certain position sensor(s) (e.g., electromagnetic sensors) of the scope 40, where implemented, may likewise have similar degrees of freedom with respect to the positional information they generate/provide. Position sensor data disclosed herein can include data generated by/using an electromagnetic position sensor positioned at a distal end of an elongate shaft or a fiber optic shape sensor disposed within at least a portion of an elongate shaft.

For robotic implementations, robotic arms of a robotic system can be configured/configurable to manipulate the scope 40. For example, an instrument device manipulator can be coupled to an end effector of a robot arm and can manipulate the scope 40 using elongate movement members. The elongate movement members may include one or more pull wires (e.g., pull or push wires), cables, fibers, and/or flexible shafts. For example, the robotic arms may be configured to actuate multiple pull wires (not shown) coupled to the scope 40 to deflect the tip 42 of the scope 40. Pull wires may include any suitable or desirable materials, such as metallic and non-metallic materials such as stainless steel, Kevlar, tungsten, carbon fiber, and the like. In some embodiments, the scope 40 is configured to exhibit nonlinear behavior in response to forces applied by the elongate movement members. The nonlinear behavior may be based on stiffness and compressibility of the scope, as well as variability in slack or stiffness between different elongate movement members.

In embodiments including an endoscope-type instrument 19 (e.g., including a handle 31 and elongate shaft 40), as in FIG. 6, the basket 35 can be considered the distal end of the instrument 19. For example, references herein to the distal end of a scope instrument can refer to the distal end of the scope shaft, the distal end of a basket or basketing instrument projecting from the distal end of the scope shaft, the distal end of a combined scope shaft and basketing instrument, or a distal end of any other type of instrument or tool associated with the scope/shaft and/or projecting therefrom and/or disposed within a working channel thereof.

The scope (e.g., endoscope/ureteroscope) 40 may comprise a tubular and flexible medical shaft/instrument that is configured to be inserted into the anatomy of a patient to capture images of the anatomy and to perform certain tasks using one or more working channels thereof. In some embodiments, the scope 40 can accommodate wires and/or optical fibers to transfer signals to/from an optical assembly and a distal end 42 of the scope 40, which can include an imaging device 48, such as an optical camera. The scope 40 can further include a light source 49, such as an LED or fiber-optic light source/lens.

The camera/imaging device 48 can be used to capture images of an internal anatomical space, such as internal calyces of the kidney 70. The scope 40 may further be configured to accommodate optical fibers to carry light from proximately-located light sources, such as light-emitting diodes, to the distal end 42 of the scope. The distal end 42 of the scope 40 can include ports for light sources to illuminate an anatomical space when using the camera/imaging device. In some embodiments, the scope 40 is configured to be controlled by a robotic system similar in one or more respects to the robotic systems 100, 101, and 104 shown in FIGS. 1, 2, and 3, respectively. The imaging device 48 may comprise an optical fiber, fiber array, and/or lens. The optical components move along with the tip of the scope 40 such that movement of the tip of the scope results in changes to the images captured by the imaging device(s) 48.

In some embodiments, the medical instrument (e.g., scope) 40 includes a sensor that is configured to generate and/or send sensor position data to another device or produce a detectable distortion or signature in an electromagnetic field. The sensor position data can indicate a position and/or orientation of the medical instrument 40 (e.g., the distal end 42 thereof) and/or can be used to determine/infer a position/orientation of the medical instrument. For example, a sensor (sometimes referred to as a "position sensor") can include an electromagnetic (EM) sensor with a coil of conductive material or other form/embodiment of an antenna. In some embodiments, the scope 40 comprises an electromagnetic sensor that is potted in the distal end 42 of the scope 40. The electromagnetic sensor (not shown) may comprise a termination of a wire, or other conductive element, configured to induce electrical currents in the presence of an electromagnetic field. Further, the medical instrument/scope 40 and/or basketing device 30 can include other types of sensors, such as a shape sensing fiber, accelerometer(s), gyroscope(s), radio-frequency transceiver(s), and so on. In some embodiments, a sensor on a medical instrument can provide sensor data to a control system, which is then used to determine a position and/or an orientation of the medical instrument. Position data derived using one or more position sensors associated with the scope 40 or basketing device 30 can be used to determine when the scope and/or basket 35 is within or near to an automatic scope pause location and/or another positional threshold/area associated with automatic scope insertion or retraction speed modification in accordance with aspects of the present disclosure.

Figure 7:
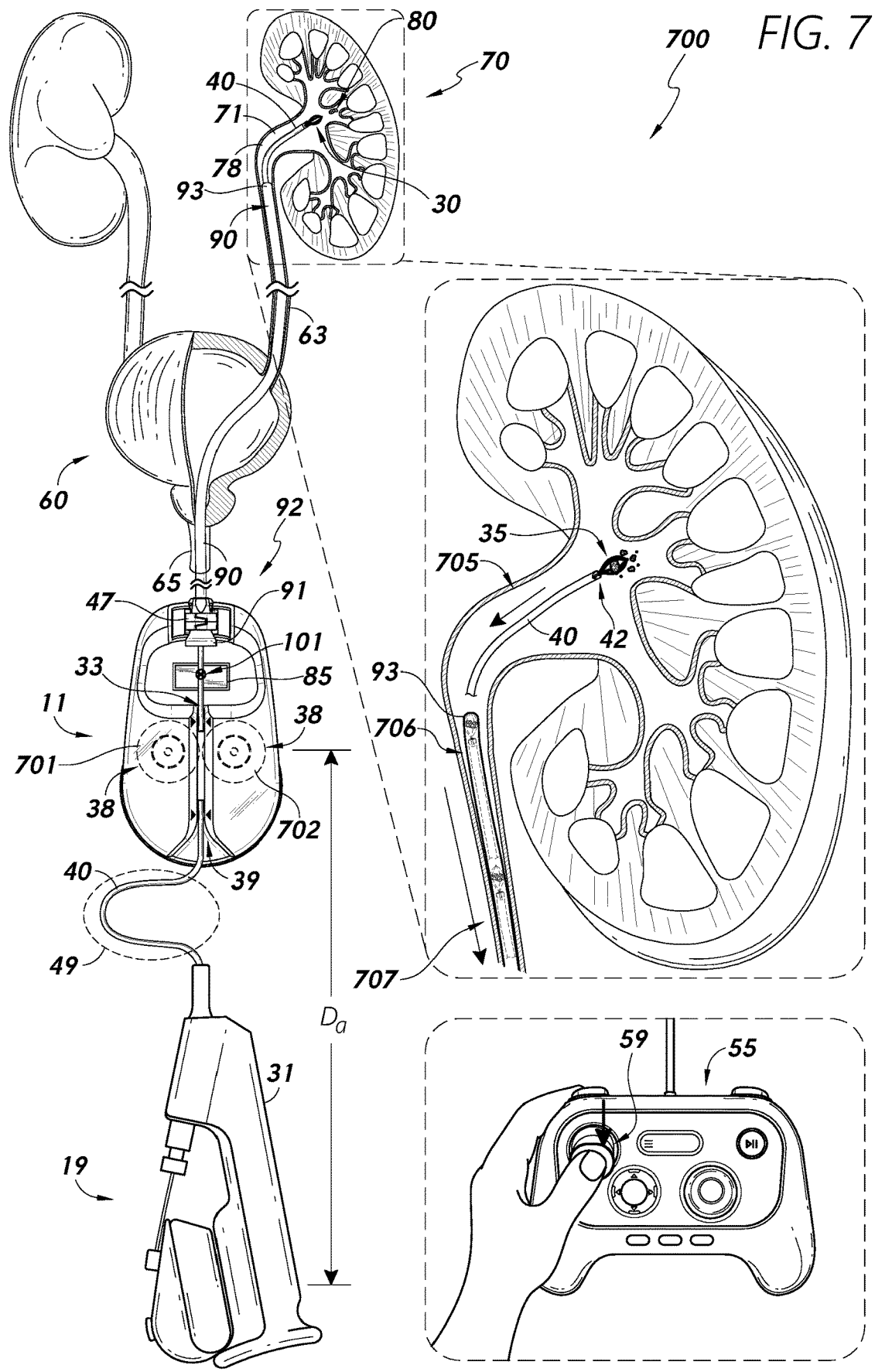
FIG. 7 illustrates a ureteroscope including a basketing device in a working channel thereof disposed in portions of the urinary system of a patient and in a driving engagement with an instrument feeder in accordance with one or more embodiments.

Embodiments of the present disclosure relate to the implementation of modification/changing of axial driving speed of an instrument/scope using an instrument feeder device/system, which may be based at least in part on the present position of the instrument relative to one or more other structures, anatomy, or devices. For example, robotic instrument feeders in accordance with aspects of the present disclosure may be configured to operate in a manner as to increase or decrease driving speed of an instrument based on the position of the instrument as determined by control circuitry associated with the instrument feeder, robotic system, and/or other component, device, or system. FIG. 7 illustrates a ureteroscope 40 disposed in portions of the urinary system of a patient, wherein the scope 40 is controlled to retract and/or advance through different zones/areas and/or at varying speeds based on scope position in accordance with one or more embodiments.

As with FIG. 6, the illustrated the system 700 of FIG. 7 includes an access sheath 90, which has been inserted into the urinary tract anatomy of a patient and provides a conduit through which the shaft 40 of the medical instrument 19 (e.g., endoscope instrument manipulator/handle) can be inserted. The medical instrument 19 includes an instrument base/handle 31, which is coupled to a proximal portion of the shaft 40 (e.g., endoscope). The shaft 40 can extend from or through the base/handle 31. According to some embodiments, instrument 19 can support multiple medical instruments, and the drive device 11 can be configured to drive motion of any one or more of the multiple medical instruments. For example, the instrument 19 can support a first medical instrument having a working channel, such as an endoscope or catheter, and a second medical instrument, which can be a working channel instrument that extends within the working channel, such as a biopsy tool, basketing tool, laser fiber tool, ablation tool, or other tool that is configured to manipulate or interact with a target within the patient's anatomy.

The instrument base/handle 31 can be configured to attach, mount, or otherwise be connected or coupled to a robotic arm (not shown). The robotic arm can include an instrument drive mechanism and the instrument base/handle 31 can be attached to the instrument drive mechanism. The instrument drive mechanism can include drive outputs configured to engage with and actuate corresponding drive inputs on the instrument base/handle 31 to manipulate the medical instrument 19. The robotic arm can also be configured to move to manipulate the position of the instrument base/handle 31 in space.

The shaft 40 can be engaged with the drive device 11. In the illustrated embodiment, the drive device 11 includes rollers 38 which can engage or contact the shaft 40. In some embodiments, the rollers 38 can comprise or include a deformable material that provides grip, friction, traction or pressure between the rollers 38 and the shaft 40. In some embodiments, the deformable material comprises silicone rubber. In the illustrated embodiment, as the rollers 38 rotate, the shaft 40 can be pulled, pushed, or otherwise driven axially through the drive device 11. Rotating the rollers 38 in a first direction can cause insertion of the shaft 40 (e.g., in a distal direction toward the patient), and rotating the rollers 38 in a second opposite direction can cause retraction of the shaft 40 (e.g., in a proximal direction away from the patient). Here, the direction of the rollers 40 refers to the direction of the portion of the rollers 8 or other axial actuator means/mechanism that engages the shaft 40. For example, rotation in the first direction for insertion of the shaft 40 refers to rotation of the engagement portion of the rollers 38 in a distal direction, and rotation for retraction refers to rotation of the engagement portion of the rollers 38 in a proximal direction. With respect to the view of the rollers 38 as seen in FIG. 7, this means that the left roller 701 rotates counterclockwise while the right roller 702 rotates clockwise to rotate the rollers 38 in the distal direction, and vice versa to rotate the rollers 38 in the proximal direction. As mentioned above, other actuator means/mechanisms can be used in place of or in addition to the rollers 38.

The shaft 40 can pass through a channel 39 of the drive device 11. The channel 39 comprise a closed channel or an open channel. Use of an open channel, as shown in FIG. 7, can facilitate loading the shaft 40 of the medical instrument 19 into the drive device 11, which can simplify use of the device and decrease operating times. For example, an open channel can facilitate loading and/or unloading of the medical instrument 19 intraoperatively, or during a medical procedure, to allow a user to manually make adjustments to the medical instrument 19, without having to fully retract the shaft 40 from within the patient. In some embodiments, the drive device 11 can include a robotically-actuated cover that allows the channel 39 to be selectively opened or closed to facilitate loading of the shaft to the drive device or retention of the shaft on the drive device, as desired.

The drive device 11 can be attached, mounted or otherwise connected or coupled to a second robotic arm (not shown). The second robotic arm can include an instrument drive mechanism including drive outputs configured to engage and actuate corresponding drive inputs on the drive device (see, e.g., drive inputs 334, 338 in FIG. 8) to actuate or operate the drive device 11. The robotic arm can also be configured to move to manipulate the position of the drive device 11 in space. As shown in FIG. 7, in some embodiments, the drive device 11 can be configured to attach to the access sheath assembly 92 (e.g., using a clip 47). Attaching the drive device 300 to the access sheath assembly 92 can facilitate movement or repositioning of the access sheath, as desired, via movement or repositioning of the drive device 11 or associated robotic arm 204.

The access sheath 90 portion of the access sheath assembly 92 may comprise a tube or other structure through which the shaft 40 can be inserted. In some embodiments, the access sheath 90 may comprise an elongate and flexible access sheath configured to be inserted into an anatomical lumen. In some embodiments, no access sheath is used and the elongated shaft 40 of the medical instrument 19 can be inserted directly into the patient (for example, through a natural patient orifice or other surgical access port or incision).

FIG. 7 also illustrates that the drive device 11 may include a collector structure 85. Objects removed from the patient using the medical instrument 19 can be deposited into the collector 85. For example, in the case of ureteroscopy, the medical instrument 19 can include a basketing device 30 configured to capture and retrieve stones or stone fragments from within the patient. Once a stone fragment is captured, the shaft 40 can be retracted until the distal end 42 is positioned over the collector 85. The basket 35 can then be opened, dropping the stone into the collector 85. The collector 85 need not be positioned on the drive device.

The shaft 40 of the medical instrument 19 can extend directly between the instrument base/handle 31 and the drive device 11. In such configuration, as the drive device 11 drives axial motion of the elongated shaft, the robotic arm supporting the base/handle 31 can move the base/handle 31 at a rate and in a direction that corresponds to the rate of axial motion of the shaft 40. Therefore, insertion speed of the shaft 40 can be limited to the speed at which the robotic arm coupled to the base/handle 31 can move. This may be suitable for relatively slow speeds.

In some configurations, the elongated shaft 40 of the medical instrument 19 is arranged to form a service loop 49 between the medical instrument 19 and the instrument feeder 14 and/or between the associated robotic arms. The service loop 49 may comprise a length of the shaft 40 between the instrument base/handle 31 and the drive device 11. When the length of the shaft 40 exceeds the distance between the instrument base/handle 31 and the drive device 11, the shaft 40 may hang down (and/or to the side), forming the service loop 49 between the instrument base/handle 31 and the drive device 11. The service loop 49 can provide slack in the shaft 40 that can be used to allow for faster insertion and/or retraction. For example, during insertion, the slack in the service loop 49 can be taken up (shortening or contracting the service loop 49). During retraction, the service loop 49 can be generated (increasing in length or expanding). As used herein, expanding or contracting the service loop 49 may involve increasing or decreasing the amount of extra length that is available in the service loop 49 to provide an axial degree of freedom for the flexible shaft. As an example, with the service loop 49, the drive device 11 can drive insertion at a rate that is faster than the rate at which the robotic arm coupled to the instrument 19 can move.

In some embodiments, use of a service loop 49 can allow for the instrument feeder 11 to be configured for relatively fast insertion and/or retraction of the shaft 40 at rates between about 100-300 mm per second, such as at a rate of between 130-190 mm per second. Other speeds for relatively fast insertion or retraction outside of these ranges are also possible. This type of fast insertion or retraction can be suitable, for example, when the distal tip 42 of the shaft 40 is positioned within the access sheath 90 because the access sheath 90 can protect the surrounding tissue of the patient. In some embodiments, when the distal tip 42 of the shaft 40 extends beyond/outside the access sheath 90, the relevant control circuitry controlling operation of the instrument feeder 11 can automatically transition to a relatively slower insertion or retraction rate. For example, relatively slower insertion and/or retraction rates according to aspects of the present disclosure can be rates of about 5-80 mm per second, such as between 20-50 mm per second. Other speeds for slow insertion or retraction outside of these ranges are also possible, where the slow insertion/retraction rate is slower than the relatively fast insertion/retraction rate. The slower insertion/retraction rates can operate, for example, as described below with respect to FIGS. 12 and 13.

During retraction, the drive device 11 can drive retraction of the scope 40 at a relatively slow speed when the distal tip of the shaft 40 is positioned beyond the access sheath as shown as scope position 705. When the tip 42 of the shaft 220 enters the access sheath 90, such as with respect to the scope position 706, the instrument feeder 11 can automatically transition to retracting the scope at a faster rate. Coordinated operation of the drive device 11 and movement of the robotic arm coupled to the instrument 19 at slow speeds may help mitigate shaft buckling that could lead to inaccurate driving response if axial motion of the shaft 40 were performed by robotic arm motion alone.

With respect to robotic ureteroscopic procedures, it may generally not be necessary for the operating physician to hold the ureteroscope handle 19 and manually retract the scope 40 to withdraw the scope 40 from the patient. However, according to some solutions, certain user controls may be engaged to effect/initiate retraction of the scope 40. For example, in some implementations, a pendent retraction joystick 59 may be engaged in a certain manner, such as by pulling and/or holding in a downward or other direction (e.g., as shown in FIG. 7) in order to cause the instrument handle 19 to be proximally moved and/or to cause proximal axial actuation of the scope 40 by the axial actuator means 38 (e.g., shaft-engagement wheel(s)/roller(s)) of the instrument feeder 11.

While causing the retraction of the scope 40 robotically, it may be necessary or desirable for the physician to monitor the scope camera image to allow for the scope 40 to be retracted relatively high speeds through the access sheath 90 while preventing the scope 40 from being retracted too far. For example, it may be desirable to prevent the distal end 42 of the scope 40, such as the basket 35 projecting from the distal end 42 of the scope 40, from being drawn into the axial actuator mechanism/means 38 (e.g., wheel(s)/roller(s)). For example, it may be desirable to prevent the distal end 42 of the scope 40 and/or the basket 35 from reaching the opening/threshold 33 of the driver scope channel 39, and further from reaching the axial actuator means 38 within the channel 39. However, if the physician retracts the scope 40 overly cautiously, he or she may be prone to stopping retraction of the scope 40 earlier than is ideal, or may undesirably slowdown the scope retraction while the distal end 42 of the scope 40 is within the access sheath 90, thereby resulting in increased overall procedure time. Furthermore, if the physician is not paying close enough attention to the retraction, or becomes distracted during the retraction process, the scope 40 may be retracted too far and/or the stone/basket may get stuck inside the drive channel 39, potentially resulting in instrument damage and/or prolonging of the procedure time.

Embodiments of the present disclosure advantageously allow for implementation of automatic retraction (and/or insertion) speed modification as implemented by an instrument feeder with respect to driving of the elongate shaft, such as a ureteroscope or other device. For example, in some embodiments, the present disclosure provides for automatic robotic pausing of scope/catheter retraction upon exit from an access sheath assembly through which the scope/catheter is retracted. Such pausing may be implemented as a soft stop in an area outside of the relevant access sheath that provides a convenient position of the scope/catheter for execution of a procedural action, such as dropping/depositing of a specimen captured in connection with the relevant medical procedure (e.g., kidney stone fragment extracted from kidney). It should be understood that references herein to scope retraction speed modification can be understood to relate to scope advancement speed modification unless stated otherwise.

Automatic pausing and/or other modification in retraction speed of an elongate instrument may be based at least in part on certain conditions and/or information associated with the relevant robotic system. For example, in embodiments in which the instrument feeder 11 and instrument 19 are operably coupled to respective end effectors of robotic arms of a robotic system, the system (e.g., robotic cart and/or communicatively coupled tower) can be configured to determine and/or generate certain robotic system parameters that can provide a basis for scope position determination, which may be used to determine when and in what manner to alter scope retraction/insertion speed. For example, such parameters may include among possibly others, current scope insertion position, current scope and/or instrument feeder dimension(s), and access sheath length.

As shown in the detailed image of the renal anatomy in FIG. 7, the scope basket 35 may first be retracted into the distal opening 93 of the access sheath 90. In connection with retraction into the access sheath 90, a confirmation process or subprocess may be implemented to confirm the position or presence of the distal end 42 of the scope 40 and/or basket 30 within the access sheath 90. For example, a user interface may alert the user to solicit confirmation from the user that the scope 40 and/or basket 35 is/are inside the access sheath 90. The user may determine the position of the scope 40 and/or distal end 42 thereof based on camera images and/or other positional information available.

Once position of the scope 40 within the access sheath 90 has been confirmed, control circuitry associated with the robotic instrument feeder system (e.g., robotic cart, control tower/system, and/or instrument feeder 11) may be configured to enable a fast retract mode. In some implementations, engagement by the user of certain user controls 55, such as a pendant joystick 59 or the like, in a manner as to indicate a retraction command (e.g., by pulling down on the joystick 59), relatively fast retraction may be implemented to automatically retract the scope through the sheath at a relatively fast speed until it is determined that the scope has reached a predetermined automatic pause position 101, at which point the relevant control circuitry may implement an automatic pause/stop of the axial movement/retraction of the scope 40.

In some implementations, once automatic pause has been implemented, the physician/user may release the retraction-signaling joystick of the user controls and check, either through camera view or directly viewing the proximal end of the access sheath assembly 92 and/or the instrument feeder 11, to confirm or determine whether the scope 40 is in a desired position for stone fragment collection. If so, the user may engage certain user controls to command the basket 35 to open in a manner as to cause a stone fragment captured therein to drop from the basket. In some implementations, once the user releases the retraction joystick, automatic pause functionality may be deactivated, such that the user may implement fine adjustment of the position of the scope to arrive at the desired stone collection position. Such fine positional adjustment of the scope may be implemented using pendant insertion joystick manipulation.

Figure 8:
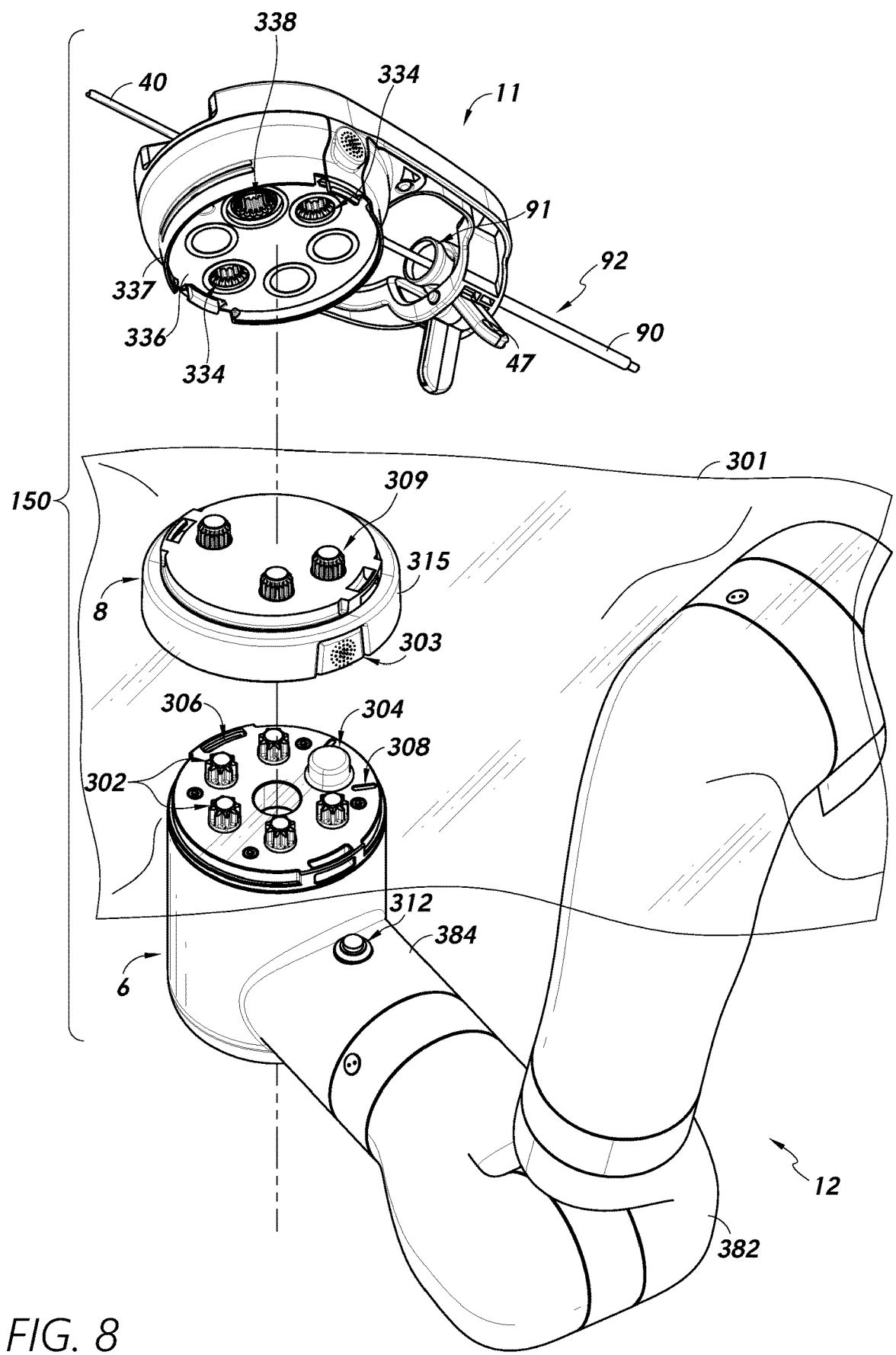
FIG. 8 shows an exploded view of an instrument manipulator assembly associated with a robotic arm in accordance with one or more embodiments.

FIG. 8 shows an exploded view of an instrument device manipulator assembly 150 associated with a robotic arm 12 in accordance with one or more embodiments. The instrument device manipulator assembly 150 includes an end effector 6 associated with a distal end of the robotic arm 12. The instrument manipulator assembly 150 further includes an instrument feeder 11. The instrument feeder 11 can incorporate electro-mechanical means for actuating an instrument 40, such as an endoscope or other shaft-type instrument. Description herein of upward-facing and downward-facing surfaces, plates, faces, components, and/or other features or structures may be understood with reference to the particular orientation of the instrument device manipulator assembly 150 shown in FIG. 8. That is, although the end effector 6 may generally be configurable to face and/or be oriented in a range of directions and orientations, for convenience, description of such components herein may be in the context of the generally vertical facing orientation of the end effector 6 shown in FIG. 10.

In some embodiments, the instrument device manipulator assembly 150 further includes an adapter component 8 configured to provide a driver interface between the end effector 6 and the instrument feeder 11. The adapter 8 and/or the instrument feeder 11 may be removable or detachable from the robotic arm 12 and may be devoid of any electro-mechanical components, such as motors, in some embodiments. This dichotomy may be driven by the need to sterilize medical instruments used in medical procedures and the inability to adequately sterilize expensive capital equipment due to their intricate mechanical assemblies and sensitive electronics. Accordingly, the instrument feeder 11 and/or adapter 8 may be designed to be detached, removed, and interchanged from the end effector 6 (and thus the system) for individual sterilization or disposal. In contrast, the end effector 6 need not be changed or sterilized in some cases and may be draped (e.g., using drape 301) for protection.

The adapter 8 can include connectors to transfer pneumatic pressure, electrical power, electrical signals, and/or optical signals from the robotic arm 12 and/or end effector 6 to the instrument feeder 11. The robotic arm 12 can advance/insert or retract the coupled instrument feeder 11 into or out of the treatment site. In some embodiments, the instrument feeder 11 can be removed and replaced with a different type of instrument. The end effector 6 of the robotic arm 12 can include various components/elements configured to connect to and/or align with components of the adapter 8, instrument feeder 11, access sheath assembly 92, and/or instrument 40. For example, the end effector 6 can include drive outputs 302 (e.g., drive splines, gears, or rotatable disks with engagement features) to control/articulate a medical instrument, a reader 304 to read data from a medical instrument (e.g., radio-frequency identification (RFID) reader to read a serial number from a medical instrument), one or more fasteners 306 to attach the instrument feeder 11 and/or adapter 8 to the instrument feeder 6, markers 308 to align with an instrument that is manually attached to a patient (e.g., access sheath 90) and/or to define a front surface of the device manipulator assembly 150. In some embodiments, a portion (e.g., plate) 315 of the adapter 8 can be configured to rotate/spin independently of one or more other components of the adapter 8 and/or end effector 6 when coupled to the end effector 6.

In some configurations, a sterile drape 301, such as a plastic sheet or the like, may be disposed between the end effector 6 and the adapter 8 to provide a sterile barrier between the robot arm 12 and the instrument feeder 11. For example, the drape 301 may be coupled to the adapter 8 in such a way as to allow for translation of mechanical torque from the end effector 6 to the adapter 8. The adapter 8 may generally be configured to maintain a seal around the actuating components thereof, such that the adapter 8 provides a sterile barrier itself. The use of a drape 301 coupled to the adapter 8 and/or more other component(s) of the device manipulator assembly 19 may provide a sterile barrier between the robotic arm 12 and the surgical field, thereby allowing for the use of the robotic cart associated with the arm 12 in the sterile surgical field. The end effector 6 may be configured to be coupled to various types of sterile adapters that may be loaded onto and/or removed from the end effector 6 of the robotic arm 12. With the arm 12 draped in plastic, the physician and/or other technician(s) may interact with the arm 12 and/or other components of the robotic cart (e.g., screen) during a procedure. Draping may further protect against equipment biohazard contamination and/or minimize clean-up after procedure.

The instrument feeder 11 can include a plurality of drive inputs 334, 338 on a lower surface 336 of the housing of the instrument feeder 11. In the illustrated embodiment, the instrument feeder 11 includes three drive inputs 334, 338, although other numbers of drive inputs can be included in other embodiments. The drive inputs can be in fixed positions spaced apart along the lower mating surface 336 of the instrument feeder 11, which facilitates coupling the drive inputs 334, 338 to the corresponding drive outputs 302 of the end effector 6, may be in fixed positions spaced apart along a corresponding mating surface designed for modular use and attachment to a variety of other instruments.

A mechanical assembly within the instrument feeder 11 can allow the drive inputs 334, 338 to be used to drive rotation of opposing rollers or other actuator means/mechanism for axial motion of a medical instrument shaft, as well as changes in position of the opposing rollers to permit loading of the shaft or allow for other use cases. In the illustrated embodiment, the three drive inputs comprise two roller drive inputs 334 and an open/close drive input 338. Each of the drive inputs 334, 338 can be configured to engage with a corresponding drive output 302 on the robotic arm 12. For example, each drive input can comprise a receptacle configured to mate with a drive output that is configured as a spline. The drive inputs and drive outputs can be configured to engage to transfer motion therebetween. Thus, the drive outputs can be rotated to cause corresponding rotation of the drive inputs 334, 338 to control various functionality of the instrument feeder 11.

References herein to an "instrument device manipulator assembly," "instrument manipulator assembly," "manipulator," "manipulator assembly," as well as other variations thereof, can refer to any subset of the components of the assembly 150 shown in FIG. 8, including a robot arm, an end effector of a robot arm, an adapter configured to be coupled to a robotic end effector, an instrument feeder configured to be coupled to an end effector and/or adapter, an actuator of an instrument feeder (e.g., feed-roller(s), shaft channel, and/or other actuator component(s), means, and/or mechanism associated with an instrument feeder. Furthermore, it should be understood that references herein to an "actuator" can refer to any component of the assembly 150 shown in FIG. 8 that affects or causes, either directly or indirectly, movement of an instrument engaged with, coupled to, or otherwise actuatable by, an instrument feeder. For example, in accordance with embodiments disclosed here, an "actuator" may comprise any set or subset of the following devices or components: feed-roller(s), shaft-actuating wheel(s)/roller(s), feed-roller channel(s), instrument feeder drive input(s), adapter drive output(s), adapter drive input(s), end effector drive output(s), and/or control circuitry configured to cause actuation of the same.

Figure 9:
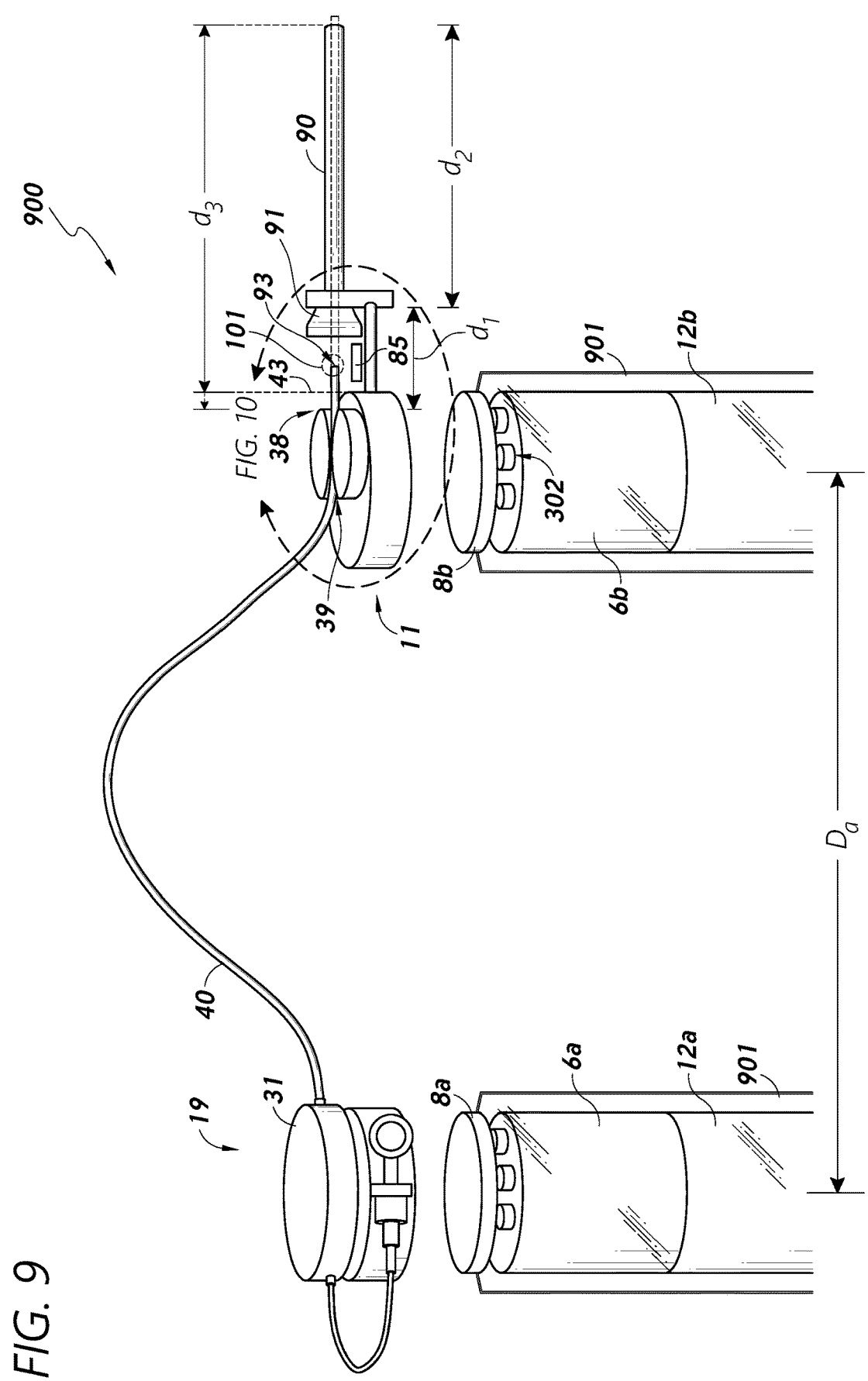
FIG. 9 is a perspective view of robotic arms having endoscope and instrument feeder devices, respectively, coupled thereto in accordance with one or more embodiments.

FIG. 9 is a perspective view of robotic arms having endoscope and instrument feeder devices, respectively, coupled thereto in accordance with one or more embodiments. As described in detail herein, robotic medical systems, such as those described above with reference to FIGS. 1-8, can be used for robotic medical procedures that involve removing an object, specimen, or sample from a patient, such as kidney stone fragment removal. During a robotic kidney stone retrieval procedure, a physician can operate various robotic medical instruments (such as, e.g., the endoscopes and laparoscopes described above) using a controller and/or certain control circuitry. The physician can control the system to capture a kidney stone with a basketing device disposed in a working channel of an endoscope. When a stone fragment has been captured, the robotic ureteroscope can be retracted to remove the kidney stone from the patient. Once positioned outside of the patient's body, the basketing device can be opened to release the stone. The robotic ureteroscope can then be reinserted into the body to retrieve further stones, if necessary.

A specimen collector 85 can be configured such that the robotic medical system can deposit specimens therein robotically, which can minimize manual or physical interaction. The specimen collector 85 can be integrated with and/or configured to be supported by components of the robotic medical systems, such as the instrument feeder 11, at positions at which the robotically controlled medical instruments can quickly and efficiently deposit specimens. Specimens/stones can be deposited at a position 101 between an opening in an access sheath introducer 91 and an axial actuator 38, such as a position approximately halfway between the opening of the introducer 91 or sheath 90 and the distal end 43 of the instrument feeding channel associated with the axial actuator 38. In some embodiments, the specimen collector 85 can be integrated with a sterile drape 901 configured to cover various robotic components of the system. The specimen collector can be positioned at a location that is directly below a robotically controlled basketing device when the basketing device is retracted out of the patient and/or access sheath introducer 91. At such position, the basketing device can simply open to drop a retrieved object into the specimen collector 85. The specimen collector 85 can be configured with at least one porous portion that allows fluid to drain therethrough while retaining objects deposited therein.

The system 900 of FIG. 9 includes a medical instrument 19 that includes an instrument base/handle 31 and an elongated shaft 40. For the illustrated embodiment, a proximal end of the elongated shaft 40 extends from the instrument base 31. In some embodiments, the elongated shaft 40 comprises a flexible shaft and/or an articulating shaft. A distal end of the elongated shaft 40 is configured to be inserted into the access sheath introducer 91. As with other figures of the present disclosure, the instrument feeder 11 is configured to drive insertion and/or retraction of the elongated shaft 40 such that the distal end of the elongated shaft 40 can be inserted into and retracted from the access sheath 90. In the illustrated embodiment, the instrument 19 is illustrated in a position wherein the distal end of the elongated shaft 40 has been retracted out of the access sheath 90. Although examples described herein relate to kidney stone removal, the medical instrument 19 can be configured to collect and retrieve other types of objects, specimens, or samples from within a patient. For example, in some embodiments, the medical instrument 19 is configured to take a biopsy sample from patient anatomy.

The instrument feeder 11 is engaged with the elongated shaft 40 of the medical instrument 19 and configured to drive axial motion (e.g., insertion and/or retraction) of the distal tip of the elongated shaft 40 into and out of the access sheath 90. For example, as shown in 9, the instrument feeder 11 includes rollers 38 or other axial actuator means/mechanism, which can engage or contact the elongated shaft 40. In some embodiments, the rollers 38 can comprise a deformable material that provides grip between the rollers 38 and the elongated shaft 40. In some embodiments, the material comprises silicone rubber. In the illustrated embodiment, as the rollers 38 rotate, the elongated shaft 40 can be pulled, pushed, or otherwise driven axially through the instrument feeder 11. Rotating the rollers 38 in a first direction can cause insertion of the elongated shaft 40 and rotating the rollers 38 in a second opposite direction can cause retraction of the elongated shaft 40. In some embodiments, other drive means/mechanisms can be used in place of or in addition to the rollers 38. In the illustrated embodiment, the elongated shaft 40 passes through a channel 39 of the instrument feeder 11. The channel 39 comprises a closed and/or open channel. In the illustrated embodiment, sterile adapters 8a, 8b are positioned between the robotic arms 12a, 12b and the respective coupled instruments/devices 19, 11.

While the illustrated embodiment of the system 900 includes the instrument feeder 11 for driving axial motion of the elongated shaft 40 of the medical instrument 204, other types of robotic manipulators can be used to drive axial motion in other embodiments. For example, in some embodiments, axial motion is driven by moving a robotic arm 12a to which the base/handle 31 of the medical instrument 19 is attached. Therefore, description herein of instrument retraction/insertion speed modification based on instrument position may relate to the modification of speed of movement in space of a robotic arm coupled directly or indirectly to the instrument.

The specimen collector 85 provides a receptacle, container, vessel, or repository into which specimens can be deposited. The specimen collector 85 can comprise a flexible material, such as a sheet of plastic. In some embodiments, the collector 85 comprises a flexible bag. The specimen collector 85 can be positioned within the sterile field. The collector 85 can be attached to the sterile adapter 8b, to the access sheath introducer 91, or to the instrument feeder 11. In the illustrated embodiment, the specimen collector 85 is positioned at a location that is below (e.g., directly below) the distal tip 42 of the elongated shaft 40 of the medical instrument 19 when the distal tip 42 is withdrawn from the access sheath introducer 91. In this position, depositing the specimen into the collector 85 can be accomplished by releasing the specimen (e.g., opening the basketing device) and allowing the specimen to fall into the collector 85 due to gravity. This position of the specimen collector 85 can also maintain alignment between the elongated shaft 40 and the access sheath 90 such that, after the specimen is deposited into the collector 85, the distal tip 42 of the elongated shaft 40 can be quickly reinserted into the access sheath 90 to continue the procedure. This can reduce the overall length of the procedure, improving patient outcomes.

In the illustrated embodiment, a predetermined automatic scope pause/stop position is set at a position directly above the specimen collector 85. For example, such automatic pause/stop position 101 can be positioned on the distal (i.e., patient facing) side 43 of the instrument feeder 11 and/or axial actuator 38. This position can beneficially minimize the amount of movement required to position the distal tip 42 of the shaft 40 over the specimen collector 85. Again, this can reduce the overall length of the procedure. The specimen collector 85 and automatic pause/stop position, which can be an identifiable position in space along the axis of travel of the shaft 40, is positioned just proximally of the access sheath 90 and/or access sheath introducer 91.

Figure 10:
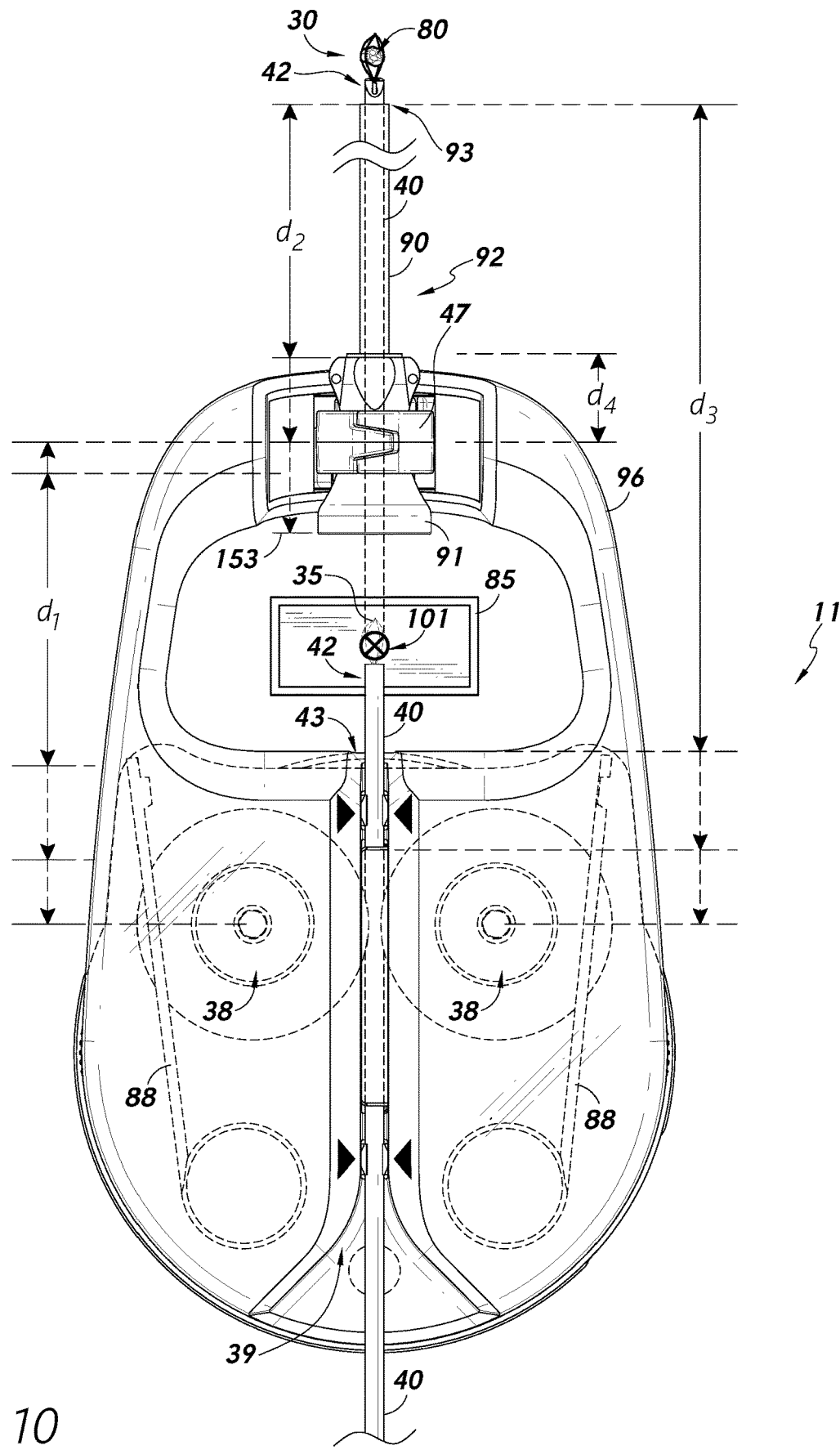
FIG. 10 is a top view of an instrument feeder configured to drive axial motion of an elongated shaft of a medical instrument in accordance with one or more embodiments.

FIG. 10 is a top view of an embodiment of the instrument feeder 11 shown in FIG. 9, wherein the instrument feeder is configured to drive axial motion of an elongated shaft of a medical instrument. FIG. 10 shows the instrument feeder 11 and access sheath 90 and identifies certain parameter features that may provide bases for automatic retraction speed and/or pause functionality as described herein. FIGS. 9 and 10 show the distal tip 42 of the scope 40 paused at the automatic pause location 101 between the proximal opening of the access sheath introducer 91 and the axial actuator(s) 38 and/or drive channel 39 associated therewith. FIG. 10 shows the collector 85 positioned generally below the automatic pause/stop location 101. In some embodiments, the collector 85 is coupled to an attachment tab 89. The attachment tab 89 can be configured to attach to the component of the instrument feeder 11 and/or system 900 that supports the specimen collector 85.

FIG. 10 illustrates various dimensions that may serve as bases for scope position determinations in accordance with scope retraction/insertion speed modification as disclosed herein. For example, a first dimension $d_1$ that may correspond to a distance between an opening 43 to the scope channel 39 and the proximal end or center of the clip component 47 associated with the instrument feeder 11 that is configured to hold and secure in place the proximal opening/funnel component 91 of the access sheath assembly 92. In some implementations, a desired automatic pause position 101 may be determined as a position halfway between the proximal end of the clip 47 and the opening of the channel 43, as shown in FIG. 10. That is, embodiments of the present disclosure provide for automatic pause execution with respect axial movement of a retracted scope between an access sheath clip and a scope channel and/or axial actuator mechanism/means. In determining the scope positions for automatic pause and/or other speed modification functionality, the position of the scope 40 with respect to a distal end 42 thereof may serve as a basis for certain positional determination/calculation. For example, FIG. 10 shows a dimension $d_3$ that represents a distance between the opening 43 to the scope channel 39 and the distal end 93 of the access sheath 90, which dimension may be used to calculate a position of the scope. In some implementations, the distance $d_1$ between the channel opening 43 and the clip 47 may be determined at least in part by subtracting a known or selected access sheath length $d_2$ from the dimension $d_3$ representing the scope insertion length at the access sheath tip 93. In some systems, the distance $d_1$ can be derived directly from the mechanical dimensions of the instrument feeder 11. The pause position 101 may further be determined by subtracting half the distance $d_1$ between the clip 47 and the opening of the channel 43. For example, the automatic scope pause position/location 101 may be determined according to equation (1) listed below:

$$\text{PauseLocation} = \text{SheathTip} - d_2 - 0.5 * d_1 \quad (1)$$

Where 'PauseLocation' represents the automatic scope pause/stope location 101, 'SheathTip' represents the scope insertion configuration when the tip 42 of the scope 40 is at the tip 93 of the access sheath 90, wherein $d_1$ and $d_2$ represent any of the possible dimensions for such parameters shown in FIG. 10. 'SheathTip' can indicate relative insertion/position of the scope handle 19, taking into account roller actuation of the scope and/or scope service length, when the tip 42 of the scope 40 is positioned at the distal tip 93 of the access sheath 90. In some implementations, the equation (1) above further includes subtraction of the dimension $d_4$ on the right side of the equality, depending on how the dimensions $d_1$ and $d_2$ are defined, in order to determine the position 101 as illustrated for the automatic pause location.

Automatic insertion or retraction speed modification in accordance with aspects of the present disclosure may be based on any type of robotic system data indicative of scope position relative to one or more other system components, such as an access sheath, specimen collector, and/or other component. For example, data indicating a current scope insertion of the scope may be used to determine/detect a present position of the scope or component thereof. The current scope insertion data can indicate the degree to which the scope is translated from a certain calibrated position. For example, where scope length is known (e.g., based on RFID identification associated with the scope), a current scope insertion may be determined based on a distance between end effectors of robotic arms coupled to the instrument feeder 11 and scope handle 19, respectively. For example, FIGS. 1, 7, and 9 include a dimensional callout $D_a$ representative of a distance between center points of end effectors of two robotic arms, wherein one of the robotic arms is secured to the scope base/handle 19. Therefore, triggering automatic scope insertion or retraction speed modification or stopping/pausing can be based at least in part on known relative distances between two or more robotic arms used in the relevant medical procedure.

In some embodiments, automatic scope retraction/insertion speed modification may be based at least in part on a predetermined distance between the center of the rollers/wheels 38 and the center of the sheath clip 47, wherein such distance is shown as a variant of the distance $d_1$ in FIG. 10. Further, the distance between the center of the clip 47 and the proximal end of the sheath 90 may be predetermined, wherein such distance is shown as distance $d_4$ in FIG. 10. Such data points may be used, such as together with the known length $d_2$ of the access sheath 90, to determine the position of the distal end 93 of the sheath 90 with respect to the instrument feeder 11, wherein such positional information may serve as a basis for determining the position of the scope 40 for the purpose of triggering automatic speed modification in accordance with aspects of the present disclosure. Generally, determination of the position of the scope 40 may further be based on the present distance $D_A$ between the respective robot arms supporting the instrument feeder 11 and scope 19.

In some embodiments, determination/detection of scope position is based at least in part on the access sheath length $d_2$, wherein such length may generally be understood to be the length between the distal tip 93 of the access sheath 90 and the proximal end of the sheath 90, the center of the clip 47, or the proximal end of the funnel port/introducer structure 91. In some embodiments, the sheath 90 has a length of about 55 cm, whereas the funnel port/introducer structure 91 has a length of about 2 cm. However, it should be understood that any length of sheaths, scopes, ports, or other components of the system may be utilized in accordance with aspects of the present disclosure.

In some cases, length $d_2$ of the access sheath 90 may further be known. For example, such length data point may be input by the physician/user at some point during the relevant calibration or initialization process. In some embodiments, the length $d_2$ of the access sheath 90 may be indicated by one or more sensors associated therewith, such as magnetic tags or sensors, or the like. Where the instrument feeder 11 is physically coupled to the access sheath assembly 92, as in FIGS. 6, 7, and 10, the position of the distal end 93 of the access sheath 90 can be determined/derived from positional data relating to the robot arm coupled to the instrument feeder 11 and the access sheath length $d_2$, as well as information relating to the position and/or dimension(s) of the sheath clip 47 and/or funnel port structure 91, each of which may serve as bases for automatic retraction or insertion speed modification in accordance with aspects of the present disclosure.

In some implementations, the present position of the tip 42 of the scope 40 is determined by initially calibrating the positions of one or more of the robot arms and the position of the scope tip 42, wherein subsequent relative or absolute movement of the robot arm(s) can indicate the present position of the scope tip 42 based on the deviation from the initial position of the robot arm(s) and/or amount/degree of actuation of the rollers 38. In particular, the movement of the scope-connected robot arm 12a may be monitored to determine scope position, as the instrument-driver-coupled arm 12b may generally be stationary as clipped to the ureteral access sheath 90. Clipping the access sheath assembly 92 to the instrument feeder 11 can advantageously reduce the risk of injury to the patient due to tearing, or other frictional or blunt contact between the access sheath 90 and the adjacent anatomy.

In some implementations, the point 153 associated with the threshold at the proximal end of the funnel port structure 91 can be registered during the calibration process with respect to the tip 42 of the scope 40. In some embodiments, the pause position 101 may be registered with respect to the position of the robot arm 12a holding the scope 19, wherein the position of the scope 19 at the position where the distal tip 42 of the scope 40 is in the automatic pause/stop area 101 may be determined through visual confirmation and/or other means or mechanism. After such registering/calibration, a determination of the position of the scope may be based at least in part on the registration positional information.

In addition to, or as an alternative to, using robotic system data to determine/detect a position of at least a portion of a scope for the purpose of triggering automatic retraction or insertion speed modification by an instrument feeder assembly/device, other mechanism(s) may be implemented to determine scope and/or basket position for the purpose of triggering speed modification, including automatic retraction pause/stop as described in detail herein. For example, in some implementations, signals generated by one or more position sensors may be used to detect when a scope, basket, and/or other component of a scope assembly reaches a particular position, wherein speed modification in accordance with aspects of the present disclosure is triggered by such determine/detected position. For example, the relevant system (e.g., embodiment of the system 100 shown in FIG. 1) may include one or more sensors (e.g., electromagnetic position sensors, or the like) configured to generate data indicating positions of the distal tip of the scope, entry and/or exit positions of the access sheath, or the like at a present time, wherein control circuitry of the system is configured to implement speed modification (e.g., retraction pause) in response to position detection/determination. In some implementations, the detected/determined position may be based on data indicating the relative position of one or more components or portions of the scope to one or more components or portions of the access sheath or access sheath assembly.

As described in connection with the various embodiments of the present disclosure, modification of retraction and/or insertion speeds of scopes by an instrument feeder device/tool in accordance with aspects of the present disclosure may be based on a determination of a position of the portion of a scope being driven by the device/tool, as described in detail herein. For example, such position determination can involve determining that the distal end of a scope has been withdrawn proximally from a proximal opening of an access sheath. Such determination/detection may involve determining when distal end of the scope and/or a basketing device projecting from the distal end of the scope has cleared an opening in an access sheath shaft and/or the proximal opening of a funnel port structure associated with the proximal end of the sheath assembly.

In some implementations, modification of axial driving speed of a scope or other shaft-type instrument may be based on a determination/detection that a component or portion of the scope and/or basketing device/assembly has been advanced into an access sheath assembly, at which point fast insertion mode may be triggered, wherein the distal end of the scope may be advanced through the access sheath at a relatively high rate of speed. Such determination/detection may involve determining or detecting that the distal end of this scope and/or basketing device projecting there from has entered a funnel port structure associated with an access sheath assembly, or a proximal opening of an access sheath physically coupled to the funnel port structure.

Figure 16:
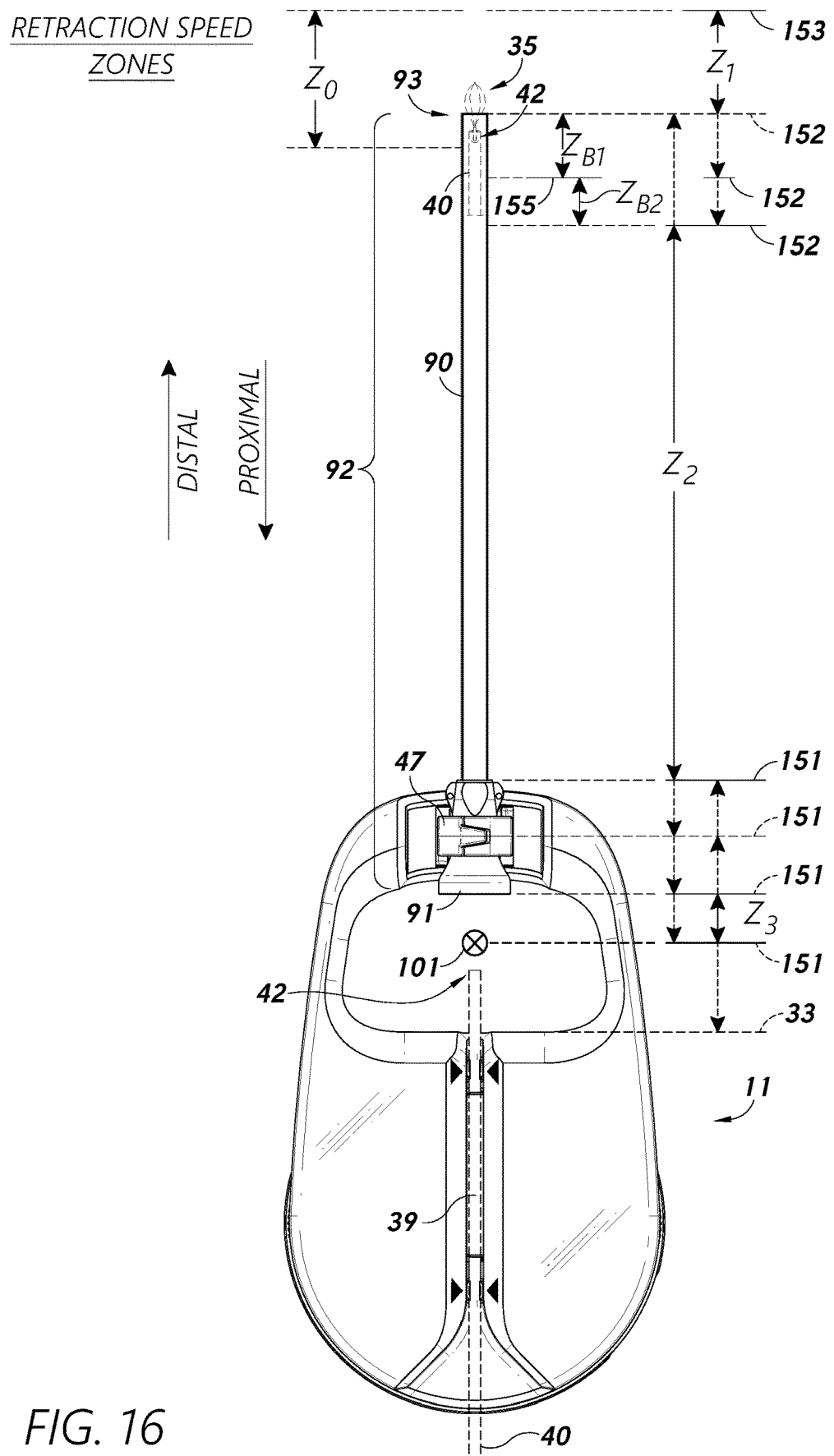
FIG. 16 shows an assembly of an instrument driver/feeder device and an access sheath assembly, wherein certain speed zones are identified in accordance with one or more embodiments.

FIG. 16 shows an instrument feeder 11 and associated access sheath assembly 92 clipped thereto, wherein different scope insertion/retraction speed zones $Z_0$-$Z_3$ associated with the access sheath assembly 92 and instrument feeder 11 are identified. The various zones are areas within and/or without the sheath 90 and/or sheath assembly 92 in which different speeds of retraction and/or insertion may be automatically implemented/triggered in accordance with aspects of the present disclosure. When the tip of a scope device (not shown) driven by the instrument feeder 11 is inside the fast-retraction zone $Z_2$ of the sheath 90, the scope may be configured to be retracted a relatively high speed. For example, such fast retraction may be implemented while the user holds down a control joystick of the relevant user input device to retract the scope, wherein the speed of retraction may increase in response to a determination that the scope tip is within the fast retraction zone $Z_2$.

In some implementations, during fast retract mode, control circuitry of one or more components of the system may be configured to compare a current scope insertion/position to the determined automatic pause position 101 to determine whether to initiate automatic pausing/stopping of the scope retraction. In some embodiments, a slow retraction zone $Z_3$ may be associated with a proximal portion of the access sheath assembly 92, such that the retraction of the scope first slows when exiting the access sheath 90 proximally prior to pausing/stopping at the pause location 101. In some implementations, unless the comparison between the current scope location and the pause location 101 match or are within a sufficiently close proximity, fast retraction may be continued automatically. Once it is determined that the scope tip is at or near the pause position 101, the relevant control circuitry can advantageously initiate/execute automatic pausing/stopping of the scope at that location through control of the drive mechanism(s).

With further reference to FIG. 16, in some implementations, a slow retraction zone $Z_3$ may be implemented, in which speed of retraction of a scope is slowed once it is determine/detected that the distal end of the scope and/or basket projected therefrom has reached the sheath entry position 151, which may be positioned at a proximal end of the sheath 90, at a center point of the clip 47, or at a proximal end of the funnel port structure 91, or any other position. That is, in some implementations, the retraction of the scope may first be slowed when in the slow retraction zone $Z_3$ prior to being fully stopped/paused upon reaching the automatic pause/stop area or position 101. In some embodiments, slow retraction may be triggered automatically while the scope and/or basket is still within the access sheath 90 in an area immediately distal to the proximal end of the sheath 90. It should be understood that any references or description herein of determination/detection of a position of a scope or component thereof can indicate the determination/detection of a position of a basket form/device projecting from a distal end of the scope.

When advancing/inserting the scope 40 distally through the sheath 90, speed modification of axial insertion/advancement may be triggered to slow such scope speed on determination/detection of the scope (and/or associated basket) reaching a position 152 in a distal area of the sheath 90. For example, insertion/advancement speed may automatically be reduced past the threshold 152 to reduce the risk of damage to tissue upon exit from the sheath 90. In some implementations, such speed reduction may be triggered by determination of an insertion force that is greater than a predetermined threshold insertion force. Such force may be indicated by readings on one or more torque sensors associated with the actuator(s) or other components of the instrument feeder 11. In some embodiments, the position 152 is about 20 mm or less from an axial end 93 of the access sheath 90.

During insertion of the scope 40 into the access sheath 90, fast insertion mode may be automatically triggered and initiated when the scope tip 42 and/or basket passes the threshold point 151, or another point in a proximal area of the sheath 90. In some embodiments, determination that the scope tip and/or basket has entered the fast insertion/retraction zone $Z_2$ may be based on a determination that the distal end 42 of the scope and/or basket projected therefrom has passed the clip 47 that secures the access sheath assembly 92 to the instrument feeder 11. For example, the determination of entry into the access sheath 90 and/or fast insertion/retraction zone $Z_2$ can be based on information indicating an axial length of the funnel port/introducer structure 91 and/or a known distance of the distal end of the funnel port structure 91. For example, it may be advantageous to maintain slow insertion speeds while the scope and/or basket is/are within the interior channel of the funnel port structure 91 until the tip of the scope and/or basket crosses the threshold into the tubular structure 90 of the access sheath assembly 92.

With respect to the illustrated system 100 in FIG. 1, as well as other systems disclosed herein, where implemented electromagnetic field generators 18 are configured to broadcast an electromagnetic field that covers an area in which the instrument feeder 11 is disposed, such electromagnetic field may be relied upon to determine the position of the tip 42 of the scope 40 based on electromagnetic positioning as described herein. In some implementations, the electromagnetic position sensor(s) may be used to determine the position of the scope tip 45 at the tip 93 of the access sheath 90, wherein one or more of the predetermined data points relating to the sheath assembly and/or instrument feeder 11, as described in detail above, may be used to determine the position of the distal tip 42 of the scope 40 relative to the automatic pause/stop position 101. That is, electromagnetic position sensor information may be used to calibrate the position of the tip 42 of the scope relative to the sheath assembly 92 and/or instrument feeder 11, wherein such calibration may be used to determine the position of the scope with respect to the automatic stop/pause position 101 based on post-calibration movement of the actuator(s) 38 and/or robotic arm 12a coupled to the scope assembly 19. Such calibration may further be utilized to determine scope positions as they cross other speed threshold points as shown in FIG. 16. In some embodiments, the tip 42 of the scope 40 can include an electromagnetic sensor, which may be used for such purposes.

Figure 15:
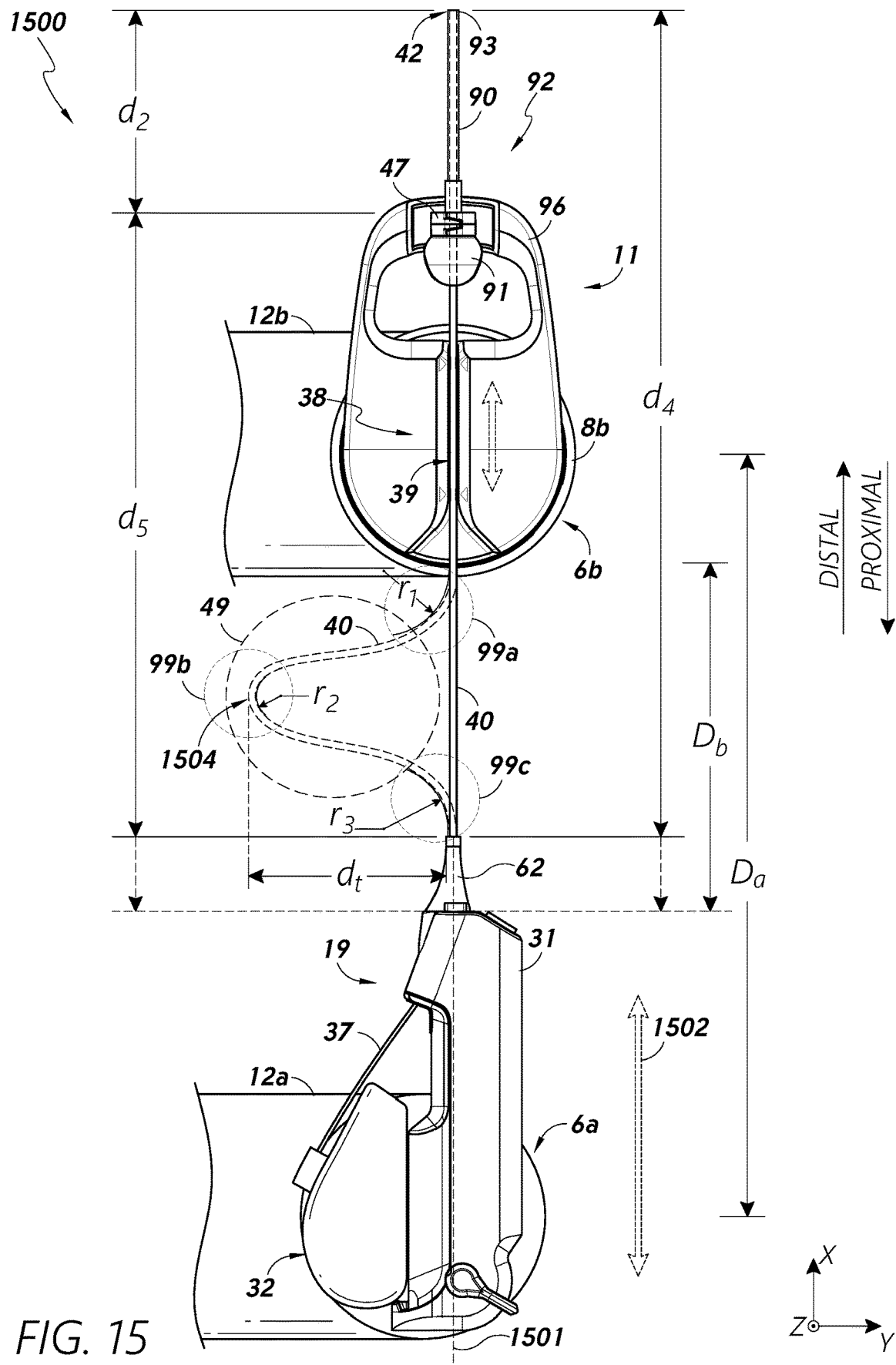
FIG. 15 shows a robotic system including an instrument and an instrument driver/feeder attached to respective robotic end effectors in accordance with one or more embodiments.

In some implementations, modification of axial driving the of the scope by an instrument feeder device/assembly involved stopping or pausing axial movement of the scope in response to determination/detection that the scope (e.g., distal end of the scope) and/or basket projecting there from has reached a specimen collection zone, area, position, or the like. For example, such position may be an area or position 101 located at an approximate midway point between the proximal opening of an access sheath and/or associated funnel port structure and a distal opening or interface with a scope channel and/or axial actuator (e.g., roller(s)) associated with an instrument feeder device/assembly with respect to a driving axis of the scope. The illustrated automatic pause/stop area/position 101 shown in FIGS. 7, 10, and 15 represents an example position, wherein detection of a portion of a scope and/or associated basket at such position may trigger automatic retraction pausing in connection with embodiments of the present disclosure. Any type of sensors may be used to determine scope position including electrical, optical, or other types of sensors. Furthermore, in some embodiments, multiple sensors may be used to provide increased accuracy of positional determination/detection. Sensor information may be relied upon to account for unexpected issues, such as relative slippage between the scope 40 and the driver actuator(s) 38, which may affect the position determinations described herein.

With further reference to FIG. 10, the instrument feeder 11 can include the rollers 38 or other axial actuator means, which are configured to drive axial motion of the shaft of the medical instrument. As noted above, the rollers 38 can be positioned on opposing sides of the channel 39 so as to be positioned on opposing sides of the shaft 40 of the medical instrument 19 when the shaft 40 is loaded into the instrument feeder 11. Accordingly, the rollers 38 can be considered opposing rollers. The rollers 38 can be rotated in a first direction to drive insertion of the shaft of the medical instrument and can be rotated in a second direction to drive retraction of the shaft of the medical instrument.

In some embodiments, the instrument feeder 11 includes springs 88 that are configured to bias the rollers 38 towards a closed position in which they engage with the elongated shaft 40. In addition to biasing the rollers 38 inward toward the channel 39, the springs 88 can also be configured to provide the pressure or friction force necessary to cause the rollers 38 to engage with the shaft 40 of the medical instrument. For example, the springs 88 determine how forcefully the rollers 38 press into the shaft 40 of the medical instrument. The force of the spring 88 can be selected so as to provide a desired pressure or friction against the shaft 40 of the medical instrument. In some embodiments, the spring force of the springs 88 can be used to control or limit the pressure or force that the shaft of the medical instrument can impart on a patient's anatomy during insertion and retraction. This can be accomplished by selecting or setting the spring force, which corresponds to the frictional drive force of the rollers 38, such that the rollers 38 will begin to slip on the shaft of the medical instrument at a prescribed load. By tuning this drive force, the system can maintain a level of applied force that is deemed or defined to be tolerable or safe for a patient. In some embodiments, control circuitry of the system is configured to determine when slippage between the rollers 38 and the shaft 40 has occurred for the purpose of determining scope position.

Vision-Based Scope Position Determination

As referenced throughout, automatic speed modification for scope insertion and/or retraction may be triggered by determination or detection of present scope position during an insertion or retraction process. In some implementations, the determination of the present scope position (e.g., distal tip position detection/determination) may be based on camera data generated by and/or using one or more cameras of the scope. For example, control circuitry of the system may be configured to implement image-processing functionality to recognize the environment of the scope relative to the access sheath and/or other components of the access sheath assembly and/or instrument feeder. In some embodiments, camera images captured by the scope camera during retraction or insertion may be compared to one another and/or to certain reference images to classify/determine the position of the scope with respect to whether the scope is within or without the access sheath and/or what portion of the access sheath the scope is positioned within or near. Such positional determination can serve as a basis for triggering automatic speed modification or stopping/pausing in accordance with aspects of the present disclosure.

In some embodiments, certain markings may be applied and/or formed on various surfaces or portions/components of the access sheath that are identifiable using image-recognition functionality implemented by control circuitry of the system. For example, certain color coding may be implemented to indicate to the system control circuitry the position of the scope based on identification of such color-coded features, which may be associated with certain structures and/or portions/components of the access sheath or other components of the system. For example, visual markings may be applied and/or present on an inside of the funnel port structure 91 and/or support arm/structures 96 of the instrument feeder 11.

In some embodiments, position determination/detection may be based on image recognition functionality that may be based at least in part on output from a neural network framework implemented by the control circuitry of the system. For example, endoscope camera images can provide a basis for scope position determination. Such vision-based scope position determination functionality may be implemented by control circuitry of a medical system using certain image-processing techniques.

Figure 11:
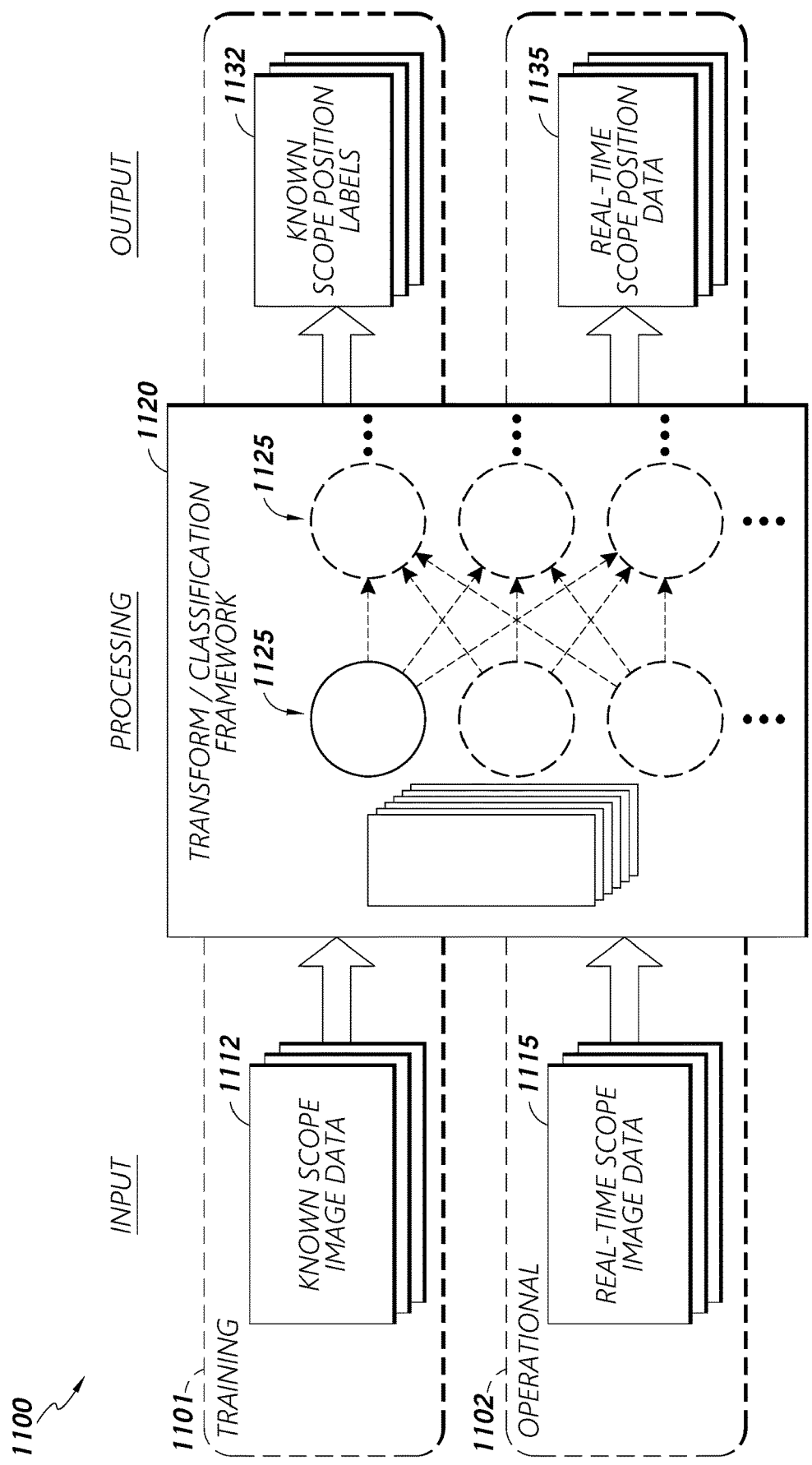
FIG. 11 illustrates a scope position determination image recognition architecture in accordance with one or more embodiments.

FIG. 11 illustrates a scope position determination image recognition architecture 1100 in accordance with one or more embodiments. The architecture 1100 provides a framework for identifying one or more instrument and/or anatomical features in endoscope camera images for dynamically determining scope position based on characteristics of the camera images in accordance with one or more embodiments of the present disclosure. The framework 1100 may be embodied in certain control circuitry, including one or more processors, data storage devices, connectivity features, substrates, passive and/or active hardware circuit devices, chips/dies, and/or the like. For example, the framework 1100 may be embodied at least in part in the control circuitry 251 and/or control circuitry 211 shown in FIG. 4 and described above. The framework 1100 may employ machine learning functionality to perform automatic scope position determination/detection on, for example, ureteroscopic images of internal renal anatomy, internals of access sheath components, and/or the like.

The framework 1100 may be configured to operate on certain image-type data structures, such as image data representing at least a portion of a treatment site associated with one or more medical procedures and/or instrument components used in such procedure(s). Such input data/data structures may be operated on in some manner by certain transform circuitry 1120 associated with an image-processing portion of the framework 1100. The transform circuitry 1120 may comprise any suitable or desirable transform and/or classification architecture, such as any suitable or desirable artificial neural network architecture.

The transform circuitry 1120 may be trained according to known image data. For example, image data may contain representations of medical instrument components and target labels 1132 corresponding to the respective images 1112 as input/output pairs, wherein the transform/classification framework 1120 is configured to adjust one or more parameters or weights associated therewith to correlate the known input and output image data. For example, the transform circuitry 1120 (e.g., convolutional neural network) may be trained using a labelled dataset and/or machine learning. The machine learning framework may be configured to execute the learning/training in any suitable or desirable manner.

The known target labels 1132 may be generated at least in part by manually labeling images as being associated with certain scope positions. For example, manual labels may be determined and/or applied by a relevant medical expert or other technician to label where, for example, a distal end of a scope is relative to an access sheath assembly in the known scope images/data. The known input/output pairs can indicate the parameters of the transform circuitry 1120, which may be dynamically updatable in some embodiments.

The framework 1100 may further be configured to generate the real-time target labels 1135 associated with real-time scope images 1115 using the trained version of the transform circuitry 1120. For example, during retraction of a medical instrument (e.g., scope) during a medical procedure, real-time scope images showing the medical instrument may be processed using the transform circuitry 1120 to generate the real-time target labels 1135 the position of the scope when the real-time images were captured. For example, in some implementations, ureteroscope images may be processed by the transform circuitry 1120 to identify scope position. User notification of the scope position may be provided in response to the real-time scope position label determination 1135. In some implementations, output from the framework 1100 can trigger change in retraction or insertion speed of a scope by an instrument feeder; the instrument feeder may be configured to modify speed or pause/stop retraction or insertion based at least in part on the output. In some embodiments, the framework 1100 may be configured to generate the real-time target labels 1135 in a manner as to indicate in a binary manner whether a particular image indicates that the scope is positioned at an automatic pause/stop position or not.

The transform framework 1120 may comprise an artificial neural network, such as a convolutional neural network. For example, the framework 1120 may implement a deep learning architecture that takes in an input image, assigns learnable weights/biases to various aspects/objects in the image to differentiate one from the other. Filters/characteristics of the framework 1120 may be hand-engineered or may be learned through machine learning.

The framework 1120 may include a plurality of neurons 1125 (e.g., layers of neurons, as shown in FIG. 11) corresponding to overlapping regions of an input image that cover the visual area of the input image. The framework 1120 may further operate to flatten the input image, or portion(s) thereof, in some manner. The framework 1120 may be configured to capture spatial and/or temporal dependencies in the input images 1115 through the application of certain filters. Such filters may be executed in various convolution operations to achieve the desired output data. Such convolution operations may be used to extract features, such as edges, contours, and the like. The framework 1120 may include any number of convolutional layers, wherein more layers may provide for identification of higher-level features. The framework 1120 may further include one or more pooling layers, which may be configured to reduce the spatial size of convolved features, which may be useful for extracting features which are rotational and/or positional invariant, as with certain anatomical features. Once prepared through flattening, pooling, and/or other processes, the image data may be processed by a multi-level perceptron and/or a feed-forward neural network. Furthermore, back-propagation may be applied to each iteration of training. The framework may able to distinguish between dominating and certain low-level features in the input images and classify them using any suitable or desirable technique. In some embodiments, the neural network architecture comprises any of the following known convolutional neural network architectures: LeNet, AlexNet, VGGNet, GoogLeNet, ResNet, or ZFNet.

The framework 1100 may be trained with a sufficient amount of driving data, such as endoscope image data, wherein a truth table may be generated based on known labels of scope position conditions. During operation, the real-time images 1115 and/or other driving information may be used as inputs to the system 1120 to provide the real-time scope position determination results as output 1135.

Stone Retrieval Processes

Figure 12:
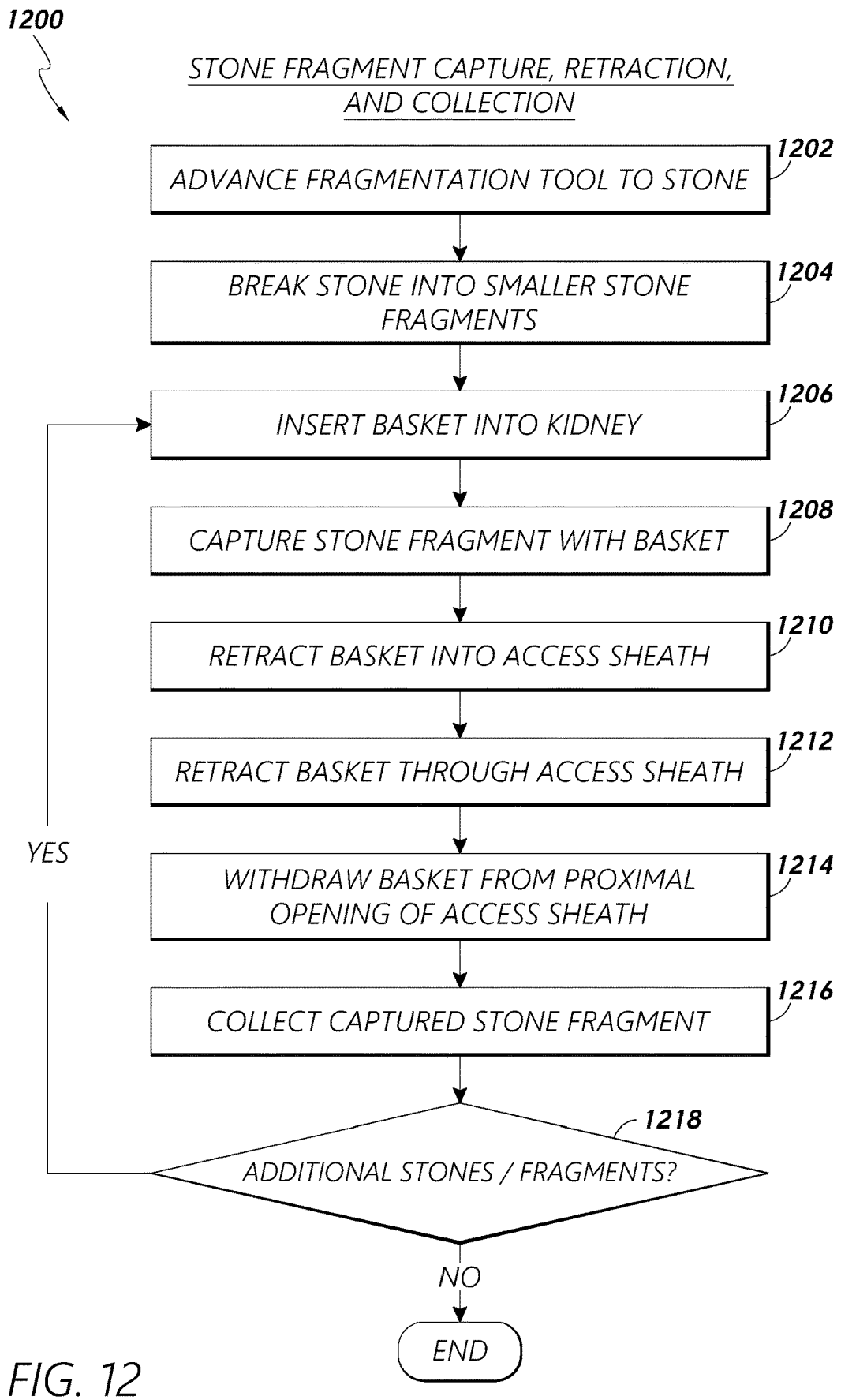
FIG. 12 is a flow diagram illustrating a process for capturing, retracting, and collecting stone fragments in accordance with one or more embodiments of the present disclosure.

FIG. 12 is a flow diagram illustrating a process 1200 for capturing, retracting, and collecting stone fragments in connection with a ureteroscopy procedure in accordance with one or more embodiments of the present disclosure. At block 1202, the process 1200 involves advancing a stone fragmentation tool to an internal anatomical site where a kidney stone is present, such as within an internal calyx network or other anatomy of a kidney. For example, the fragmentation tool may comprise a lithotripsy tool or other tool configured to be used to fragment a relatively large stone or other object. The fragmentation tool may be advanced through an access sheath, such as a urethral access sheath as described herein. The fragmentation tool may be associated with an elongated shaft-type instrument, such as a catheter, endoscope, or the like; the fragmentation tool may be associated with the distal end of such instruments and/or may be disposed within a working channel thereof.

At block 1202, the process 1200 involves breaking the stone into two or more smaller stone fragments using the fragmentation tool. For example, the process 1200 may involve blasting the stone with lasers, drilling the stone, or otherwise cleaving or damaging the stone to produce relatively smaller fragments therefrom. At block 406, the process 1200 involves inserting a stone-capturing device into the kidney and to an area where one or more of the stone fragments is located. In some implementations, a basket may be inserted to the capture site through a working channel of an endoscope (e.g., ureteroscope), wherein the basket comprises a means for capturing stone fragments therein, such as a wireform basket configured to expand and contract as described in detail herein. At block 1208, the process 1200 involves capturing a target stone fragment with the basket. The basket may be projected from the distal tip/end of scope and expanded to allow for the basket to be placed over a target stone fragment, wherein contraction of the basket can secure the stone fragment within the basket to allow for removal thereof within the basket.

At block 1210, the process 1200 involves retracting the basket and distal end of the scope into the access sheath, which may be position/disposed at or near the ureteropelvic junction in some implementations. Some embodiments of the present disclosure provide for automatic slow retraction in the area distal to the distal end of the access sheath. That is, control circuitry of the relevant system may be configured to limit the retraction speed of the scope and basket prior to entry into the access sheath.

At block 1212, the process 1200 involves retracting the basket and scope through the access sheath. For example, according to some implementations, relatively fast retraction speed may be automatically triggered and implemented in response to determination or detection that the distal end of the scope and/or the basket has entered into the access sheath or been inserted/retracted a threshold distance into the access sheath.

At block 1214, the process 1200 involves withdrawing/retracting the distal end of the scope and/or the basket through the proximal opening of the access sheath. According to some embodiments, determination or detection that the distal end of the scope and/or the basket has crossed a threshold point associated with the proximal opening/end of the access sheath assembly may trigger a slowing of the retraction speed of the scope/basket. Such threshold position/point can be associated with a proximal end of the access sheath, the proximal end of a funnel port structure coupled to the access sheath, the midpoint of the funnel port structure, or some point within the access sheath that is near to the proximal end of the access sheath.

At block 1216, the process 1200 involves collecting the captured stone fragment in a collector structure. For example, the collector may be disposed in some manner below a portion of the instrument feeder device/assembly used to retract the scope, wherein opening of the basket causes the captured stone fragment to drop into the collector. At decision block 1218, the process 1200 involves determining whether additional stone fragments remain to be removed from the treatment site. If so, the process loops back to block 1206, where the scope and/or basket are inserted back to the treatment site within the kidney for additional stone fragment capture and removal.

FIGS. 13-1, 13-2, 13-3, 13-4, and 13-5 show a flow diagram illustrating a process for aligning a medical instrument in accordance with one or more embodiments. FIGS. 14-1, 14-2, 14-3, 14-4, and 14-5 show certain images corresponding to various blocks, states, and/or operations associated with the process of FIGS. 13-1, 13-2, 13-3, 13-4, and 13-5, respectively, in accordance with one or more embodiments.

At block 1302, the process 1300 involves capturing a stone fragment 80 with a basket 35 of a basketing device 30, as illustrated in image 1401 of FIG. 14-1. For example, the basketing device 30 may access the target treatment site through a working channel of an endoscope 40, as described in detail herein. The target stone fragment 80 may be disposed within the renal anatomy of a patient that is accessed via the urethra 65, bladder 60, ureter 63, and ureteropelvic junction 78, as described herein. An access sheath 90 may be placed initially within the urinary tract anatomy to provide access to the treatment site to the scope 40, wherein the scope 40 is inserted and retracted through the access sheath 90. The distal end 93 of the access sheath 90 may be disposed in the ureteropelvic junction, as shown.

At block 1304, the process 1300 involves retracting the scope 40 to the distal end/opening 93 of the access sheath 90. In some implementations, determination that the scope is within the ureteropelvic junction and/or distal to the opening 93 of the access sheath 90 may cause automatic speed regulation or modification to ensure that the retraction speed prior to entry into the access sheath 90 is limited or reduced in some manner to prevent injury or damage to equipment and/or anatomy.

At block 1306, the process 1300 involves confirming the position of the scope 40 and/or basket 35 at the distal end 93 of the access sheath 90. For example, such confirmation may indicate that the distal end 42 of the scope and/or the basket 35 is/are disposed just outside the distal end 93 of the access sheath 90, at the distal end 93 of the access sheath, or within the distal end 93 of the access sheath 90. Confirmation may be provided through user input, wherein the physician/user may visually confirm the location of the scope 40 and/or basket through scope images generated by a camera associated with the scope 40, or through other imaging technology/modality, such as CT or the like. Alternatively, the position of the scope tip 42 and/or basket 35 may be determined/detected substantially automatically according to any of the position determination/detection processes or mechanisms described herein.

Determination/detection that the scope tip 42 and/or basket 35 is disposed within the access sheath 90 or in an area proximate thereto may automatically trigger the modification in retraction speed for the scope. For example, in some implementations, determination that the scope and/or basket is disposed within the access sheath may trigger enablement of relatively high retraction speeds. At block 1308, the process 1300 involves fast retracting the scope 40 through the access sheath, as enabled by the confirmation of the position of the scope and/or basket. In some implementations, the user may engage a retraction control mechanism to provide a retraction command when the scope is outside of the access sheath, wherein, in response to such command, the relevant system control circuitry is configured to cause the instrument feeder to retract the scope 40 at a first relatively slower speed until it is determined/detected that the scope 40 has entered the access sheath, at which point the control circuitry may modify the speed of retraction to increase the speed for fast retraction through the sheath 90. That is, in some implementations, a single engagement of the retraction control mechanism by the user (e.g. pulling down on a joystick) can initiate retraction, wherein the speed of retraction is modified according to positional determination(s) along the retraction path. Alternatively, fast retraction within the access sheath 90 may be initiated through a separate engagement of the retraction control input mechanism by the user. That is, after confirming the position of the scope and/or basket, the user may subsequently engage the retraction control mechanism to send a command to retract with the access sheath, wherein the speed of retraction may be enabled to a relatively high rate of speed based on the confirmed location within the access sheath.

Retraction of the scope, as described in detail herein, may be controlled by an axial actuator mechanism 38 (e.g., one or more wheels) of a driver device 11. During retraction, the process 1300 may involve comparing a determined/detected current scope position to a predetermined collection pause/stop location 101 to determine whether scope and/or basket is/are presently at the predetermined pause/stop position 101, as shown at decision block 1310. For example, the predetermined pause location/position 101 (see image 1407 of FIG. 14-2) may be a point between an opening of the access sheath assembly (e.g., opening of the access sheath 90 and/or funnel port structure 91) and a scope-actuation mechanism 38 and/or channel 39. Current scope position may be determined according to any of the position determination/detection means, mechanisms, and/or processes disclosed herein.

If the scope is not yet at the predetermined pause location 101, the process 1300 involves continuing to fast retract the scope through the access sheath in connection with block 1308 and further determining and comparing the present location to the predetermined pause location to determine whether the scope tip 42 and/or basket 35 are at the pause location 101 in connection with block 1310. In some implementations, prior to reaching the predetermined pause location 101, the system control circuitry may be configured to implement a retraction speed modification to reduce the speed of retraction from the fast retraction speed to a slower speed prior to reaching the predetermined pause location 101. For example, such modification speed may be automatically triggered by determination that the scope tip 42 and/or basket 35 have crossed a threshold associated with a proximal portion of the access sheath assembly. For example, the threshold may be associated with a proximal portion of the access sheath 90, an interior of the funnel port structure 91, or an area proximal to the proximal end of the funnel port structure 91. In such implementations, the position comparison step at block 1310 may involve determining whether the current scope location indicates that the scope and/or basket has crossed the retraction slowing threshold.

If it is determined that the scope is presently at the predetermined pause location 101, the process 1300 involves automatically pausing/stopping retraction with the scope tip 42 and/or basket 35 in/over the pause location/area 101 in connection with block 1312, as shown in image 1409 of FIG. 14-2. For example, the system control circuitry may cause the actuator 38 to cease retraction automatically in response to the positional determination/detection. The automatic pause/stop location or area 101 may be positioned over a specimen collector structure 85, such that when the scope tip 42 and/or basket 35 are positioned at the automatic pause location 101, opening the basket 35 may cause the captured stone fragment to fall into the collector 85.

In some implementations, after the scope has been paused at the automatic pause location 101, the process 1300 may involve the user releasing the retraction control mechanism (e.g., joystick), as shown at block 1313. That is, the system control circuitry may receive a signal (or detect a loss of signal) indicating a disengagement or release of the retraction control/command. The release of the retraction control mechanism may enable fine tuning/positioning of the scope by the user. In some implementations, a new retraction command may be received after the first cessation of the retraction command associated with block 1308. In response, the relevant control circuitry can be configured to resume the retraction of the scope.

At decision block 1314, the process 1300 involves determining whether the current scope position is suitable for stone collection. For example, the user may visually confirm whether the scope tip 42 and/or basket 35 are at an appropriate position for stone fragment collection. If the current scope position is not suitable, the process 1300 involves, at block 1315, implementing minor adjustment(s) to the scope position by the user, which may be based on visual monitoring/confirmation. If the position of the scope and/or basket is suitable (e.g., after adjustment at block 1315), the process 1300 proceeds to block 1316, wherein the stone fragment captured in the basket is collected in the specimen collector 85, as shown in image 1413 of FIG. 14-3.

After depositing the stone fragment 80 in the collector 85, if additional stone fragments remain to be collected as determined at decision block 1318, the process 1300 proceeds to block 1319, where the scope is relatively slowly inserted into the access sheath 90. For example, the process 1300 may involve automatically limiting an insertion speed of the scope 40 until the position of the scope within the access sheath 90 and/or funnel port structure 91 is determined or detected, wherein such determination/detection may trigger an automatic increase in insertion speed. For example, as shown at block 1320 of the process 1300, in the access sheath 90, the scope may be inserted relatively fast to allow for efficient performance of the process 1300. When inserting the scope 40 into and through the access sheath 90, the basket 35 may be projected from the distal tip 42 of the scope 40, as shown, or may be pulled within the working channel of the scope.

A further automatic insertion speed modification may be triggered by a determination or detection that the scope tip 42 and/or basket 35 has crossed a threshold associated with a distal end portion of the access sheath 90. For example, such threshold may be associated with a position inside the access sheath 90 in a distal portion thereof or may be associated with an area immediately distal to and outside of the access sheath 90. Once the threshold has been crossed, the system control circuitry may automatically reduce and/or limit the speed of insertion to a relatively slower speed to avoid injury or damage to instruments and/or anatomy.

By providing for automatic scope retraction and/or insertion speed modification in response to scope position determination, aspects of the present disclosure advantageously can require relatively less cognitive load for users/physicians to determine specimen-drop position for the scope. For example, embodiments of the present disclosure provide fully- and/or semi-automatic solutions that allow for a user to hold a retraction/insertion input control to initiate retraction and/or insertion of the scope, wherein modifications in speed of such retraction/insertion may be implemented automatically without requiring further input from the user to prevent damage to equipment and/or patient anatomy and/or to improve efficiency of certain procedures. Some embodiments advantageously provide for automatic stop/pause of scope insertion or retraction when the scope reaches a predetermined position relative to one or more components of the robotic system implementing the procedure. Some embodiments further allow for a user to fine-tune scope position after automatic speed modification (e.g. automatic pause/stop) to provide the user flexibility to adjust the position relative to the automatic stop/pause position. By requiring less cognitive load for the physician when implementing retraction and/or insertion of the scope in connection with a medical procedure, the physician may be enabled to concentrate on relatively more complicated tasks relating to, for example, kidney stone capture, and/or other processes. Furthermore, embodiments of the present disclosure can reduce user errors relating to slowing, stopping, and/or speeding-up of scope movement during a medical procedure.

As described above, in ureteroscopy procedures, the physician may break relatively large stones into relatively small fragments by, for example, lasing or other means, after which a basketing device/system may be used to capture each small fragment and extract it outside the patient. After kidney stone fragment is captured, the physician may wish to relatively quickly extract the stone/fragment through the ureteral access sheath and open the basket to drop the stone in a collection structure. After collection, the basket can be closed, and the scope reinserted inside the access sheath to extract more stones/fragments. Generally, the majority of the time taken during a stone extraction process may be associated with stone capture; once the scope tip is safely retracted into the distal end of the access sheath without any issue of getting stuck at the access sheath opening due to stone size, the retraction process through the access sheath can be implement in a manner that is almost instantaneous.

In certain robotic ureteroscopy procedures, both the scope/shaft feeder and the robotic end effector that the scope is attached to (e.g., distal end of robotic arm) can be used to translate the scope/shaft. FIG. 15 shows a robotic system 1500 including a first medical instrument 19 (e.g., endoscope/ureteroscope, or the like) including an elongate shaft 40 associated with a first robotic arm 12a. In the description of FIG. 15, as with any other embodiment disclosed herein, robotic arms are described for convenience; it should be understood that description of robotic arms and end effectors associated with the distal end of a robotic arm can be any type of robotic manipulator (e.g., end effector) capable of translation in space, such as along an insertion/retraction path/rail. Therefore, references herein to a robotic arm can be understood to refer to any type of robotic manipulator, such as any type of robotic insertion mechanism, linear actuator/translator, rail drive, or the like.

The instrument 19 may include a handle 31, which may be attached or mounted to an end effector 6a and/or adapter component 8a associated with the robot arm 12a. The system 1500 further includes an instrument feeder device 11 configured to axially retract and/or insert the elongate shaft 40 of the instrument 19 when configured as shown in FIG. 15. The instrument feeder 11 is associated with a second robotic arm 12b. For example, the instrument feeder 11 may be attached or mounted to an end effector 6b and/or adapter component 8b associated with the robot arm 12b, as described and illustrated in the present disclosure.

The system 1500 can be configured to retract and insert the elongate shaft 40 through and/or at least partially within a sheath 90 of an access sheath assembly 92. The access sheath assembly 92 may include an introducer port 91, which may be secured to a clip 47 or other feature of the instrument feeder 11. In order to effect such insertion and/or retraction, the actuator means/mechanism 38 of the instrument feeder 11 (e.g., feed-roller wheel(s), track, belt, or the like) can axially move the elongate shaft 40 relative to the feeder device 11. Furthermore, insertion and/or retraction can be facilitated by the movement of the robot arm 12a and/or end effector 6a in a direction parallel with the axis 1501 of the sheath 90 and/or at least a portion of the elongate shaft 40, as indicated in FIG. 15. For example, when retracting the elongate shaft 40, the axial actuator means/mechanism 38 of the feeder device 11 may cause retraction of the shaft 40 in the proximal direction. In addition, or as an alternative, the robot arm 12a may be actuated to move the end effector 6a in the proximal direction along the axis/rail 1501 to withdraw at least a portion of the shaft 40 proximately, thereby reducing the amount of service loop 49 in the shaft 40 between the feeder 11 and handle 31 that might otherwise form if the feeder 11 retracts the shaft 40 without increasing the distance $D_a$ between the robot arms 12a and 12b. Furthermore, during insertion, it may be necessary or desirable for the robot arm 12a to be moved distally toward the feeder 11 to avoid running out of slack in the service loop 49 when the instrument feeder 11 inserts the shaft 40, as may occur if insertion is implemented by the instrument feeder without any increase in distance $D_a$ between the robot arms 12a, 12b. In the event that slack in the service loop 49 is completely exhausted during insertion and the distance $D_a$ is not decreased accordingly, the absence of slack may limit the ability of the feeder device 11 to further insert the shaft 40. Furthermore, damage can be caused to the shaft 40, actuator means/mechanism 38, instrument 19, robotic arm (s) 12a/12b, and/or other instrumentation when further insertion is attempted without any available slack in the shaft 40 between the instrument feeder 11 and the instrument handle 31.

If the instrument feeder 11 (e.g., scope driver) and instrument end effector 6a are operated at the same speed throughout a stone insertion or retraction process, the process may be undesirably slow due to the relatively limited speeds of operation for end effector translation relative to the operating speeds of the shaft actuator(s) of the feeder. Such translation speed limitations can be due to safety and/or damage concerns with respect to the patient and/or instrumentation, or may be based on other physical and/or environmental constraints; fast robotic end effector movement (e.g., for the instrument arm 12a) can be perceived as relatively risky and can cause collision with other objects. At the same time, large retraction distances/lengths can require relatively large workspaces for arm/end effector motion which can be hard to achieve. In view of such considerations, driving the feeder actuator(s) and the scope/instrument end effector 6a at different speeds during one or more stages of an insertion or retraction process can advantageously make the procedure more efficient, safe, and/or tenable. With respect to stone extraction/retraction processes, driving the feeder actuator(s) 38 at relatively high speed during stone extraction can improve efficiency. However, without commensurate increase in the distance $D_a$ between the robot arms from translating the end effector 6a (and/or end effector 6b) in space, relatively large curvature can form in the service loop 49 between the instrument/scope feeder 11 and the instrument end effector 6a, which can cause scope damage. Thus, the coordination between the feeder operation and the instrument handle translation (e.g., via translation of the robotic end effector 6a) during stone extraction (e.g., insertion and/or retraction) can be important for providing improved efficiency and avoid damage to the instrument in connection with the various embodiments disclosed herein.

In some systems, it may be necessary or desirable to limit the proximal or distal speed and/or distance of movement/translation of the robot arm 12a and/or end effector 6a based on workspace limitations. For example, the arm 12a may have a limited range of motion within the physical parameters of the robotic system. That is, the arm 12a and/or end effector 6a may allow for only a limited range of movement along the rail 1501, which may be a virtual rail along which the end effector 6a is configured to be actuated to keep the shaft 40 substantially axial and/or in-line with the channel 39 of the feeder device 11 and/or the access sheath 90. Furthermore, the speed of movement of the robot arm 12a may be limited by mechanical constraints and/or as a means of maintaining safe operation of the robotic system. For example, exactness in movement and/or position may be compromised when the robot arm 12a and/or end effector 6a are translated at too high of speeds.

Generally, the axial actuator means/mechanism 38 of the instrument driver 11 may be configured to axially move (e.g., insert and/or retract) the elongate shaft 40 at a speed that is greater than the maximum distal and/or proximal translation speed of the robot arm 12a, end effector 6a, and/or instrument handle 31. It may be desirable to insert and/or retract the shaft 40 at such relatively high speeds during certain portions of a retraction and/or insertion process in order to provide desirable and/or improved efficiency for execution of the procedure. That is, it may not be desirable to limit the axial actuation of the shaft 40 by the instrument feeder 11 to the maximum retraction and/or insertion speed of the robot arm 12a associated with instrument handle 31. Therefore, the processes disclosed herein may involve maintaining and/or utilizing certain service loop configurations and/or conditions during insertion and/or retraction as a means of allowing for the relatively high retraction/insertion speeds of the instrument feeder 11 to be utilized to quickly insert and/or retract the elongate shaft 40.

Certain embodiments are disclosed herein relating to insertion and/or retraction of elongate shafts of certain medical/surgical instruments, wherein such insertion/retraction is implemented using an instrument feeder device and/or actuator component(s) thereof. However, it should be understood that any description herein of insertion or retraction of an elongate shaft or other instrument may be achieved/performed using instrument feeder actuation and/or robot arm/end-effector translation, as shown in the example implementation in FIG. 15. Furthermore, although FIG. 15 and other figures of the present disclosure show instrument handles and drivers/feeders attached to end effectors associated with distal ends of robotic arms, it should be understood that robotic end effector translation in connection with instrument insertion and/or retraction processes/functionality may be implemented using any type of end effector, whether associated with a robotic arm or not. For example, some systems may include robotic end effectors disposed on a track or other structure, wherein translation of such end effectors can be achieved by sliding/running along the track or other structure.

As a means of promoting safety and efficiency in connection with the various embodiments of the present disclosure, the instrument shaft 40 may advantageously be retracted or inserted at different speeds depending on determination of a present position of the distal end of the shaft 40 according to any of the position determination means/mechanisms disclosed herein. For example, the position of the shaft tip 42 relative to the tip 93 of the access sheath 90 and/or the automatic pause location 101 (not shown in FIG. 15) may be used to govern speed of operation of the feeder actuator(s) 38 and/or end effector 6a translation. In some embodiments, position determination and/or retraction/insertion speed control is based on certain system data, which may be input by a user into the system in some manner. For example, data relating to the scope length $d_4$, sheath length $d_2$, the distance $D_a$ between the scope arm end effector 6a and the scope feeder end effector 6b can be obtained from the system and/or input by a user. Such information can be used to determine/calculate the position of the distal end 93 of the sheath 90 with respect to the position of the distal end of the shaft 40. Where the collection position (e.g., automatic pause location) is set to be outside the proximal end of the access sheath assembly 92 (e.g., with some amount of buffer), once the position of the access sheath is determined, the collection position can be calculated based at least in part on such information.

Although end effector translation (e.g., for an end effector associated with a medical instrument, such as an endoscope) is disclosed herein as generally being along a rail that is in-line with the feeder channel and/or sheath axis, such translation need not be along such rail, and rather may be along a path that is angled with respect to such reference lines. Furthermore, up and down translation may be implemented in connection with the various processes disclosed herein to achieve the desired distances between end effectors/instruments. In addition, plates or other components of an end effector or end effector adapter may be rotated to provide the desired distances for shaft service loops and/or reduce the curvature present in such service loops.

FIG. 16 shows an assembly of an instrument driver/feeder device 11 and an access sheath assembly 92, wherein certain scope retraction speed zones are identified in accordance with one or more embodiments. With respect to processes for retracting a scope 40 into and through an access sheath assembly 92, such as may be implemented after a stone fragment has been collected following insertion, the insertion and retraction process(es) can advantageously be repeated multiple times in a single surgical setting. Retraction of the scope 40 into the sheath 90 of the access sheath assembly 92 can require the physician to pay close attention and/or operate the retraction at relatively low speeds for the purpose of avoiding damage to the patient, the scope assembly 92, and/or other instrumentation that can result from overly aggressive retraction outside the distal end 93 of the sheath.

According to some position-based retraction speed control schemes of the present disclosure, the total travel path of the distal end of the relevant instrument shaft 40 can be divided into two, three, four, or more different zones, wherein the speed of retraction may be executed/determined differently based on which zone the shaft tip is presently in. For example, such zones may include one or more of slow retract zones $Z_1$, $Z_3$, normal/fast-retract-buffer zones $Z_{B1}$, $Z_{B2}$, fast retract zones $Z_2$, and/or pause/stop zones/locations 101, wherein the retraction speeds implemented in the respective zones may be implemented automatically.

Initially when retracting the distal end of the scope or other elongate shaft instrument 40 into the access sheath 90, retraction involves bringing the distal end 42 of the scope into the distal opening 93 of the access sheath 90. According to the scheme of FIG. 16, the area immediately distal to the access sheath 90 may be within a slow retract zone $Z_1$. The system control circuitry may be configured to control retraction speed of the shaft 40 at a relatively slow speed to allow for retraction of the distal end 42 of the shaft 40 into the distal end 93 of the access sheath 90 and provide confirmation input confirming the successful entry of the distal end 42 of the shaft and/or the basket 35 or other working instrument associated therewith. According to some implementations, a sheath entry confirmation zone $Z_0$ represents an area distal to the distal end 93 of the sheath 90 and covering a distal portion of the sheath 90 as well, in which area the operator/technician may provide an indication of confirmed successful entry into the access sheath 90 once the distal tip 42 of the shaft 40 has successfully entered the access sheath 90. While the shaft 40 is in the confirmation zone $Z_0$, a pop-up window or other graphical interface may be generated and/or presented to the operator/technician to confirm the position of the distal end 93 of the access sheath 90. For example, to ensure safety, fast retraction mode may only be enabled/permitted after the user has confirmed the sheath tip 93 position (e.g., as visible on a camera image of the instrument camera). Until the position of the tip 93 of the sheath 90 and/or the successful entry of the shaft 40 into the sheath 90 is confirmed, the retraction of the shaft 40 may be implemented at a relatively lower speed (e.g., 'normal' speed). Control of retraction speed of the shaft 40, as implemented using any control circuitry of the system, may be based on presence/position determination of the tip 42 of the shaft 40 within any of the various zones shown in FIG. 16 (and FIG. 17, described below).

After the scope tip 42 has been retracted into the sheath tip 93, the scope tip 42 may enter a 'normal,' or 'buffer,' retract zone ($Z_{B1}$ and/or $Z_{B2}$; also referred to as 'fast retract buffer zone(s)' in some contexts for convenience and/or clarity). The fast retract buffer zone(s) can be implemented to ensure that a basket tip 35 (or other working instrument) protruding from the shaft 40 is also safely retracted into the sheath 90 without becoming stuck. As an additional consideration, the distance between the robotic end effector (e.g., robot arm end effector) associated with the instrument handle and the end effector associated with the instrument feeder 11 may also need to be greater than a certain threshold distance when fast retraction is initiated to ensure a curvature associated with a service loop of the shaft is not too tight, which could cause damage to the instrument shaft 40. As a result, depending on the length $d_2$ of the access sheath 90, fast retraction may be initiated once the shaft tip 42 passes the threshold 152 associated with the distal boundary of the fast retract zone $Z_2$. In some implementations, an additional fast retract buffer zone $Z_{B2}$ may exist between the initial fast retract buffer zone $Z_{B1}$ and the fast retract zone $Z_2$ where the shaft retract speed is driven at relatively higher speeds than in the first buffer zone $Z_{B1}$ but lower speed than the fast retract zone in order to increase the distance between the feeder and the instrument handle until it meets the minimum distance required to start fast retraction. After the scope tip 42 retracts into the fast retract zone ($Z_2$), the instrument feeder actuator(s) can be accelerated to a maximum operating speed. In some embodiments, once fast retraction has been initiated, the instrument shaft may be retracted at the fast retraction speed until the automatic pause position 101 is reached. During the retraction process, if the instrument handle end effector reaches a retraction workspace limit, the retraction translation of the instrument end effector may be paused, such that retraction is achieved solely through axial actuation of the shaft 40 by the instrument feeder 11.

In some implementations, the sheath-entry confirmation zone $Z_0$ may overlap with the slow retract zone $Z_1$, which may span an area distal to the access sheath 90 as well as a distal portion of the access sheath 90. In some implementations, the slow retract zone 4/only includes an area distal to the distal end 93 of the access sheath 90, whereas the distal end 93 of the access sheath 90 represents a threshold transition into another more proximal zone. Within the slow retract zone $Z_1$, retraction speed may be limited to a relatively slow speed, such as approximately 5 mm/s, or other speed that is relatively slow compared to other retraction speeds implemented in connection with the retraction scheme associated with FIG. 16 and/or any other embodiment of the present disclosure.

According to some retraction (and/or insertion) schemes, control of retraction (or insertion) may be implemented in connection with a plurality of speeds, including, for example, a slow insertion/retraction speed may represent a slowest speed or speed limit of the relevant retraction/insertion scheme. A 'slow' insertion or retraction speed in accordance with aspects of the present disclosure may be a speed of 10 mm/s or less, such as a speed of between 5 and 10 mm/s, about 5 mm/s, 3 to 5 mm/s, or less than 3 mm/s. A 'normal' insertion/retraction speed may represent a speed of retraction/insertion that is greater than the slow speed, and may represent a default retraction/insertion speed, or other speed typical of certain procedural stages of an insertion or retraction process. A normal insertion/retraction speed may be between approximately 10 to 30 mm/s, such as a speed between 20 to 30 mm/s or between 10 to 20 mm/s. For example, in some implementations, a normal speed of retraction/insertion may be about 11 mm/s. An 'intermediate' speed (also referred to as 'intermediate-fast') may represent a speed of retraction/insertion that is greater than the normal speed. The intermediate insertion/retraction speed may be between approximately 30 to 100 mm/s, such as a speed between 50 to 100 mm/s or between 30 to 50 mm/s. For example, in some implementations, an intermediate speed of retraction/insertion may be about 30 mm/s. In some implementations, an intermediate speed of retraction/insertion may correspond to a maximum desirable or allowable robotic end effector translation speed, such as robotic arm translation speed, as described above. A 'fast' insertion/retraction speed may represent a speed of retraction/assertion that is greater than the intermediate speed, and may represent a maximum possible or allowable retraction/insertion speed. For example, such fast retraction/insertion speeds may be implemented strictly within an access sheath to avoid damage to instrumentation and/or patient anatomy. A fast insertion/retraction speed may be between approximately 100 to 200 mm/s, such as a speed between 100 to 150 mm/s or between 150 to 200 mm/s. For example, in some implementations, a fast speed of retraction/insertion may be about 170 mm/s.

According to the retraction speed zone scheme of FIG. 16, a portion of the slow retract zone $Z_1$ may be considered a fast retract buffer zone $Z_{B1}$ within the access sheath 90. For example, position determination of the distal end 42 of the shaft 40 between the distal end 93 of the access sheath 90 and a threshold 155 a certain distance from the distal end 93 of the access sheath may indicate that the shaft 40 is within the access sheath 90, but not a far enough distance within the access sheath 90 to ensure that the basket 35 or other working instrument associated with the shaft 40 has also been brought within the access sheath 90. In some embodiments, the threshold 155 associated with the proximal boundary of the fast retract buffer zones $Z_{B1}$ may correspond to a threshold 152 associated with the proximal end of the slow retract zone $Z_1$. In some implementations, the retraction speed within the slow retract zone $Z_1$ and/or fast retract buffer zone $Z_{B1}$ may be limited to a normal retraction speed (e.g., speed of about 11 mm/s).

An area within the sheath 90 that is proximal to the slow retract zone $Z_1$ and/or fast retract buffer zone $Z_{B1}$ one may be considered a fast retract zone $Z_2$, in which retraction speed may be increased to a relatively fast speed, such as about 170 mm/s or other speed, which may represent a maximum retraction speed for the system. In some embodiments, a zone $Z_{B2}$ may be present between the proximal threshold 152 of the slow retract zone $Z_1$ and the distal threshold of the fast retract zone $Z_2$. In such embodiments, retraction in the zone $Z_{B2}$ may be implemented at an intermediate speed that is faster than the normal speed but less than the fast retraction speed. For example, the intermediate (also referred to as intermediate-fast) speed may be about 30 mm/s, and may, in some embodiments, correspond to a maximum robotic translation speed associated with the robotic end effector attached to the handle or base of the instrument being retracted.

In some embodiments, the fast retract zone $Z_2$ may extend proximately past a proximal end of the sheath 90 and/or introducer component 91 of the access sheath 92. For example, the fast retract zone $Z_2$ may extend to an automatic pause/stop position 101, as described in detail herein. For example, the system control circuitry may be configured to implement fast retraction through the proximal end of the access sheath assembly 92 and to automatically stop/pause at the location 101. In some embodiments, a slow retract zone $Z_3$ may be implemented between a proximal portion of the access sheath assembly 92 and the automatic pause location 101, such that retraction of the scope may proceed at the maximum speed through the fast retract zone $Z_2$, but slow down to a relatively slower speed (e.g., intermediate, normal, or slow speed, as defined above) prior to ultimately stopping/pausing at the automatic pause location 101.

Figure 17:
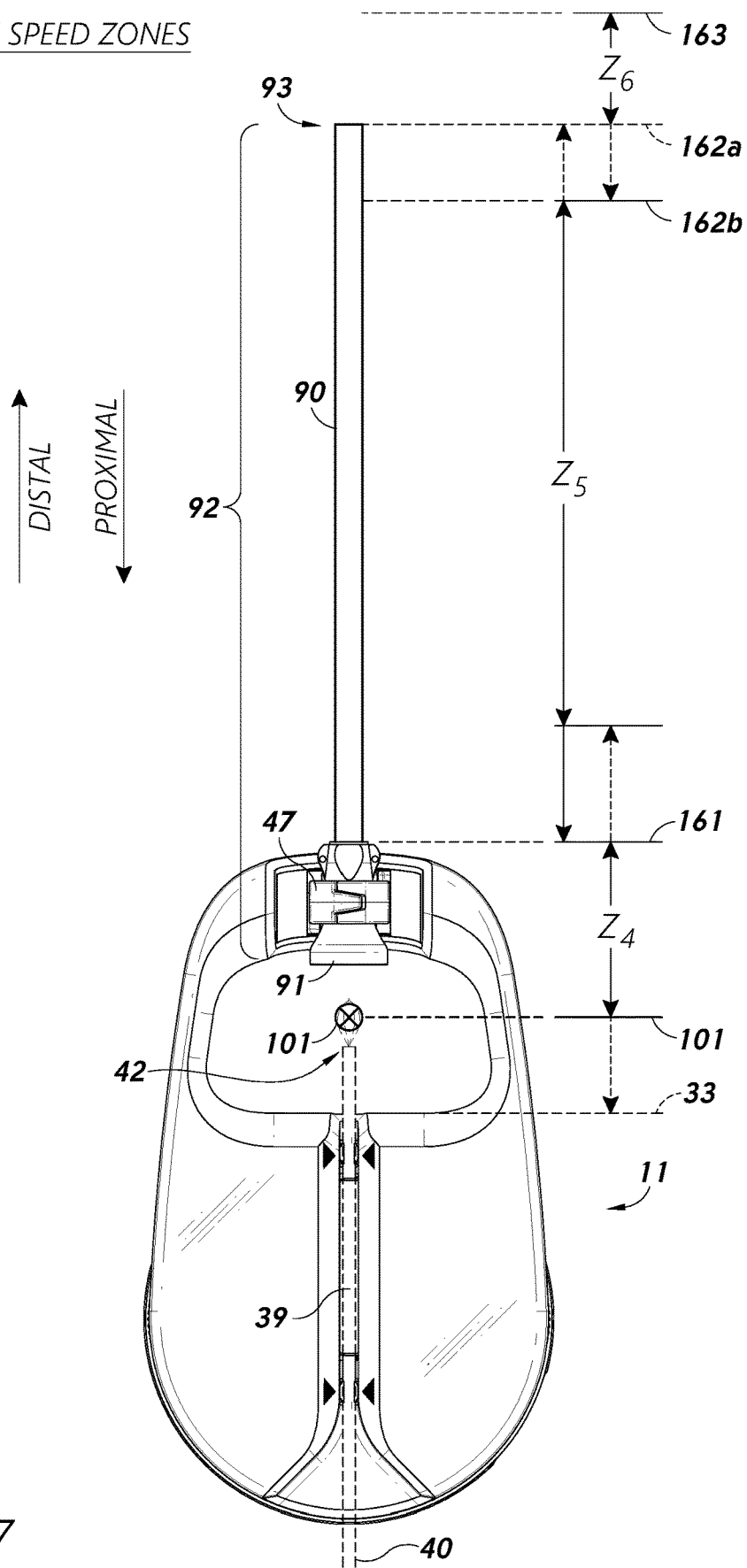
FIG. 17 shows an assembly of an instrument driver/feeder device and an access sheath assembly, wherein certain speed zones are identified in accordance with one or more embodiments.

FIG. 17 shows an assembly of an instrument feeder device 11 and an access sheath assembly 92, wherein certain scope insertion speed zones are identified in accordance with one or more embodiments. With respect to processes for inserting a scope 40 into and through an access sheath assembly 92, such as may be implemented after a stone fragment has been deposited following retraction, the insertion and retraction process can advantageously be repeated multiple times in a single surgical setting. Reinsertion of the scope 40 into the sheath 90 can require the physician to pay close attention to the scope camera view for the purpose of guiding the physician to slow down the scope insertion when approaching the distal exit 93 of the access sheath 90 to avoid tissue damage that can be a result of overly aggressive insertion outside the distal end 93 of the sheath.

With respect to robotic systems in which the physician/operator inserts the scope/shaft 40 using a pendant joystick or other user input control, the physician may hold the control in the insert position/engagement to implement fast insertion through the access sheath 90. If the physician is too cautious, he/she may slow down inside the access sheath 90 too early, thereby causing an increase in the overall procedure time. If the physician is not very careful or gets distracted during the insertion process, he/she runs the risk of over insertion and could potentially cause tissue damage. In addition to the need of getting the timing correct to transit from fast insertion speed/mode to relatively slower insertion speed/mode, the physician can benefit from feedback indicating that/when there is relatively high insertion force at/on the scope tip. In systems in which no manual feedback from the scope is provided to the physician, such as with respect to certain robotic solutions where the scope is inserted through the instrument feeder rollers instead of held by the hand of the physician, it can be advantageous for the system to provide indications to the physician indicating when high force is sensed from the drive rollers, which may indicate that the scope/shaft is running into obtrusion and experience high force at the tip.

After the operator/physician collects a specimen (e.g., stone fragment) near the automatic pause position 101, the operator may proceed by reinserting the shaft 40 back into the sheath 90. As the sheath entrance is generally relatively narrow, starting fast insertion too soon may cause the operator to miss the entrance, possibly causing damage to instrumentation and/or anatomy. Therefore, it may be desirable to drive the shaft 40 at the normal insertion speed in the zone $Z_4$ proximal to the sheath 90 (and/or covering a proximal portion within the sheath 90). As the shaft tip 42 inserts past the proximal end 161 of the sheath 90, it enters the fast insertion zone $Z_5$, where the scope accelerates to its maximum speed.

Generally, with the support of the access sheath 90, the shaft's articulation section (e.g., distal portion of the shaft 40) may not be fully exposed in the area immediately distal to the distal end 93 of the access sheath 90. That is, the shaft 40 can be relatively rigid and less likely to buckle when the distal end 42 of the shaft 40 is advanced out of the end 93 of the access sheath 90. Therefore, the region immediately distal of the end 93 of the access sheath 90 can be considered a high-risk area for causing ureter avulsion, and as such, fast insertion speeds can pose undesirable risks. In order to limit the scope insertion force and prevent harm to the patient, care should generally be exercised by the physician as to not insert past the distal end 93 of the access sheath 90 at high speed. Driving/inserting the shaft 40 at relatively slow speeds through the distal exit 93 of the sheath 90, as enabled through automatic speed modification triggered by scope position determination/detection in accordance with aspects of the present disclosure, can help the physician stop insertion in time when sensing any obtrusion from driving to avoid avulsion.

To prevent the shaft 40 from inserting at the fast speed out of the sheath 90, a threshold 162 transitioning to a slow insertion zone $Z_6$ is set at or near the distal end 93 of the sheath 90. The transition to the slow insertion zone $Z_6$ can provide a buffer for slow insertion help prevent the distance between the instrument end effector and the feeder end effector from decreasing to too close a distance to prevent too tight a curvature in the shaft service loop. During fast insertion, both the shaft tip 42 and the instrument end effector position can be monitored, wherein translation of the end effector associated with the base/handle of the instrument 40 may be automatically paused when the tip 42 of the shaft 40 reaches the distal boundary of the fast insertion zone $Z_5$ until no more (or a threshold amount of) service loop remains. In some implementations, when no more service loop remains in the shaft 40 between the feeder 11 and the instrument base/handle (not shown in FIG. 17; see FIG. 15), fast insertion may automatically end and operation may transition to a slower insertion speed (e.g., in the slow insertion zone $Z_6$). That is, the distal boundary of the fast insertion zone $Z_5$ can dynamically change based on when the service loop is (or is projected to be) exhausted. Depending on the length $d_2$ of the sheath 90, a relatively higher insertion speed zone may be implemented for insertion between the end 162b of the fast insertion zone $Z_5$ to the start 162a of the slow insertion zone $Z_6$. When the shaft tip 40 enters the slow insertion zone $Z_6$ near the sheath distal tip 93, the insertion speed may drop down so that the operator can drive the shaft 40 relatively slowly and safely out of the sheath tip 93, during which time insertion force may be monitored to prevent tissue damage.

The various solutions presented herein for determining current shaft position may be implemented to determine when the shaft tip 42 enters the slow insertion zone $Z_6$. For example, other than using robotic data to determine the position of the distal tip 42 of the shaft 40, other solutions can involve the use of other sensors to detect when the shaft 40 reaches the distal tip 93 of the access sheath 90. Any mechanism for determining when the shaft is entering the slow insertion zone $Z_6$ may be implemented. As disclosed in detail herein, in some embodiments, the camera of the instrument 40 can be leveraged to detect the position of the tip 42 of the shaft 40. For example, computer vision algorithm(s) can be utilized to recognize the environment of being near the tip 93 of the sheath 90. In some embodiments, an electromagnetic sensor can be used in systems in which the distal tip 42 of the shaft 40 includes an electromagnetic sensor and is positioned within an electromagnetic field generated by an electromagnetic field generator. For example, during shaft insertion, control circuitry of the system can be configured to compare electromagnetic sensor position data with respect to the position (e.g., electromagnetic sensor determined position) of the tip 93 of the access sheath 90 and automatically initiate a transition to a relatively slower insertion speed when entering slow insertion zone $Z_6$. In some embodiments, signals/data from multiple sensors can be combined/utilized to provide scope position determination.

With respect to insertion speed control in the slow insertion zone $Z_6$, some embodiments of the present disclosure provide for dynamic speed adjustment based on one or more parameters. For example, rather than implementing a fixed speed while driving through the slow insertion zone $Z_6$, control circuitry of the system can be configured to adjust the insertion (or retraction) speed based on an amount of force sensed/determined on or with respect to the axial actuator (e.g., roller(s)) of the instrument feeder 11. In some embodiments, the shaft 40 first transitions from a relatively fast insertion speed to a relatively slower insertion speed, wherein such relatively lower speed may be maintained through the end 93 of the access sheath 90 if the force on the drive actuator roller(s) remains below a predetermined threshold. If the force on the drive actuator roller(s) increases beyond the predetermined threshold, the insertion (or retraction) speed can be automatically further reduced to allow more time to detect and react to potential high force and avoid relatively sudden peaks in force.

In some embodiments, the tip 42 of the shaft 40 can include or be associated with a force sensor. In such embodiments, if the shaft 40 is inserted through a certain insertion mechanism (e.g., access sheath assembly 92), a force sensing at the insertion mechanism could also be used to detect a change of force profile due to relatively high tip 42 insertion force, as indicated by signal(s) from the tip force sensor(s). In some implementations, shape sensing can be implemented to detect relatively high insertion forces. For example, in situations in which at least a portion of an articulation portion of the shaft 40 is disposed distal to the distal end 93 of the access sheath 90, the shaft 40 may have a tendency to buckle when relatively high forces are encountered. Such buckling can be captured though shape sensing of the buckled scope portion. Shape sensing can be implemented using scope camera images, or any type of imaging or position-detection modality, such as computed tomography (CT), ultrasound, electromagnetic position sensing, or the like.

In some implementations, the instrument feeder 11 is configured to automatically slow down the shaft insertion speed when the shaft tip 42 exits the access sheath 90 or approaches an exit/opening in the sheath 90, such as when the shaft tip 42 exits the distal end 93 of the sheath 90. The slow-down insertion/retraction zone $Z_6$ can be set such that the proximal threshold 162 thereof is a certain distance inside the distal portion of the sheath 90. The distal threshold 163 of the slow-down insertion/retraction zone $Z_6$ can be a distance distally outside the sheath end 93. The various thresholds shown in FIGS. 16 and 17 that can serve as the basis for automatic scope speed modification in accordance with embodiments of the present disclosure can respectively only be active or serve as speed modification triggers for either insertion or retraction, but not both, according to some implementations. For insertion, the entrance/threshold 152 of the slow insertion zone $Z_6$ can be set at a position that allows the physician to visually see the tip 93 of the sheath 90 on the scope camera image when transiting from fast insertion to slow insertion. The exit of the slow insertion zone $Z_6$ can be set at a position to cover at least a portion of the articulation portion of the shaft 40. After exiting the slow insertion zone $Z_6$ during insertion, the articulation portion of the scope may be fully outside the sheath 90. At such position, the shaft 40 may no longer be substantially supported by the access sheath 90 and therefore the exposed portion of the shaft 40 may be relatively more flexible than when the scope articulation portion is disposed mostly within the sheath 90 and less likely to cause high insertion force at the tip 42. Therefore, distal to the threshold 163, the instrument feeder 11 may be configured to automatically increase the insertion speed of the scope, such as to a normal insertion speed mode.

When the user activates an insertion control (e.g., moving a joystick or other control in an up/forward direction) to send a scope insertion command, the instrument feeder 11 may be configured to insert the shaft 40 through the access sheath 90, wherein system control circuitry is configured to monitor the shaft tip 42 position during insertion. The shaft tip 42 position with respect to the access sheath tip 93 can be determined from the system using certain known parameters, such as the insertion distance of the instrument feeder, the access sheath length, the scope/shaft length, and/or the distance between instrument-connected robot arm and the instrument-feeder-connected robot arm, wherein such parameters/dimensions are described in detail above with respect to FIG. 10 and other figures. When the shaft tip 42 position is determined to be within the slow insertion zone $Z_6$, the system control circuitry and/or instrument feeder 11 can be configured to automatically drop the insertion speed down to a speed lower than the normal driving speed for the scope.

In some embodiments, the torque on the instrument feeder axial actuator (e.g., roller(s)) can also be monitored during insertion. For example, as the shaft 40 is driven through the actuator rollers of the feeder 11, if there is relatively high force experienced by the shaft 40 at the shaft tip 42, part of that tip force may be detectable/translated back to the driving axes of the axial actuator mechanism of the instrument feeder 11. In some embodiments, such force can be detected using one or more torque sensors associated with driving axes of the instrument feeder 11. With a relatively slow driving speed, the force on the tip 42 of the shaft 40 may increase relatively gradually rather than presenting as spike(s) in force, which can provide the system relatively more time to detect and react to high insertion forces before the force becomes high enough to be problematic. For embodiments in which the axial actuator/driver means of the instrument feeder 11 comprises two rollers, as described in detail herein, the sums of the forces on the two drive rollers can be determined continuously, periodically, or sporadically during the insertion of the shaft 40. When the sum of the drive roller/wheel forces crosses a predetermined force threshold, the system control circuitry and/or instrument feeder 11 can cause the shaft 40 to be stopped or slowed. In such instances, a high insertion force fault may be thrown to notify the user about the high tip force detected. Such implementations can advantageously provide an alternative feedback mechanism compared to the textile sensing on the scope shaft for the user during certain manual procedures.

Embodiments of the present disclosure can provide certain advantages over other scope insertion and/or retraction solutions. For example, systems, devices, and methods disclosed herein can provide relatively efficient, comfortable and safe means for inserting and retracting scopes and other shaft-type instruments through and out of access sheaths. Furthermore, the automatic nature of instrument insertion/retraction speed modification solutions presented herein can require relatively less cognitive load for a user to determine when to slow down at the distal and/or proximal ends/openings of access sheaths and/or access sheath assemblies. Automatic transition from relatively fast insertion/retraction speeds to relatively slower insertion/retraction speeds in accordance with aspects of the present disclosure can allow for the implementation of maximum/high insertion/retraction speeds when driving through the major part of the access sheath, and can also simulate the natural user behavior generally associated with manual procedures on slowing down and driving with caution when inserting/retracting a scope outside of an access sheath.

With respect to safety advantages provided by embodiments of the present disclosure, driving a scope at relatively slow speeds in predetermined and detected zones associated with regions associated with relatively high risk of, for example, ureter avulsion, can provide the relevant robotic system more/sufficient time to detect/determine the presence of relatively high force signals associated with portion(s) of the shaft being driven and react sufficiently quickly to prevent any potential damage. Moreover, the relevant user/physician may be enabled to control the insertion/retraction process through, for example, pendant joystick control through robotic system interfacing. This can reduce the fatigue caused by manually holding the scope for relatively long period of time and can facilitate physician focus on other tasks associated with the procedure. Furthermore, embodiments of the present disclosure can allow the physician/user to experience feedback to confirm relatively high insertion forces present on the scope tip. For example, the robotic systems of the present disclosure may allow the user/physician to undock the scope instrument for the purpose of holding and manually handling the scope instrument in a manner similar to certain manual procedures in one or more respects.

Figure 18:
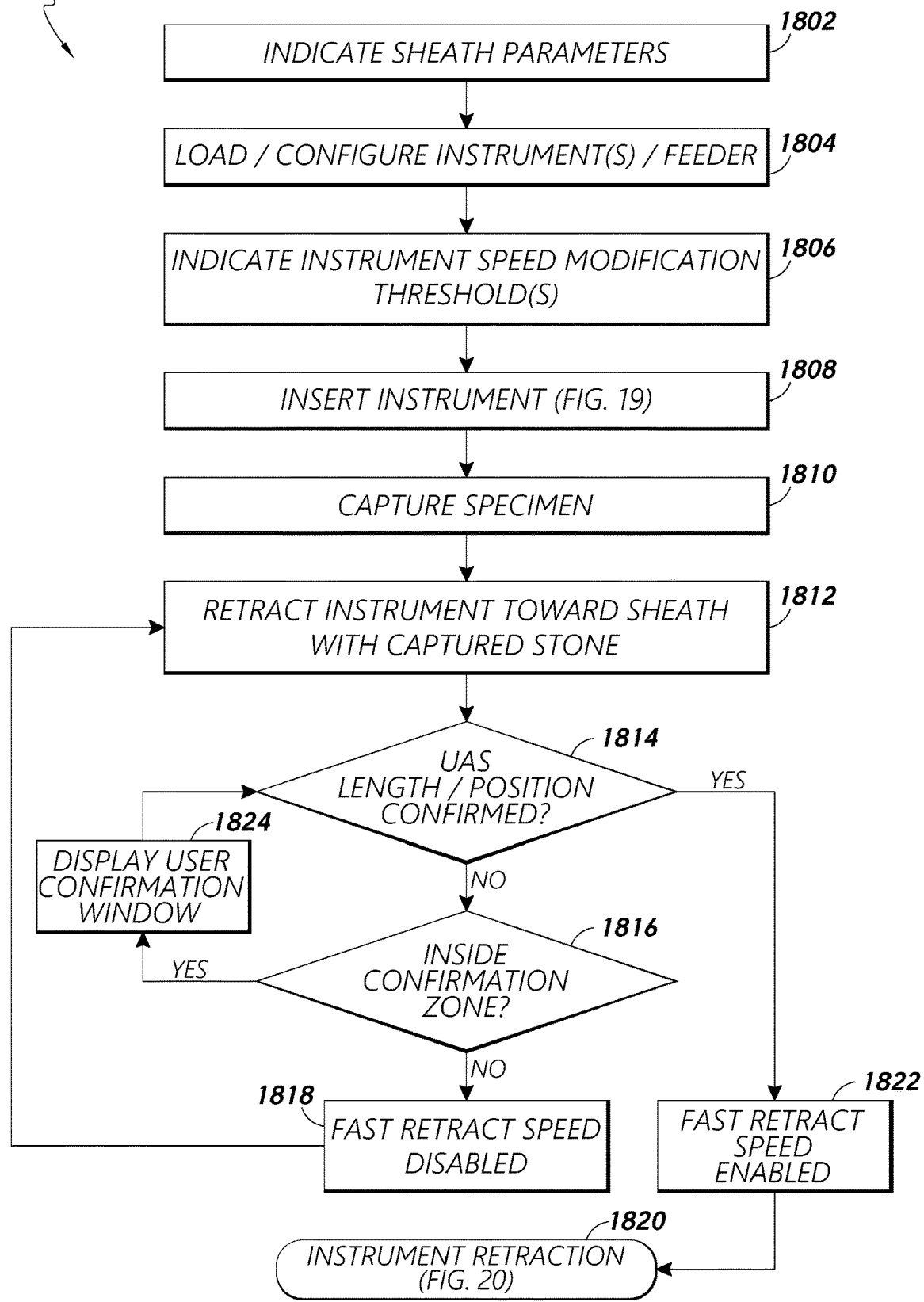
FIG. 18 is a flow diagram illustrating a process for confirming sheath position in accordance with one or more embodiments of the present disclosure.

FIG. 18 is a flow diagram illustrating a process 1800 for confirming sheath position in accordance with one or more embodiments of the present disclosure. For example, sheath position confirmation may be implemented as a means for enabling fast retraction and/or insertion speeds for stone fragment retrieval cycles in accordance with aspects of the present disclosure. The process 1800 may be performed at least in part by control circuitry of the relevant system and/or by a physician and/or other user/technician.

The process 1800 may be implemented at least a first time a user retracts an instrument into an access sheath in connection with a surgical procedure. As described herein, various instrument insertion/retraction speed modifications can be implemented in response to a determined position of the instrument relative to an access sheath. Such position determination can be based on certain system/robotic data. Due to potential variations in actual sheath lengths/dimensions, it can be necessary or desirable for the user to confirm (e.g., visually) the position of the distal end (and/or other portion(s)) of the access sheath. Such confirmation may be obtained through user input/output mechanism(s) (e.g., electronic display engagement/interaction).

At block 1802, the process 1800 involves indicating one or more parameters associated with the relevant access sheath, such as length, brand, and/or other characteristics thereof. For example, a user interface may be implemented to allow for user input indicating such parameters. As an example, the control system 50 of the medical system 100 shown in FIG. 1 may be used to implement the relevant user input/output for sheath parameter registration in connection with block 1802. The operation(s) associated with block 1802 may be performed prior to connecting the shaft-type instrument and/or instrument feeder to respective robotic end effectors.

At block 1804, the process 1800 involves loading and/or configuring certain instruments to be utilized in the relevant medical procedure. For example, such instruments may include a medical instrument including an elongate shaft, such as an endoscope or the like, and an instrument feeder device, or the like, as described in detail herein. Such loading may involve attaching the instruments to respective robotic end effectors, as described herein. In some embodiments, the operations associated with block 1804 may involve attaching a basket cartridge/system to a robotic end effector and loading one or more components thereof into a working channel of a medical instrument shaft. Block 1804 may further involve loading the elongate shaft of a medical instrument into an actuation channel of an instrument feeder device, as described in detail herein.

At block 1806, the process 1800 may further involve indicating one or more instrument speed modification thresholds, which may correspond to certain relative positions of a medical instrument (e.g., shaft tip) with respect to the access sheath. For example, one or more thresholds may be indicated associated with proximal and/or distal boundaries of a fast retract/insertion zone.

At block 1808, the process involves inserting a medical instrument (e.g., shaft) at least partially through the access sheath. For example, an elongate shaft such as an endoscope may be inserted through the sheath in connection with a medical procedure, such as a kidney stone removal procedure. Aspects of such instrument insertion process may include features described below in connection with FIG. 19.

At block 1810, the process 1800 involves capturing a biological specimen to be extracted through the access sheath, such as a kidney stone or kidney stone fragment. Such capture may be achieved using a basket device that is projected from a distal end of the shaft and disposed at least partially within a working channel thereof. At block 1812, the process 1800 involves retracting the medical instrument shaft towards a distal end of the access sheath with the captured specimen. For example, the distal end of the access sheath may be positioned within an internal conduit, vessel, chamber, or other anatomical area, such as a ureter, bladder, urethra, and/or ureteropelvic junction of the patient. Such retraction towards the access sheath may advantageously be implemented at a relatively slow speed to avoid damage to the access sheath and/or surrounding anatomy.

At block 1814, the process 1800 involves determining whether the position of the distal end of the medical instrument shaft within the distal end of the access sheath has been determined or confirmed. For example, confirmation of such position may be performed while the distal end of the shaft is within a confirmation zone, such as the zone $Z_0$ shown in FIG. 16, for example. When the distal end of the shaft is within the confirmation zone, as indicated by the flow path emanating from decision block 1816, user output may be presented to solicit confirmation indication from an operator, as shown at block 1824. Any other suitable or desirable means or mechanism for confirming position of the distal end of the shaft within the access sheath may be implemented in connection with the process 1800. The user confirmation output can comprise a pop-up window presented on an electronic display. The user may engage with a confirmation input feature (e.g., a button) to confirm the length of the sheath.

Once the position of the distal end of the shaft within the distal end of the access sheath has been confirmed, fast retract speed may be enabled, as indicated at block 1822. For example, in some implementations, confirmation of the position of the shaft at the distal end/opening of the access sheath may indicate the position of the distal end of the access sheath, wherein such determined position of the distal end of the access sheath may be used in subsequent control of retraction and/or insertion speeds based at least in part on a determination that the instrument shaft distal end is within the access sheath.

With fast retract speed enabled, the process 1800 may proceed to a subprocess 1820 for instrument retraction through the access sheath and to a specimen collection area proximal to the access sheath assembly. Aspects of such retraction process are described below in connection with FIG. 20. In the event that the sheath length/position has not been confirmed and the distal end of the instrument shaft is outside of the confirmation zone, fast retract speed may be disabled, or may remain disabled, as shown at block 1818. In such case, the process 1800 may return to block 1812, or the instrument may continue to be retracted towards the distal opening of the access sheath.

The process 1800 provides a means/mechanism for the user to acquire sheath information through user input of sheath information, such as length, and further allows the user to confirm the sheath length when the shaft is positioned within the sheath. In some implementations, the system control circuitry can provide output to the user requesting that the user stop retraction at the tip of the sheath and provide confirming input (e.g., button or other user interface feature engagement) to mark the position of the distal end of the sheath. In some implementations, the system control circuitry is configured to automatically confirm the sheath position by implementing computer vision algorithm(s) to identify the sheath tip based on camera image(s).

Figure 19:
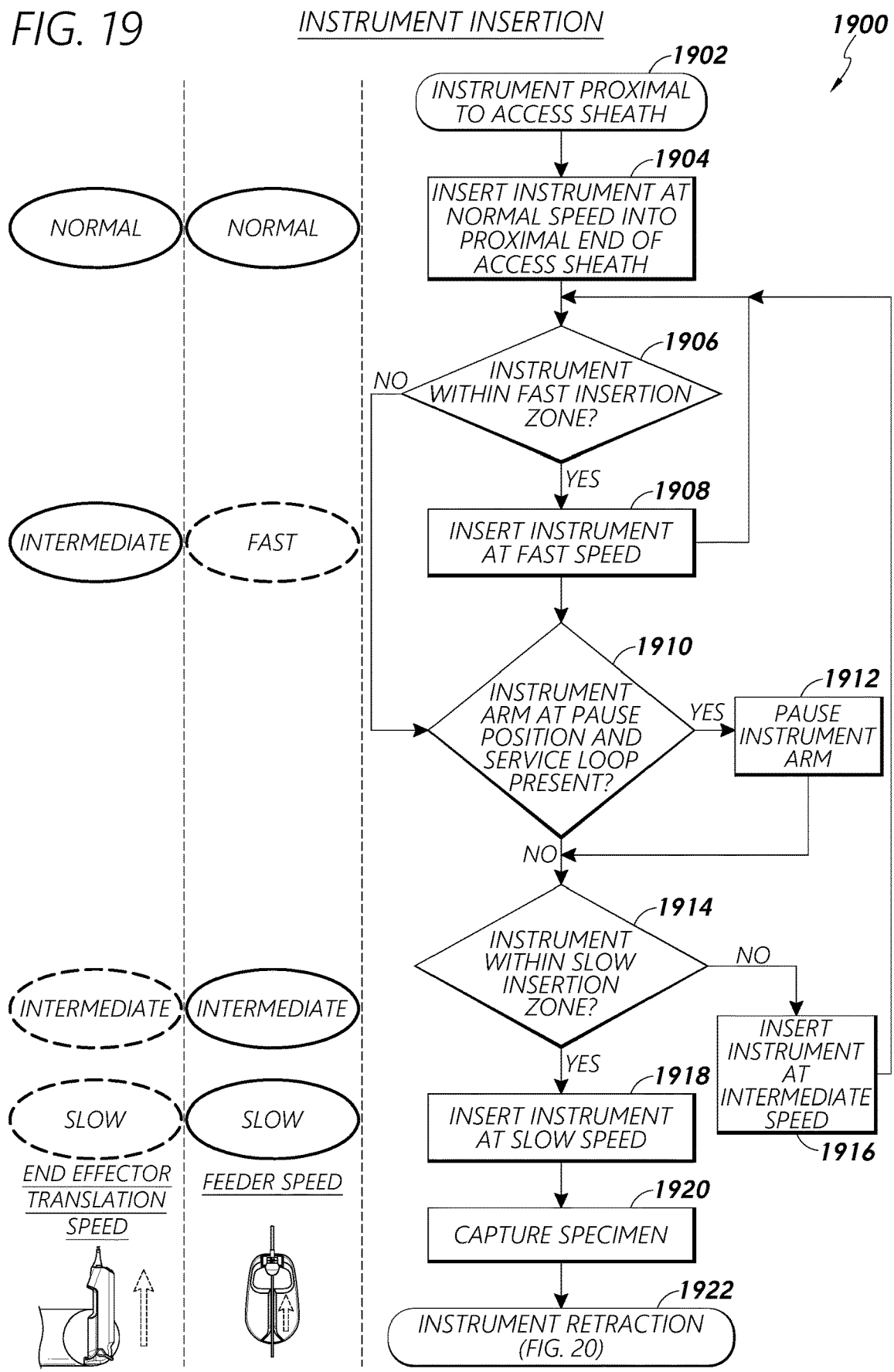
FIG. 19 is a flow diagram illustrating a process for inserting an instrument in accordance with one or more embodiments of the present disclosure.

FIG. 19 is a flow diagram illustrating a process 1900 for inserting an instrument in accordance with one or more embodiments of the present disclosure. The process 1900 may be performed at least in part by control circuitry of the relevant system and/or by a physician and/or other user/technician. The process 1900 may begin with a distal end of a shaft of a medical instrument disposed or positioned proximal to a proximal opening or end of an access sheath, as indicated at block 1902.

At block 1904, the process 1900 involves inserting the distal end of the instrument shaft at a normal speed into the proximal end/opening of the access sheath. For example, the normal speed may be a speed that is greater than a slow insertion speed (e.g., about 5 mm/s or less), but less than a maximum/fast insertion speed (e.g., greater than 150 mm/s; about 170 mm/s). For example, the normal insertion speed may be about 11 mm/s in some implementations. The various speeds described in connection with FIG. 19 and FIG. 20) may be interpreted according to the description of relative insertion and/or retraction speeds above. In order to insert the shaft at the normal speed, the process 1900 may involve operating an axial actuator mechanism/means of an instrument feeder device at the normal speed. In addition, a robotic end effector to which a base/handle of the medical instrument is attached may further be operated/translated in the distal direction at the normal speed. For example, the end effector may be a distal end component of a robot arm, or any other type of robotic end effector.

A decision block 1906, the process 1900 may involve determining whether the distal end of the shaft is within a fast insertion zone. For example, the determination associated with block 1906 may involve any position determination process or functionality described herein or known to those having ordinary skill in the art. Furthermore, the fast insertion zone may correspond to an area or space associated with the access sheath, such as is shown in FIG. 17 and described above (e.g., the fast insertion zone may be a portion of the inside of the access sheath).

If the instrument shaft is within the fast insertion zone, the process 1900 may proceed to block 1908, wherein the process 1900 involves inserting the instrument shaft at a fast speed. In order to perform such fast insertion, the instrument feeder may be operated such that the axial actuator mechanism/means thereof advances/inserts the shaft at a fast speed, which may be a maximum operating speed of the feeder and/or axial actuator(s) in some embodiments. Generally, the fast insertion speed may be greater than the normal insertion speed. In some implementations, the fast insertion speed may be greater than about 150 mm/s, such as about 170 mm/s. Furthermore, in order to provide sufficient slack for insertion at the fast speed, the end effector coupled to the instrument base/handle may be translated/advanced at an intermediate speed that is greater than the normal speed. For example, the intermediate speed may be a speed between the normal speed and the fast speed, and may correspond to a maximum translation speed of the end effector in some embodiments. In some embodiments, the intermediate speed is about 30 mm/s. As with other portions of the process 1900, the operation of the end effector translation may be implemented only in the case that the translation of the end effector has not been paused due to workspace limits and/or other constraints.

If the instrument shaft is determined not to be in the fast insertion zone at decision block 1906, the process may involve determining whether the robotic arm or end effector associated with the instrument base/handle is positioned at a pause position and(/or) whether a service loop of the shaft is present between the instrument feeder and the robotic end effector. With regard to the determination of whether the service loop is present, the decision associated with block 1910 may involve determining whether a service loop of a certain lengths or amount/degree is present. That is, the presence of some amount of service loop in the instrument shaft may not necessarily result in an affirmative determination at block 1910, rather only a determination that a threshold amount of service loop is present with respect to speed of insertion and/or other consideration(s). If the determination associated with block 1910 is in the affirmative, the process 1900 may involve pausing the robotic end effector translation (e.g., pausing the robotic arm to which the instrument base/handle is coupled) such that further insertion translation of the robotic end effector is disabled. For example, where a service loop is present that is greater than a certain predetermined threshold length or degree, it may not be necessary to translate the end effector in order to facilitate insertion of the shaft. Furthermore, where the end effector is relatively close to the instrument feeder, it may be desirable or necessary to pause end effector translation to avoid collision with the instrument feeder and/or undesired kinking or other damage to the instrument shaft that could result from bringing the robotic end effector into too-close proximity with the instrument feeder when some amount of service loop is present. Pausing the end effector translation can further promote or ensure that at the point when fast insertion stops, the shaft tip can still stay inside the sheath.

Although the decision block 1910 is shown at a particular point in the flow diagram of FIG. 19, it should be understood that determination of whether and/or when to pause end effector translation can occur at any point in the process 1900. For example, such determination may be made prior to any initiation of insertion and/or change in insertion speed.

At decision block 1914, the process 1900 involves determining whether the instrument shaft is within a slow insertion zone. For example, the slow insertion zone may be distal to the fast insertion zone, such as at an area at and/or distal to the distal end of the access sheath.

If the shaft is not determined to be within the slow insertion zone, the process 1900 may involve inserting the instrument at an intermediate speed, which may be between the normal speed and the fast speed. In some contexts, the intermediate speed may be referred to as an intermediate-fast speed due to the speed being faster than the normal insertion speed. In some embodiments, the intermediate speed may be about 30 mm/s, and may or may not correspond to a maximum translation speed for the robotic end effector. When inserting the instrument shaft at the intermediate speed, the instrument feeder may be configured to actuate the shaft at the intermediate speed, wherein the end effector may be likewise configured to translate at the intermediate speed, assuming the end effector is not paused, in which case no end effector translation may be implemented.

If it is determined at block 1914 that the instrument shaft is within the slow insertion zone, the process 1900 may proceed to block 1918, where the instrument shaft may be inserted at a slow speed that is slower than the normal speed. For example, the slow speed may be less than about 10 mm/s. The slow speed may be implemented in order to reduce the risk of injury or damage to instrumentation and/or anatomy distal to the distal end of the access sheath. When inserting the instrument shaft at the slow speed, the instrument feeder may implement the axial actuator means/mechanism to advance the shaft at the slow speed, wherein the robotic end effector may likewise translate at the slow speed, if not previously paused in connection with block 1912. In some implementations, there may also be some amount of buffer between the end of the sheath for the user to slowly insert into the sheath distal tube.

At block 1920, the process 1900 may involve capturing a specimen, such as a kidney stone or stone fragment within a calyx network of the patient's kidney. After a specimen has been captured, such as by using a basketing device disposed at least partially within a working channel of the instrument shaft, the process 1900 may proceed to an instrument retraction subprocess 1922, which may involve one or more actions associated with the retraction process 2000 shown in FIG. 20 and described below.

Figure 20:
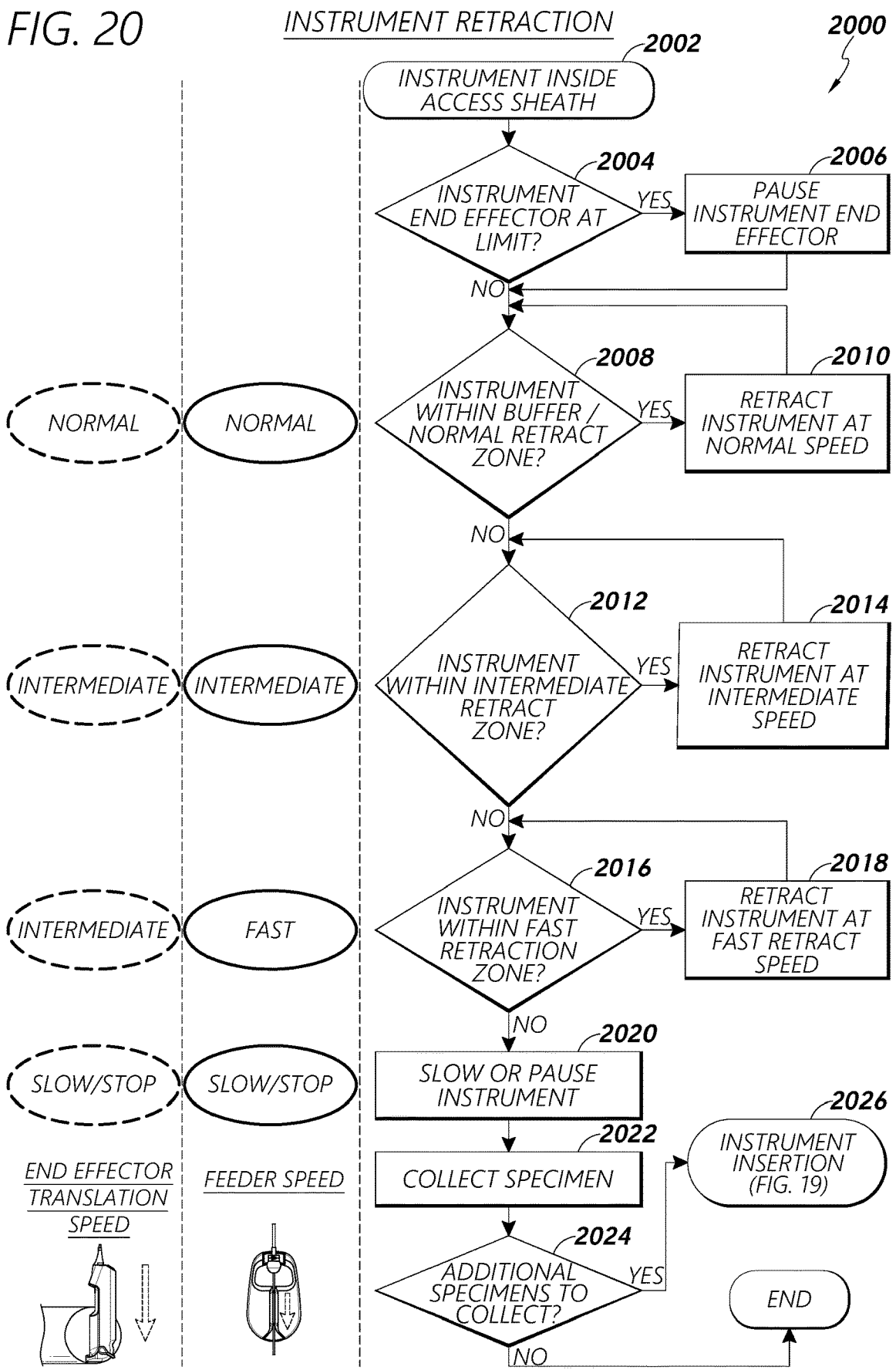
FIG. 20 is a flow diagram illustrating a process for retracting an instrument in accordance with one or more embodiments of the present disclosure.

FIG. 20 is a flow diagram illustrating a process 2000 for retracting an instrument in accordance with one or more embodiments of the present disclosure. The process 2000 may be performed at least in part by control circuitry of the relevant system and/or by a physician and/or other user/technician. The process 2000 may be implemented after capturing a specimen from within an internal chamber, vessel, or area of a patient's anatomy, such as within a kidney of the patient. For example, the process 2000 may be implemented following implementation of one or more aspects of the process 2000 of FIG. 19, described above. The process 2000 begins with the distal end of an instrument shaft having been retracted inside a distal end of an access sheath positioned and/or secured within the patient anatomy (e.g., urethra, bladder, ureter, ureter of pelvic junction of a patient's anatomy).

At block 2004, the process 2000 involves determining whether a robotic end effector coupled to a base or handle of the medical instrument associated with shaft is at a translation limit. For example, such limit may be defined by an operable workspace associated with the robotic system and/or a reach or other boundary of the robotic system. For example, the limit of the robotic end effector may be a physical limit of movement of a robotic arm along a retraction pathway/rail. If the robotic end effector is at a workspace limit, the process 2000 may involve pausing and/or disabling translation of the robotic end effector.

If the robotic end effector is not at a workspace limit, the process 2000 may involve determining, at decision block 2008, whether the distal end of the instrument shaft is within a normal retract zone, which may be referred to herein as a 'buffer zone,' 'buffer retract zone,' or 'fast retract buffer zone' for convenience or clarity in some contexts. For example, the normal retract zone (i.e., 'fast retract buffer zone') may be understood with reference to FIG. 16. Furthermore, other retraction speed zones shown in FIG. 20 and described in the associated written description may be understood with reference to the scheme illustrated in FIG. 16 and described in detail above. In some embodiments, the normal retract/fast retract buffer zone may cover an area distal to the distal end of the access sheath and/or within a distal portion of the access sheath.

If the instrument shaft is within the normal retract zone, the process 2000 may involve retracting the instrument at a normal speed, which may be understood according to relevant description of retraction insertion speeds herein. For example, the normal speed may be about 11 mm/s. Retracting the instrument shaft at the normal speed may involve operating an actuator means/mechanism of an instrument feeder at the normal speed, thereby retracting the shaft through the instrument feeder at the normal speed. In addition, if the end effector translation has not been paused, retracting the instrument shaft at the normal speed may involve translating the robotic end effector at the normal speed as well.

If the instrument shaft is not within the normal retract zone, the process 2000 may involve determining, at decision block 2012, whether the instrument shaft is between the normal retract zone (e.g., proximal to the normal retract zone) and the fast retract zone; such intermediate zone between the normal retract zone (i.e., fast retract buffer zone) and the fast retract zone may be referred to as the 'intermediate retract zone' in some contexts herein. That is, at block 2012, the process 2000 may involve determining if the distal end of the instrument shaft is proximal to the normal retract zone, yet distal to the fast retract zone, wherein under such conditions, the process may proceed to block 2014, wherein the instrument shaft is retracted at an intermediate speed. In some implementations, the intermediate speed may be faster than normal speed, but not exceeding a maximum end effector translation speed. When retracting the shaft at the intermediate speed, the instrument feeder may operate to axially actuate the shaft at the intermediate speed. Furthermore, if not previously paused, the end effector may be translated similarly at the intermediate speed. The intermediate retract zone may help ensure that any basket or other working instrument is fully inside the sheath before fast retraction.

If the instrument shaft is not determined to be in the intermediate retract zone at decision block 2012, the process 2000 may involve determining whether the instrument shaft is disposed presently within the fast retraction zone, as indicated at decision block 2016. If so, the process 2000 may proceed to block 2018, where retraction of the instrument shaft may be performed at a fast retract speed, which may be faster than the normal speed and the intermediate speed. For example, the fast retract speed may be greater than 150 mm/s, such as about 170 mm/s. In order to implement the fast retraction, the instrument feeder may operate the axial actuator means/mechanism at the fast speed. Conversely, the robotic end effector, if not paused, may retract proximally at the intermediate speed, which may represent the maximum translation speed of the end effector according to constraints relating to physical capability and/or injury/damage prevention. The fast retraction speed of the feeder may build service loop in the shaft proximal to the feeder. The translation of the end effector associated with the instrument handle may help reduce the amount of service loop build-up. It can be desirable to ensure that there is enough distance between the instrument end effector and the feeder end effector so that the curvature of the service loop is not too large, which can cause damage to the instrument shaft if fast retract is started too early. Once there is enough safety clearance between the two end effectors/arms, fast retract can be enabled.

The process 2000 may involve continuing to retract the instrument shaft at the fast speed until the decision block 2016 result is negative, indicating that the distal end of the instrument shaft has reached the proximal threshold of the fast retraction zone. At such point, the process 2000 may proceed to block 2020, wherein the retraction of the instrument shaft may be slowed or paused. For example, automatic pause may be implemented when exiting the fast retraction zone, as described in detail above. In some embodiments, the proximal threshold of the fast retraction zone may be at a point between the proximal opening of the access sheath assembly and the distal opening of the channel in which the instrument shaft is axially actuated in the feeder, wherein such position may be considered an automatic pause/stop position, as described in detail above. Additionally or alternatively, at block 2020, retraction speed may be slowed to a slow speed, such as 5 mm/s or less (e.g. 3 mm/s) for final retraction to the specimen collection location and/or for implementing fine-tuning positioning of the instrument shaft for collection.

At block 2022, the process 2000 involves collecting the captured specimen in a collector structure or other device or structure. After collection, if additional specimens (e.g. stone fragments) remain to be collected, the process 2000 may proceed to an instrument insertion subprocess at block 2026, which may be similar in one or more respects to the process 1900 of FIG. 19. If no additional specimens remain to be collected, the process 2000 may end.

Embodiments of the present disclosure can advantageously make robotic stone extraction processes relatively safe and efficient. For example, the division of the operable area from the sheath distal tip to the stone drop position into multiple sub-regions can be based at least in part on clinical needs and can ensure safe instrument driving. Further, making use of information acquired from the system and/or user to identify what region the scope tip is in, and coordinating the instrument end effector and the instrument feeder to drive in different speeds so that fast retraction and insertion speeds can be activated and deactivated in time, damage to the patient or the instrumentation can be prevented. Any of the shaft actuation speed modifications disclosed herein may be implemented automatically. In some embodiments, the user may be able to press a stone extraction button to cause the system to implement fast retraction, stone drop, and/or fast insertion processes automatically without additional input.

Instrument Stress Reduction Using Transverse Instrument Base Translation

With reference back to FIG. 15, which is described in detail above, some implementations of fast retraction of a scope or other instrument involve the translation of a robotic end effector 6a (e.g., distal end effector of a robotic arm) coupled to a scope handle/base 31 in a direction generally parallel to and/or in-line with a virtual rail 1501 that is aligned with an axis of the access sheath 90, instrument/scope feeder channel 39, and/or alignment between the end effector 6a and the end effector 8b that is associated with the scope driver/feeder 11. That is, the robotic movement/translation of the arm 12a and/or the end effector 6a may generally be in the direction/dimension 1502 (also identified as the 'x' dimension in the reference coordinate system) during fast retraction and/or insertion of the scope 40, wherein such movement may advantageously facilitate relatively fast retraction/insertion and/or reduce the size of the service loop 49 formed in the scope 40 and/or the radii of bends formed in the scope 40 associated with the service loop 49.

Translation of the end effector 6a in the proximal direction during scope retraction can advantageously increase the distance $D_b$ between the scope driver/feeder 11 and the scope base 31, thereby reducing the length of scope that is inclined to bunch-up to form the service loop 49 relative to implementations in which no proximal scope handle/base translation occurs. Where the proximal translation of the end effector 6a is constrained to the linear alignment/dimension 1502/1501, which is referred to herein as the 'x' dimension in some contexts for convenience, the increase in the distance $D_b$ between the scope driver 11 and the base 31 of the scope 40 resulting from translation of the end effector 6a may generally be equal to the translation distance in the 'x'/linear dimension. Such translation in the 'x'/linear dimension may be limited by mechanical constraints of the end effector 6a and/or associated robotic arm/system. Therefore, the amount of strain relief provided by linear (i.e., x-dimension) translation of the scope handle 31 as shown in FIG. 15 may also be limited by such mechanical constraints.

As described above, the service loop 49 may form when the length of the scope 40 disposed between the scope driver/feeder 11 and the scope handle/base 31 increases due to retraction of the scope driver 11 at a speed that is greater than a retraction translation speed of the scope end effector 6a. As shown, the service loop 49 may be inclined to form as a U-bend form including base bends 99a, 99c on either side of an apex bend 99b. Generally, the greater the length of scope forming the service loop 49, the transverse deflection $d_t$ of the service loop 49. As the deflection $d_t$ of the service loop 49 increases, generally the radii of curvature of the bends 99 formed in the scope are reduced, thereby resulting in relatively sharper/tighter bends in the scope shaft 40.

It may be desirable to avoid the formation of relatively tight/sharp bends in the scope 40 to avoid damage to the scope due to mechanical stress, as described in detail herein.

FIG. 15 shows the service loop 49 forming three bends 99, including a first bend 99a between the scope driver/feeder 11 and the apex 1504 of the service loop 49, wherein such bend 90a is illustrated as having a radius of curvature $r_1$, which may be undesirably short in some implementations in which the feed-roller retraction speed relative to the proximal retraction of the scope end effector 6a is undesirably high. The apex bend 99b is shown as having a radius of curvature labeled $r_2$, whereas the third bend between the base 62 of the scope 40 and the apex 1504 of the service loop 49 has a radius of curvature labeled $r_3$. Embodiments of the present disclosure can advantageously reduce the radii of curvature of such bends as a result of transverse and/or proximal scope base translation during scope driver retraction.

As described in greater detail herein, the retraction speed implement by the scope driver (e.g., feed-roller) 11 during period(s) of a retraction process may be greater than 150 mm/s, such as about 170 mm/s. The linear translation of the scope end effector 6a along the virtual rail path 1501, on the other hand, may be less than about 30 mm/s during such periods, such as about 20 mm/s or 10 mm/s. Generally, the difference between the retraction speed of the scope driver 11 and the linear translation speed of the end effector 6a along the virtual rail 1501 can cause the scope 40 to form the service loop 49, wherein the severity of mechanical stress/strain imposed by the various bends of the service loop 49 may be dependent at least in part on the proximal translation distance traversed during the retraction feeding of the scope driver 11.

Generally, it may be desirable to implement scope retraction solutions that maximize the bend radii of the bends formed in the scope as part of the service loop 49, wherein such bend radius maximization is achieved in view of the particular workspace constraints and retraction speeds associated with the robotic system/configuration. In some embodiments, it may be desirable to prevent the bend radius of a bend associated with a scope service loop from falling below 70 mm for certain embodiments of scopes/instruments. In some implementations, scope instruments may be utilized that can accommodate bend radii of less than 50 mm, such as about 45 mm, without resulting in damage to the scope and/or exceeding strain limits of the instrument.

While FIG. 15 shows linear scope translation in the 'x' dimension along the virtual rail 1501, in some implementations, scope retraction solutions associated with the present disclosure can involve scope end effector translation in directions/dimensions that are transverse/angled relative to the virtual rail 1501. For example, scope base translation in the illustrated 'y' and/or 'z' dimensions, either separately or in combination with each other and/or in combination with translation in the 'x' dimension, can increase the distance $D_b$ (shown in FIGS. 15 and 25-1) between the scope base 31 and the scope driver 11 and/or produce angular/orientational positions of various portions of the scope 40 that reduce bend curvature radii in one or more areas associated with a service loop.

Figure 21:
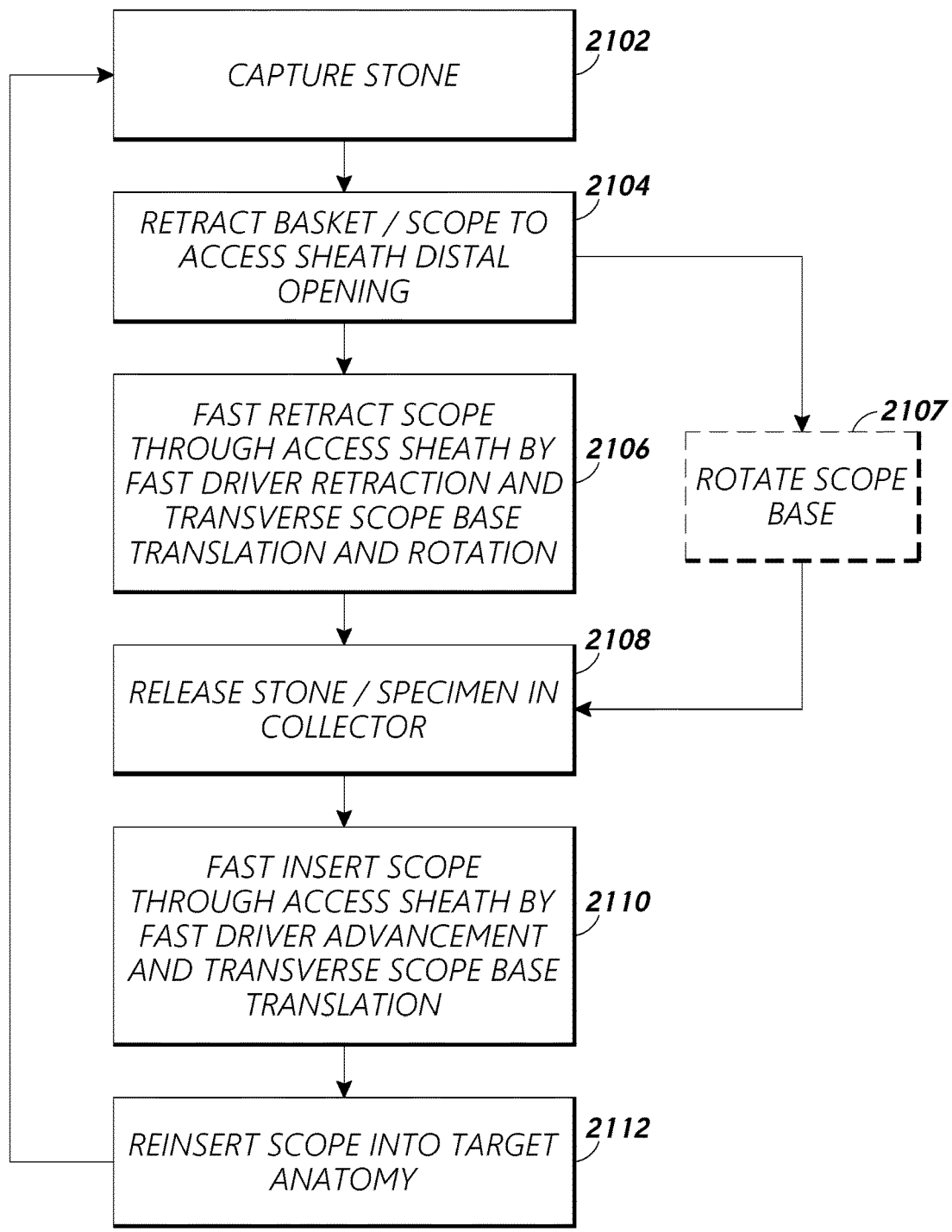
FIG. 21 is a flow diagram illustrating a process for removing specimens using transverse scope base translation.

FIG. 21 is a flow diagram illustrating a process 2100 for removing specimens from target anatomy of a patient using transverse scope base translation. For example, the process 2100 may be implemented when removing a specimen, such as a stone fragment or the like, during retraction and/or insertion of the scope for such purpose. As used herein, 'transverse' translation may be understood as translation in a direction/angle deflected away from the virtual rail and/or axis of the scope portion that is fed through the scope driver (e.g., feed-roller) and/or the access sheath/introducer through which the scope is driven. For example, transverse translation, with respect to the illustrated coordinate reference of FIG. 15, may be associated with a vector that projects at least partially in the 'y' and/or 'z' dimensions, rather than exclusively in the 'x' dimension 1502.

At block 2102, the process 2100 may involve capturing a stone and/or fragment thereof in a target anatomical area of the patient, such as within a calyx network of a kidney of the patient, as described herein. Capturing the stone/fragment may be implemented in accordance with any embodiment disclosed herein, such as through the use of a basketing tool, wherein such basketing tool may be robotically controlled in some implementations. As described herein, the basket of the basketing tool may be deployed from a distal end of the endoscope (e.g., ureteroscope), wherein, once captured, the stone and basket may be drawn proximally toward the distal end of the scope and held adjacent thereto for retraction.

At block 2104, the process 2100 involves retracting the scope with the basket and captured stone to the distal opening of the access sheath, as described in detail herein. Such retraction may be performed manually by the surgeon/technician and/or may be implemented using automatic robotic retraction in accordance with aspects of the present disclosure.

At block 2106, the process 2100 involves implementing fast retraction, as described herein, to retract the scope, basket, and captured specimen relatively quickly through at least a portion of the access sheath, which may span the urinary tract of the patient or other anatomy to a proximal opening of the access sheath. Fast retraction through the access sheath may be desirable to reduce the overall round-trip time associated with specimen collection. Such retraction speeds may be achieved by driving feed-roller actuator(s) at relatively high speeds to effect the fast retraction. However, as referenced above, where feed-roller (or other scope driver mechanism) retraction speeds exceed the translation speed of the robotic end effector associated with the base of the scope, service loop bends may form in the portion of the scope between the scope base and the driver/feed-roller channel due to a decrease in the distance between the scope handle/base and the scope driver relative to the length of scope disposed in such area. If the amount of scope length forming the service loop and/or the relative positions and/or orientations of the scope driver and the scope handle/base are not managed in a manner as to prevent relatively sharp bends and/or shear stresses in the scope from presenting, undesirable risk of damage to the scope and/or other instrumentation may result.

In order to manage the relative distance and orientation between the scope handle/base and the scope driver to reduce shear stress on the scope in the area of service loop formation, rather than simply translating the scope base and/or associated robotic end effector along a linear virtual rail, the operation(s) associated with block 2106 of the process 2100 may involve implementing transverse translation in one or more dimensions that are angled (e.g., orthogonal) with respect to the linear virtual rail (see, e.g., linear virtual rail 1501 in FIG. 15). For example, such transverse translation may be in the same vertical plane as the virtual rail (e.g., in a plane parallel with the ground) and in a direction away from the virtual rail, such as towards a robotic cart from which the robotic arm(s)/end effectors emanate, wherein such in-plane deflected (e.g., orthogonal) translation may be considered to be at least in part in a 'y' direction/dimension (see, e.g., 'y' dimension of illustrated coordinate frame in FIG. 15), the 'y' direction/dimension being orthogonal to the 'x' direction/dimension defined by and/or parallel with the virtual rail. Additionally or alternatively, transverse translation of the scope handle/base may be in the form of vertically rising above the vertical plane of the virtual rail, wherein such vertical translation may be described herein as being in the 'z' direction/dimension.

In some implementations, the process 2100 involves, concurrently with the transverse translation associated with block 2106, rotating the end effector (see block 2107), and therefore the handle/base, associated with the scope about a vertical axis (i.e., out of the page with respect to the illustrated orientation of FIG. 15), wherein such rotation may serve to reduce the strain at one or more stress points/bends in the scope/service loop. For example, such rotation may generally be in an opposite direction relative to the transverse translation direction in the 'y' direction/dimension. For example, with respect to the illustrated perspective of FIG. 15, transverse translation to the left may be coupled with clockwise rotation of the end effector, whereas transverse translation to the right may be coupled with counter-clockwise rotation.

At block 2108, the process 2100 involves releasing the captured stone/specimen from the basketing device into a collector or other structure. At block 2110, the process 2100 involves fast inserting the scope back through the access sheath to return the scope and/or basket to the target anatomy for additional stone/fragment collection. In some implementations, the fast insertion operation(s) associated with block 2110 may involve effectively reversing the translation and/or rotation of the scope handle/base implemented in connection with block 2106 and/or 2107, thereby returning the scope and associated end effector to an in-line configuration with the scope drive (e.g., feed-roller) along the virtual rail.

At block 2112, the process 2100 may involve reinserting the scope and/or basket into the target anatomical area, wherein the process 2100 may be repeated any number of times in order to successfully retrieve/remove the desired number of stones/fragments from the target anatomy.

Figure 22A:
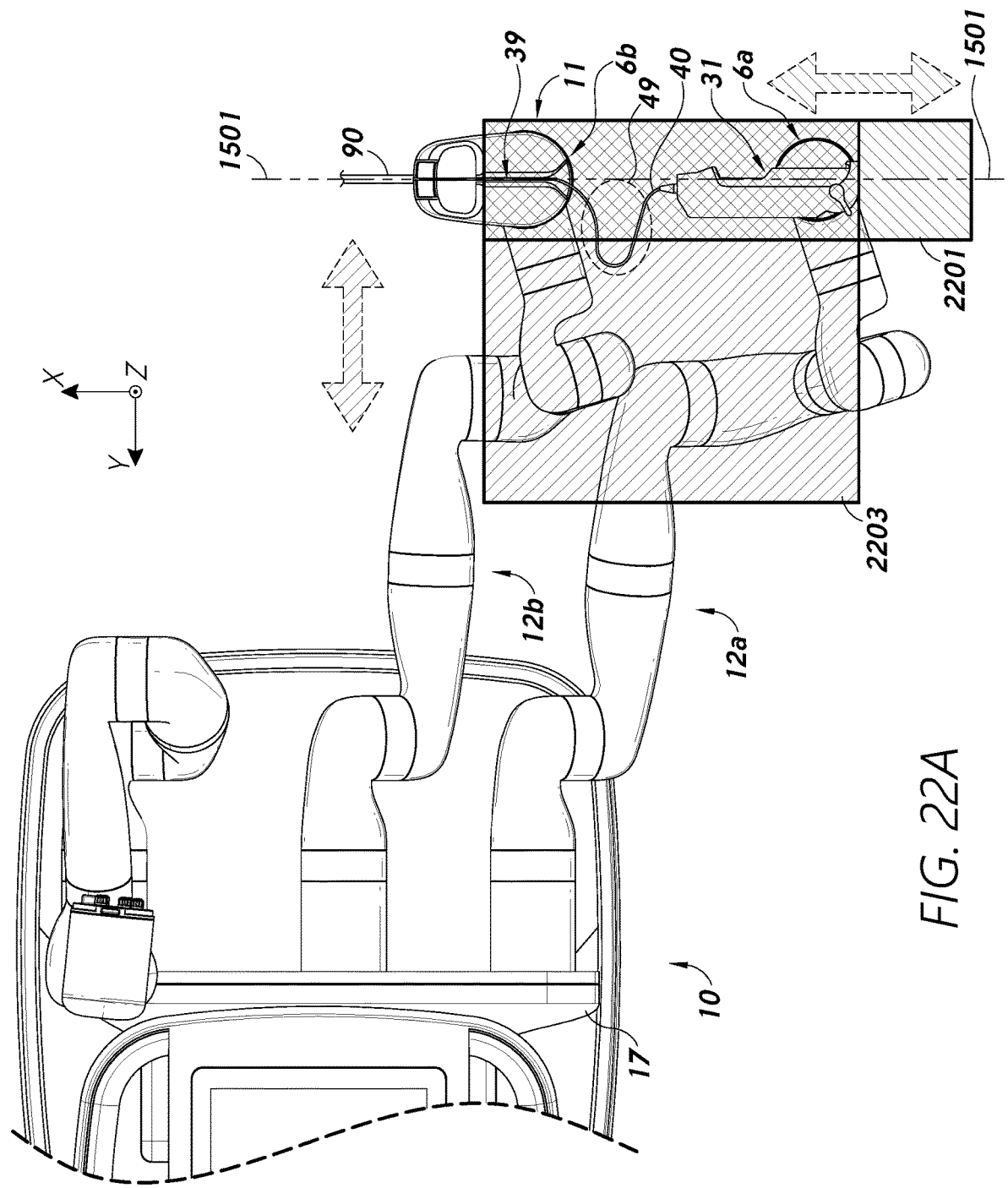
FIGS. 22A and 22B show overhead and side views, respectively, of a robotic system including one or more robotic end effectors configured to be translated within certain zones to implement instrument retraction in accordance with aspects of the present disclosure.
Figure 22B:
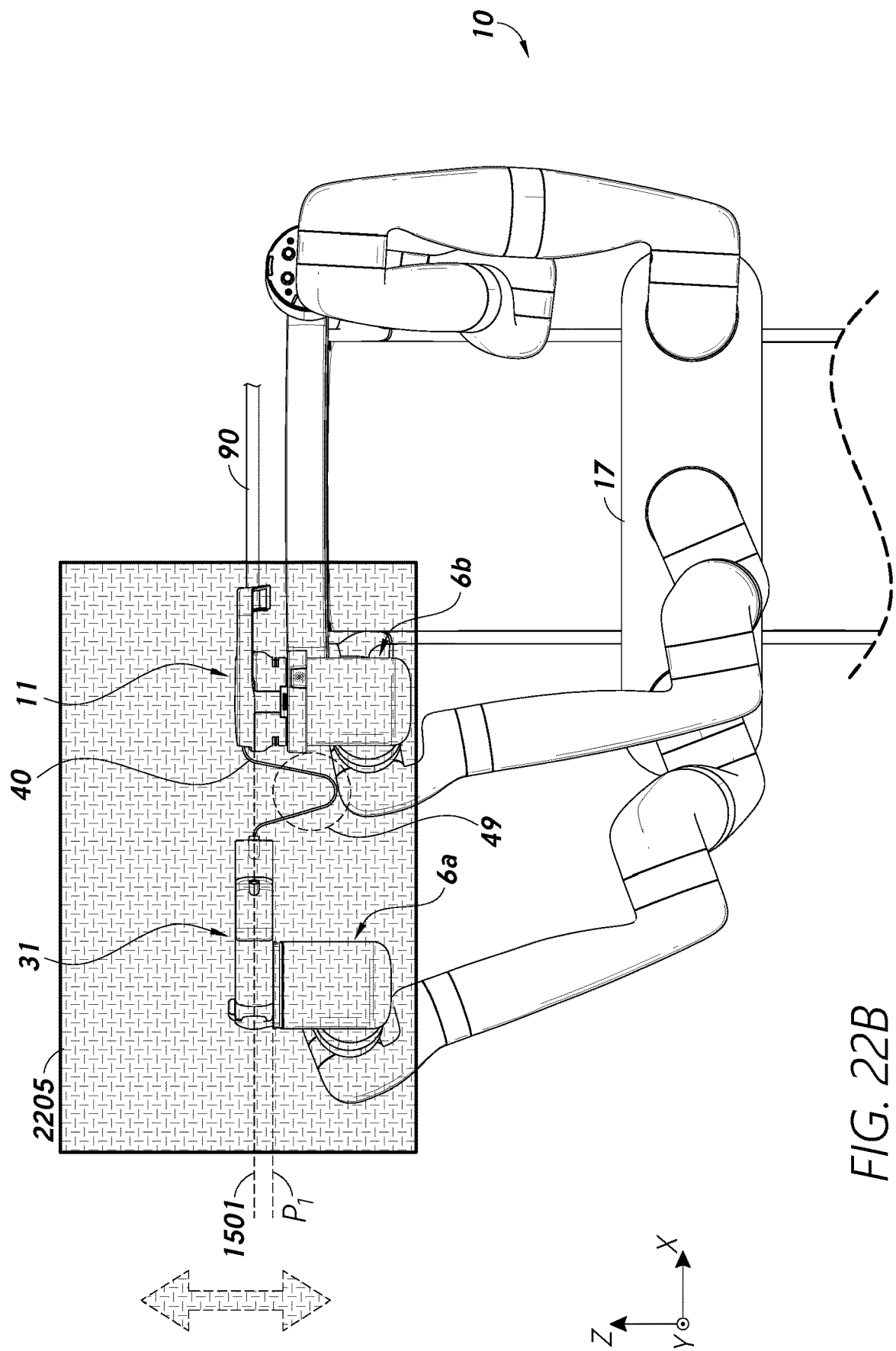

FIGS. 22A and 22B show overhead and side views, respectively, of a robotic system including one or more robotic end effectors configured to be translated within certain zones to implement instrument retraction in accordance with aspects of the present disclosure. In particular, FIG. 22A shows a plurality of robotic arms 12 configured to implement fast scope retraction in accordance with aspects of the present disclosure. The image of FIG. 22A shows certain kinematic workspace areas 2201 and 2203, which may correspond to areas in which the mechanical attributes of the system may permit translation/movement of the end effector 6a associated with the scope handle/base 31. Specifically, the kinematic workspace area 2201 represents an area in which the robotic end effector 6a may be translated along the virtual rail 1501 that is generally coaxial with at least one of: the proximal portion of the access sheath 90, the portion of the scope within the feed-roller channel 39, and/or an alignment axis along which the end effectors 6a, 6b are aligned in the configuration shown in FIG. 22A. That is, for implementations of scope retraction in which scope base translation is limited to the 'x' direction/dimension with respect to the labeled coordinate frame of the image of FIG. 22A, the translation of the end effector 6a during scope retraction may be limited to the area within the workspace 2201. The bounds of the workspace area 2201 in the 'x' dimension may be based on relevant robotic singularity and/or clinical workspace limits associated with the robotic system. For example, the limits of the illustrated workspaces of the robotic system may represent an area outside of which there is an undesirable risk of collision between robotic arm components and/or between a robotic arm and the cart 10. Such limits may further be based on the physical length of the relevant robotic arms.

As described above, where scope base translation is limited to the virtual rail dimension 1501, service loop formation 49 during relatively high-speed scope driver retraction can result in bends forming in the scope shaft between the scope driver 11 (e.g., feed-roller) and the scope base/handle 31. Therefore, in such implementations, scope driver retraction speeds may be limited by the relevant bend radius compatibility of the scope mechanical shaft design. In order to increase such scope driver speed limits, embodiments of the present disclosure allow for non-linear/transverse scope base translation. For example, such translation may be within the kinematic workspace 2203, which extends towards the robotic system/cart 10 in the 'y' dimension/direction. Generally, the transverse workspace 2203 shown in FIG. 22A may be in a common vertical plane with the linear workspace 2201.

Transverse scope base/end effector translation in accordance with aspects of the present disclosure may be in a vertical/'z' dimension in some implementations. For example, FIG. 22B shows a side view of the robotic cart 10, including a representation of a kinematic workspace 2205 in which the scope end effector 6a may be translated vertically for the purpose of fast retraction scope shaft stress relief as described herein. Although the 'z' dimension according to the illustrated coordinate frame of FIG. 22A, and other figures herein, is described in some contexts as a vertical dimension, it should be understood that such terminology is used for convenience, and in other robotic systems such dimension may not be a true vertical dimension. That is, references herein to a vertical dimension should be understood to refer to a dimension generally orthogonal to a linear kinematic workspace 2201 as shown.

It should be understood that any description herein of transverse/non-linear scope base/handle translation may be in the 'y' dimension and/or 'z' dimension. Generally, vertical/'z'-dimension scope base translation may be implemented in a manner such that the scope end effector 6a rises (i.e., moves upward with respect to the illustrated orientation of FIG. 22B), wherein lowering of the scope base/handle and/or end effector 6a may be constrained by mechanical constraints and/or avoided to prevent interference with a sterile barrier that may be present in the operating environment. For example, the sterile barrier may be present at about the height of the bed/platform on which the patient is disposed, wherein it may be undesirable or untenable for the end effector 6a to descend below such level.

In implementations in which vertical/'z'-dimension scope handle/base translation is implemented during fast scope retraction, the end effector 6a may be tilted in concert, such that a plane $P_1$ of the end effector 6a tilts downward toward the scope driver 11 in order to reduce bend stresses in the scope 40 as the scope handle/base 31 is elevated above the plane of the virtual rail 1501. Such tilting may be implemented gradually as the end effector rises above the plane of the virtual rail 1501.

As illustrated in FIG. 22B, the service loop 49 of the scope shaft 40 may form and/or project in any dimension, such as in the 'z' dimension and/or in the 'y' dimension with respect to the illustrated coordinate frame. That is, the service loop 49 may comprise a U-bend form having an apex projecting generally away from the virtual rail/axis 1501 at any angle and/or in any dimension/vector.

FIGS. 23-1, 23-2, and 23-3 show overhead views of a scope base/handle 31 in various states of rotation in connection with scope retraction in accordance with one or more embodiments. The scope base/handle 31 is coupled to an end effector 6a of a robot arm 12a, wherein the base/handle 31 is coupled to a proximal end of a scope shaft 40 that is fed through a scope driver 11. The scope driver 11 is coupled to an end effector 6b of a robot arm 12b. As referenced above, during retraction of a scope, in addition or as an alternative to scope base translation in the linear/in-line and/or transverse dimension(s), scope base rotation may be implemented to provide strain relief for the scope. For example, FIGS. 23-1-23-3 illustrate sequential states of rotation of the scope handle/base 31 about an axis $A_1$ that is transverse to the virtual rail 1501. The base/handle 31 may be rotated as the scope driver/feeder 11 retracts the scope 40 in the proximal direction. In some implementations, a 90° rotation $\theta_b$ may be implemented gradually during scope retraction. For example, FIG. 23-3 shows a final rotational state of the scope handle 31 at a 90° rotation relative to the starting position of the scope base shown in FIG. 23-1. Although the particular rotational scheme implemented in FIGS. 23-1-23-3 shows rotation of the scope base 31 such that the base 62 of the scope 40 is rotated away from the robotic arm 12a and/or associated robotic system/cart, it should be understood that rotation may be in any direction (e.g., counterclockwise or clockwise with respect to the illustrated orientation).

Rotation of the scope base 31 in accordance with FIGS. 23-1-23-3 and/or in connection with any of the disclosed embodiments may advantageously produce greater radii of curvature $r_a$, $r_b$ during the retraction process than may otherwise be present if such rotation is not implemented. Therefore, rotation of the scope base/handle 31 about a transverse axis $A_1$ can reduce the risk of damage to the scope 40 during fast retraction.

FIGS. 24-1, 24-2, and 24-3 show overhead views of a scope base/handle 31 in various states of rotation and transverse translation in connection with scope retraction in accordance with one or more embodiments. The scope base/handle 31 is coupled to an end effector 6a of a robotic arm 12a, wherein the base/handle 31 is coupled to a proximal end of the scope 40 that is fed through a scope driver 11 coupled to an end effector 6b of a robot arm 12b. In the implementation illustrated in FIGS. 24-1-24-3, rotation of the scope base/handle 31 about a transverse axis $A_1$ is performed in a manner similar to that shown and described in connection with FIGS. 23-1-23-3. In addition, the implementation shown in 24-1-24-3 involves simultaneous transverse translation of the end effector 6a while rotating the scope base 31.

Combining scope rotation with transverse translation can advantageously results in radii of curvature $r_c$ of the scope during fast retraction that are greater than may form without either scope base rotation or transverse translation. The transverse translation of the end effector 6a may generally be within boundaries of a kinematic workspace 2203 defined in consideration of certain mechanical constraints of the robotic system, as described in detail herein. The transverse translation 2401 may be considered to be in a 'y' dimension according to a particular coordinate frame identified on the drawing sheet associated with FIG. 24-1-24-3, wherein retraction of the scope through the scope driver/feed-roller 11 is generally in an axis dimension/direction that is substantially orthogonal to the 'y' direction.

Although shown as involving transverse translation in the 'y' direction, it should be understood that the illustrated transverse translation may additionally or instead be implemented at least partially in the 'z' dimension, the 'z' dimension representing a direction out of the page with respect to the illustrated orientations, such dimension being orthogonal to the 'x' and 'y' dimensions, as identified in the illustrated reference frame. That is, while rotating the scope handle/base 31, the scope end effector 6a may be raised vertically above the horizontal plane 2203. Such 'z'-dimension translation may be implemented simultaneously with 'y'-dimension translation in some embodiments. Furthermore, in some embodiments, 'x'-dimension translation may be implemented in combination with some amount of 'y'-dimension and/or 'z'-dimension translation. That is, scope end effector translation may be implemented during scope retraction in any combination of directions and/or within any combination of kinematic workspaces.

Figures 1, 25:
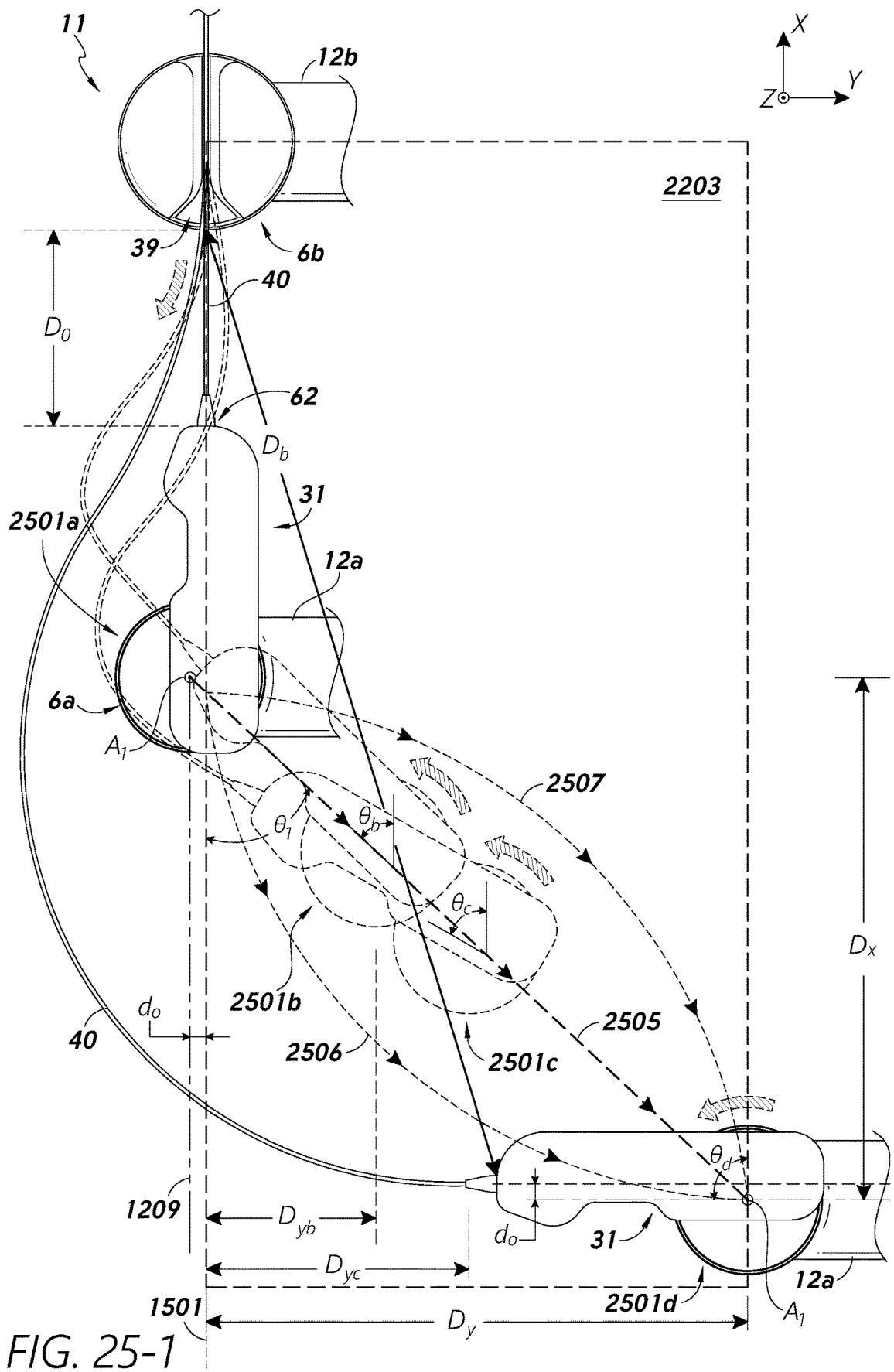
Figures 2, 25:
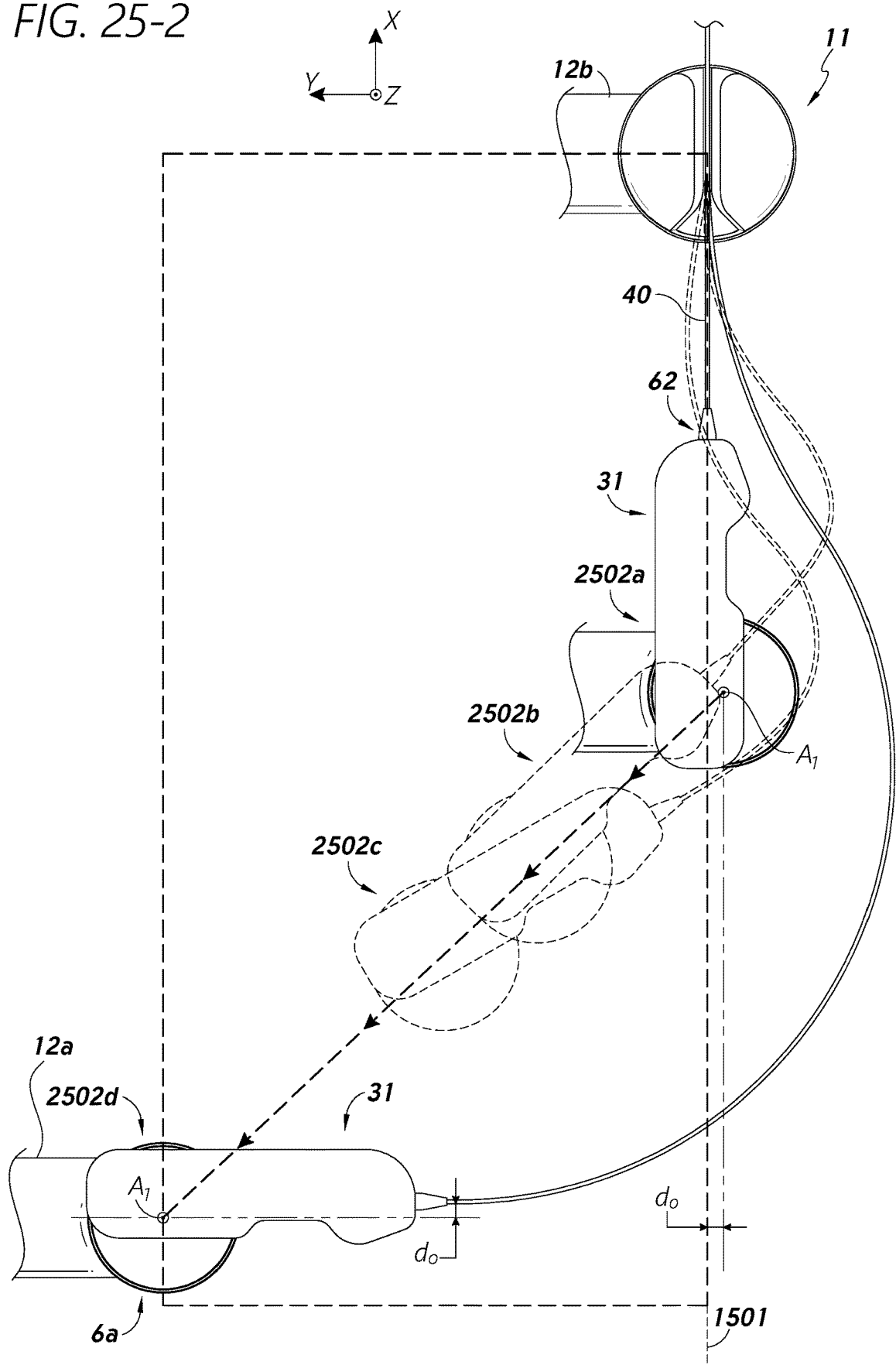

FIGS. 25-1 and 25-2 show overhead views of an instrument base 31 in various states of rotation and translation in connection with instrument retraction and/or insertion in accordance with one or more embodiments. FIG. 25-1 illustrates an animation of the scope base 31 being translated in accordance with a fast retraction process as described in connection with various embodiments herein. In particular, FIG. 25-1 shows four stages of a translation/retraction process corresponding to sequential temporal periods over which an end effector 6a coupled to the base 31 of the scope/instrument is translated in a transverse dimension 'y' (and/or 'z' in some implementations) a distance $D_y$ within a kinematic workspace 2503 associated with the robotic system. In addition to transverse translation of the end effector 6a and/or instrument base 31, rotation of the end effector 6a and/or base 31 about an axis $A_1$ of the end effector 6a may be implemented in synchronously with the transverse and/or in-line (e.g., along a virtual rail line 1501) translation.

As described herein, fast retraction scope base translation may be in both the in-line 'x' and transverse ('y' and/or 'z') dimensions/directions. Therefore, such translation may result in an angled translation path 2505 relative to the virtual rail 1501 and/or 'x' dimension. For example, in the illustrated implementation, the translation path 2505 follows a path to having an 'x'-vector $D_x$ of translation as well as a 'y' vector $D_y$ of translation. That is, the translation between the initial state/position 2501a and the final state/position 2501d may span both 'x'-dimension distance $D_x$ and a transverse/'y'-dimension distance $D_y$. Such vectors of translation may result in the path 2505 having a deflection angle $\theta_1$ relative to the virtual rail 1501. As example implementations, the deflection angle $\theta_1$ of the translation path 2505 may be approximately 15° (or less), 35°, 45°, 60°, 75°, 90° (in which case no 'x'-dimension translation is implemented), or any deflection angle value between any pair of the listed numbers. In the particular illustrated implementation of FIG. 25-1, the deflection angle $\theta_1$ of the translation path 2505 is approximately 45°, such that the translation distances $D_x$ and $D_y$ are similar and/or identical.

Although a straight translation path 2505 is shown, wherein the relative speed of travel/translation in both the 'x' dimension and the 'y' dimension is proportional throughout the translation from the initial position 2501a to the final position 2501d, it should be understood that non-constant/straight translation paths may be implemented in some embodiments. For example, FIG. 25-1 shows a first curved translation path 2506, which represents a path in which the translation speed in the 'x' dimension relative to the 'y' dimension is greater in the initial period of translation and reduces as translation approaches the final state 2501d. Alternatively, another example non-constant/straight translation path 2507 is shown, wherein the relative translation speed in the 'x' dimension relative to the 'y' dimension is relatively less in the initial period of translation and increases as translation approaches the final position/configuration 2501d. References herein to the initial period of translation may refer to translation between initial state 25 and one or more subsequent states 2501b and/or 25013. The initial transition period may, in some contexts, be understood to reference the immediate moments following initiation of the translation from the initial state 2501a.

The angled translation path 2505 can have a length that is greater than the translation distance $D_x$ in the 'x' dimension, thereby increasing the distance $D_b$ between the proximal end 62 of the scope and the scope driver 11 (and/or driver channel 39). The distance $D_b$ is further increased by the rotation of the scope base 31; without the transverse translation 2505 and scope roll, the distance $D_b$ between the proximal end 62 of the scope and the scope driver 11 would be approximately equal to the combined distances $D_0$ and $D_x$, which is less than the distance $D_b$ shown in FIG. 25-1.

The particular angle $\theta_1$ of deflection selected for the retraction process may be based on mechanical constraints or limits on translation distance in the transverse ('y' or 'z') dimension and/or available translation speed of the end effector 6a. For example, where the transverse translation distance $D_y$ is limited by certain mechanical constraints, the deflection angle $\theta_1$ may be based on and/or selected to allow for the maximum desired/tenable translation speed of the end effector 6a to reach the limit the 'y' concurrently with the cessation of retraction of the scope driver 11, to thereby provide for relatively uniform translation and retraction of the scope 40. In some embodiments, for example, the 'y'-dimension limit $D_y$ may be about 3 inches (about 7-8 cm), 5 inches (about 12-13 cm), 7 inches (about 17-18 cm) or other distance between or greater than such amounts.

In some implementations, rotation of the end effector 6a may be implemented at a constant rotational speed traversing the translation path (e.g., path 2505). In such implementations, a state/position (e.g., the position 2501c) at which point the end effector 6a has traversed exactly half the distance of the translation path may be associated with a rotation of the end effector 6a representing approximately half the total rotational angle implemented between the initial 2501a and final 2501d positions/states. That is, with respect to a 90° rotation as shown in FIG. 25-1, the rotational angle $\theta_c$ at the halfway point of the translation path 2505 may be approximately 45°.

In some implementations, alternatively, the speed of rotation may be non-constant, and may initially be greater in at least portion(s) of the first half of the translation path than in at least portion(s) of the second half of the translation period. For example, the particular implementation shown in FIG. 25-1, the rotational speed may be such that at about one-third of the distance along the translation path 2505, the angular rotation $\theta_b$ is approximately 45°, whereas at about halfway along the translation distance, as represented by state 2501c, the angular rotation may be approximately 60°, wherein a total of 90° of rotation is implemented between the initial 2501a and final 2501d states. Such relatively higher rotational speed in the initial period(s) of translation may be desirable to provide reduced shear on the scope shaft 40 by reducing a radius of curvature in one or more bends formed in the scope shaft 40 during retraction. Limiting rotation of the end effector/scope base to some angle less than or equal to 90° can be beneficial, as rotation beyond 90° may introduce relatively sharp angles/shear stresses in the scope shaft 40 in the area of the proximal end 62 of the scope. Furthermore, in some implementations, relatively more severe service loop bend radii may form in the beginning/initial period(s) of fast retraction of the scope driver/feeder 11. Therefore, rotational speed and/or transverse translation speed may advantageously be implemented at relatively higher speeds earlier in the translation process/distance. In some implementations, the total period of retraction time may be about three seconds and the scope driver/feeder retraction velocity during such period may be about 50 mm/s. It may further be desirable to limit the speed of rotation to a speed that does not result in undesirable slippage of the scope shaft 40 within the channel 39 of the scope driver 11.

Although transverse translation and rotation of the end effector/base are shown in FIG. 25-1, it should be understood that retraction processes accordance with aspects of the present disclosure may include either transverse translation or rotation, but not both, in some implementations.

In some embodiments, a scope base/handle may be coupled to a robotic end effector, such as an instrument manipulator of a robotic arm, such that a center of mass of the base/handle is offset from an axial center of the end effector. For example, as shown in FIG. 25-1, the virtual rail 1501, which is in-line with the scope shaft 40 at the base 62 of the scope 40, is offset by distance $d_0$ to one side of the center $A_1$ of the end effector 6a. Therefore, when rotating the scope handle/base counterclockwise to a 90° rotation in the final rotational state 2501d, the scope offset $d_0$ may be to the side of the scope driver 11 with respect to the 'x' dimension. FIG. 25-2 shows an alternate implementation of a fast retraction scope base transverse translation process. In particular, in FIG. 25-2, the rotation of the scope base 31 (clockwise in the illustration shown), results in the offset position $d_0$ of the scope being away from the scope driver 11 with respect to the axial center $A_1$, which may advantageously increase the distance between the scope base 62 and the scope driver 11, thereby potentially reducing bend curve radii and/or shear stresses in the scope shaft 40.

Generally, a desirable direction of rotation implemented for the scope base/handle 31 may be such that when the transverse translation of the scope base/handle is implemented, the base 62 of the scope 40 moves toward, and/or is positioned on a side of the end effector 6a that is toward, the virtual rail 1501, which may advantageously reduce the shear on the scope shaft 40. For example, with respect to the illustrated orientation/perspective of FIGS. 25-1 and 25-2, transverse translation to the right may be associated with counterclockwise rotation of the scope, whereas translation to the left (as in FIG. 25-2) may be associated with clockwise rotation. Whether clockwise or counterclockwise rotation positions the offset alignment 1501 of the scope toward or away from the scope driver 11 relative to the axial center $A_1$ of the end effector 6a in the 'x' dimension may generally depend on which side of the center $A_1$ the scope base 31 is mechanically coupled to the end effector 6a in the initial position 2501a, 2502a. In view of FIGS. 25-1 and 25-2, it should be understood that scope rotation may be implemented in either clockwise or counterclockwise direction, and further a scope base/handle associated with any embodiment of the present disclosure may be mounted to a respective robotic end effector in an offset configuration on any side or orientation with respect to the center of the end effector.

Additional Embodiments and Description

Described herein are systems, devices, and methods to facilitate efficient and safe axial driving of a shaft-type medical instrument through control of an instrument feeder device/system in connection with certain medical procedures. In particular, systems, devices, and methods in accordance with one or more aspects of the present disclosure can facilitate instrument feeder control to implement automatic axial speed modification and/or pausing/stopping in response to instrument position determination/detection, which may advantageously reduce the risk of damage to patient anatomy and/or medical equipment and improve procedural efficiency.

In some implementations, the present disclosure relates to a robotic system comprising a medical instrument comprising an elongate shaft dimensioned to be disposed at least partially within an access sheath and control circuitry. The control circuitry is configured to cause the elongate shaft to be retracted at least partially within the access sheath, determine a position of a distal end of the elongate shaft relative to the access sheath, and modify a speed of retraction of the elongate shaft based on the determined position of the distal end of the elongate shaft relative to the access sheath.

The control circuitry can be configured to cause the elongate shaft to be retracted at least in part by causing an actuator configured to axially move the elongate shaft to retract the elongate shaft and causing a robotic manipulator to which the medical instrument is attached to move away from the access sheath. For example, the control circuitry can be further configured to determine a position of the robotic manipulator and pause movement of the robotic manipulator based at least in part on the determined position of the robotic manipulator.

In some embodiments, the position of the distal end of the elongate shaft is within a distal buffer portion of the access sheath, wherein modifying the speed of retraction of the elongate shaft involves causing the actuator to retract the elongate shaft at a first speed and causing the robotic manipulator to move at the first speed. In some embodiments, when the position of the distal end of the elongate shaft is within a fast retract portion of the access sheath that is proximal of the distal buffer portion of the access sheath, modifying the speed of retraction of the elongate shaft involves causing the actuator to retract the elongate shaft at a second speed that is greater than the first speed and causing the robotic manipulator to move at a third speed that is greater than the first speed but less than the second speed. For example, when the position of the distal end of the elongate shaft is between the fast retract portion and the distal buffer portion of the access sheath, modifying the speed of retraction of the elongate shaft can involve causing the actuator to retract the elongate shaft at the third speed and causing the robotic manipulator to move at the third speed. In some embodiments, when the position of the distal end of the elongate shaft is proximal to a proximal end of the access sheath, modifying the speed of retraction of the elongate shaft involves causing the actuator to stop retraction of the elongate shaft. For example, when the position of the distal end of the elongate shaft is proximal to the proximal end of the access sheath, modifying the speed of retraction of the elongate shaft can further involve stopping movement of the robotic manipulator.

When the position of the distal end of the elongate shaft is within a fast retract portion of the access sheath, modifying the speed of retraction of the elongate shaft can involve causing the actuator to retract the elongate shaft at a first speed and causing the robotic manipulator to move at a second speed that is less than the second speed.

In some embodiments, when the position of the distal end of the elongate shaft is within a distal buffer portion of the access sheath, modifying the speed of retraction of the elongate shaft can involve causing the speed of retraction of the elongate shaft to increase to a first speed. For example, when the position of the distal end of the elongate shaft is within a fast retract portion of the access sheath that is proximal of the distal buffer portion of the access sheath, modifying the speed of retraction of the elongate shaft can involve causing the actuator to retract the elongate shaft at a second speed that is greater than the first speed. For example, when the position of the distal end of the elongate shaft is between the fast retract portion and the distal buffer portion of the access sheath, modifying the speed of retraction of the elongate shaft can involve causing the actuator to retract the elongate shaft at a third speed that is greater than the first speed but less than the second speed.

In some implementations, the present disclosure relates to a robotic system comprising a medical instrument comprising an elongate shaft dimensioned to be advanced within an access sheath and control circuitry. The control circuitry is configured to cause the elongate shaft to be inserted at least partially within the access sheath, determine a position of a distal end of the elongate shaft relative to the access sheath, and modify a speed of insertion of the elongate shaft based on the determined position of the distal end of the elongate shaft relative to the access sheath.

The control circuitry can be configured to cause the elongate shaft to be inserted at least in part by causing an actuator configured to axially move the elongate shaft to insert the elongate shaft and causing a robotic manipulator to which the medical instrument is attached to move toward the access sheath.

The control circuitry can be further configured to determine a position of the robotic manipulator and pause movement of the robotic manipulator based at least in part on the determined position of the robotic manipulator. For example, in some embodiments, the control circuitry is further configured to determine that a service loop is present in the elongate shaft based at least in part on the position of the robotic manipulator and pausing movement of the robotic manipulator is based at least in part on the determination that the service loop is present.

In some embodiments, when the position of the distal end of the elongate shaft is within a fast insertion zone associated with a portion of the access sheath, modifying the speed of insertion of the elongate shaft involves causing the actuator to insert the elongate shaft at a first speed and causing the robotic manipulator to move at a second speed that is slower than the first speed. For example, when the position of the distal end of the elongate shaft is within a distal slow insertion zone including a distal end of the access sheath, modifying the speed of insertion of the elongate shaft can involve causing the actuator to insert the elongate shaft at a third speed that is slower than both the first speed and the second speed and causing the robotic manipulator to move at the third speed. When the position of the distal end of the elongate shaft is between the fast insertion zone and the slow insertion zone, modifying the speed of retraction of the elongate shaft can involve causing the actuator to retract the elongate shaft at the second speed and causing the robotic manipulator to move at the second speed.

In some implementations, the present disclosure relates to a robotic system comprising a medical instrument translation means physically coupled to a handle of a medical instrument, actuator means configured to axially actuate an elongate shaft of the medical instrument, and control means configured to cause the actuator means to retract the elongate shaft at least partially within an access sheath, determine a position of a distal end of the elongate shaft relative to the access sheath, and modify a speed of retraction of the elongate shaft based on the determined position of the distal end of the elongate shaft relative to the access sheath.

For purposes of summarizing the disclosure, certain aspects, advantages and novel features have been described. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

Depending on the embodiment, certain acts, events, or functions of any of the processes or algorithms described herein can be performed in a different sequence, may be added, merged, or left out altogether. Thus, in certain embodiments, not all described acts or events are necessary for the practice of the processes.

Conditional language used herein, such as, among others, "can," "could," "might," "may," "e.g.," and the like, unless specifically stated otherwise, or otherwise understood within the context as used, is intended in its ordinary sense and is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous, are used in their ordinary sense, and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is understood with the context as used in general to convey that an item, term, element, etc. may be either X, Y or Z. Thus, such conjunctive language is not generally intended to imply that certain embodiments require at least one of X, at least one of Y and at least one of Z to each be present.

It should be appreciated that in the above description of embodiments, various features are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Further, no component, feature, step, or group of components, features, or steps are necessary or indispensable for each embodiment. Thus, it is intended that the scope of the inventions herein disclosed and claimed below should not be limited by the particular embodiments described above, but should be determined only by a fair reading of the claims that follow.

It should be understood that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to any other element, but rather may generally distinguish the element from another element having a similar or identical name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited.

Unless otherwise defined, all terms (including technical and scientific terms) used herein have the same meaning as commonly understood by one of ordinary skill in the art to which example embodiments belong. It be further understood that terms, such as those defined in commonly used dictionaries, should be interpreted as having a meaning that is consistent with their meaning in the context of the relevant art and not be interpreted in an idealized or overly formal sense unless expressly so defined herein.

The spatially relative terms "outer," "inner," "upper," "lower," "below," "above," "vertical," "horizontal," and similar terms, may be used herein for ease of description to describe the relations between one element or component and another element or component as illustrated in the drawings. It be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Unless otherwise expressly stated, comparative and/or quantitative terms, such as "less," "more," "greater," and the like, are intended to encompass the concepts of equality. For example, "less" can mean not only "less" in the strictest mathematical sense, but also, "less than or equal to."

What is claimed is:

1. A robotic system comprising:
   a medical instrument comprising an elongate shaft dimensioned to be disposed at least partially within an access sheath; and
   control circuitry configured to:
      cause the elongate shaft to be retracted at least partially within the access sheath, wherein the control circuitry is configured to cause the elongate shaft to be retracted at least in part by:
         causing an actuator configured to axially move the elongate shaft to retract the elongate shaft; and
         causing a robotic manipulator to which the medical instrument is attached to move away from the access sheath;
      determine that a distal end of the elongate shaft is retracted past a distal opening of the access sheath so that the distal end of the elongate shaft is disposed within the access sheath; and
      increase a speed of retraction of the elongate shaft based at least in part on a position of the distal end of the elongate shaft within the access sheath, wherein, when the position of the distal end of the elongate shaft is within a fast retract buffer portion of the access sheath, said increasing the speed of retraction of the elongate shaft includes:
  causing the actuator to retract the elongate shaft at a first speed; and
  causing the robotic manipulator to move at the first speed.

2. The robotic system of claim 1, wherein the control circuitry is further configured to cause the elongate shaft to be retracted at least in part by causing the robotic manipulator to move in a transverse direction relative to an axis of the axial movement of the elongate shaft by the actuator.

3. The robotic system of claim 2, wherein the transverse direction is in a direction towards a robotic cart of the robotic system, the robotic manipulator being associated with the robotic cart.

4. The robotic system of claim 2, wherein the transverse direction is in a vertical direction.

5. The robotic system of claim 1, wherein the control circuitry is further configured to:
  determine a position of the robotic manipulator; and
  pause movement of the robotic manipulator based at least in part on the determined position of the robotic manipulator.

6. The robotic system of claim 1, wherein, when the position of the distal end of the elongate shaft is within a fast retract portion of the access sheath that is proximal of a distal buffer portion of the access sheath, said increasing the speed of retraction of the elongate shaft includes:
  causing the actuator to retract the elongate shaft at a second speed that is greater than the first speed; and
  causing the robotic manipulator to move at a third speed that is greater than the first speed but less than the second speed.

7. The robotic system of claim 6, wherein, when the position of the distal end of the elongate shaft is between the fast retract portion and the fast retract buffer portion of the access sheath, said increasing the speed of retraction of the elongate shaft includes:
  causing the actuator to retract the elongate shaft at the third speed; and
  causing the robotic manipulator to move at the third speed.

8. The robotic system of claim 6, wherein, the control circuitry is further configured to determine that the distal end of the elongate shaft is proximal to a proximal end of the access sheath, and cause the actuator to stop retraction of the elongate shaft based at least in part on determining that the distal end of the elongate shaft is proximate to a proximal end of the access sheath.

9. The robotic system of claim 8, wherein, when the position of the distal end of the elongate shaft is proximal to the proximal end of the access sheath, the control circuitry is further configured to stop movement of the robotic manipulator.

10. The robotic system of claim 1, wherein, when the position of the distal end of the elongate shaft is within a fast retract portion of the access sheath, said increasing the speed of retraction of the elongate shaft includes:
  causing the actuator to retract the elongate shaft at a first speed; and
  causing the robotic manipulator to move at a second speed that is less than the first speed.

11. The robotic system of claim 1, wherein, when the position of the distal end of the elongate shaft is within a fast retract buffer portion of the access sheath, said increasing the speed of retraction of the elongate shaft includes causing the speed of retraction of the elongate shaft to increase to a first speed.

12. The robotic system of claim 11, wherein, when the position of the distal end of the elongate shaft is within a fast retract portion of the access sheath that is proximal of the fast retract buffer portion of the access sheath, said increasing the speed of retraction of the elongate shaft includes causing the elongate shaft to be retracted at a second speed that is greater than the first speed.

13. The robotic system of claim 12, wherein, when the position of the distal end of the elongate shaft is between the fast retract portion and the fast retract buffer portion of the access sheath, said increasing the speed of retraction of the elongate shaft includes causing the actuator to retract the elongate shaft at a third speed that is greater than the first speed but less than the second speed.

14. A robotic system comprising:
  a medical instrument comprising an elongate shaft dimensioned to be advanced within an access sheath; and
  control circuitry configured to:
    cause the elongate shaft to be inserted at least partially within the access sheath, wherein the control circuitry is configured to cause the elongate shaft to be inserted at least in part by:
      causing an actuator configured to axially move the elongate shaft to insert the elongate shaft; and
      causing a robotic manipulator to which the medical instrument is attached to move toward the access sheath;
    determine a position of the robotic manipulator;
    determine that a service loop is present in the elongate shaft based at least in part on the position of the robotic manipulator;
    pause movement of the robotic manipulator based at least in part on the determined position of the robotic manipulator and the determination that the service loop is present;
    determine that a distal end of the elongate shaft is inserted past a proximal opening of the access sheath so that the distal end of the elongate shaft is disposed within the access sheath; and
    increase a speed of insertion of the elongate shaft based at least in part on a position of the distal end of the elongate shaft within the access sheath.

15. A robotic system comprising:
  a medical instrument translation means physically coupled to a handle of a medical instrument;
  actuator means configured to axially actuate an elongate shaft of the medical instrument; and
  control means configured to:
    cause the actuator means to retract the elongate shaft at least partially within an access sheath, wherein the control means is configured to cause the elongate shaft to be retracted at least in part by:
      causing the actuator means to axially move the elongate shaft to retract the elongate shaft; and
      causing a robotic manipulator to which the medical instrument is attached to move away from the access sheath;
    determine that a distal end of the elongate shaft is retracted past a distal opening of the access sheath so that the distal end of the elongate shaft is disposed within the access sheath; and
    increase a speed of retraction of the elongate shaft based at least in part on a position of the distal end of the elongate shaft within the access sheath, wherein, when the position of the distal end of the elongate shaft is within a fast retract buffer portion of the access sheath, said increasing the speed of retraction of the elongate shaft includes:

causing the actuator means to retract the elongate shaft at a first speed; and causing the robotic manipulator to move at the first speed.

* * * * *

UNITED STATES PATENT AND TRADEMARK OFFICE
CERTIFICATE OF CORRECTION

| | | |
|---|---|---|
| PATENT NO. | : 12,440,978 B2 | Page 1 of 1 |
| APPLICATION NO. | : 17/987673 | |
| DATED | : October 14, 2025 | |
| INVENTOR(S) | : Jiayi Lin et al. | |

It is certified that error appears in the above-identified patent and that said Letters Patent is hereby corrected as shown below:

On the Title Page

At item (63), at Related U.S. Application Data, after Continuation of application No. PCT/US2021/065220, filed on Dec. 27, 2021 insert -- Provisional application No. 63/132,771, filed on Dec. 31, 2020, provisional application No. 63/150,277, filed on Feb. 17, 2021. --

Signed and Sealed this
Eighteenth Day of November, 2025

John A. Squires
*Director of the United States Patent and Trademark Office*